United States Patent
Connors et al.

(10) Patent No.: US 12,005,691 B2
(45) Date of Patent: Jun. 11, 2024

(54) RECYCLABLE, ASYMMETRICAL-FACED COMPOSITE NONWOVEN TEXTILE HAVING VARIED DENIER

(71) Applicant: NIKE, Inc., Beaverton, OR (US)

(72) Inventors: Krista J. Connors, Beaverton, OR (US); Dallas Lund, Portland, OR (US); David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/508,315

(22) Filed: Oct. 22, 2021

(65) Prior Publication Data

US 2022/0136157 A1    May 5, 2022

Related U.S. Application Data

(63) Continuation of application No. PCT/US2021/055822, filed on Oct. 20, 2021.

(Continued)

(51) Int. Cl.
*B32B 5/02* (2006.01)
*B32B 3/26* (2006.01)
(Continued)

(52) U.S. Cl.
CPC .............. *B32B 5/022* (2013.01); *B32B 3/263* (2013.01); *B32B 5/06* (2013.01); *B32B 5/266* (2021.05);
(Continued)

(58) Field of Classification Search
CPC ........... B32B 5/06; B32B 25/10; B32B 27/10; B32B 27/12; Y10T 442/682; Y10T 442/679; Y10T 442/674; Y10T 442/619
See application file for complete search history.

(56) References Cited

U.S. PATENT DOCUMENTS

| | | |
|---|---|---|
| 3,117,905 A | 1/1964 | Smith, II |
| 3,154,462 A | 10/1964 | Smith, II |

(Continued)

FOREIGN PATENT DOCUMENTS

| | | |
|---|---|---|
| CA | 2906855 A1 | 9/2014 |
| CN | 1264770 A | 8/2000 |

(Continued)

OTHER PUBLICATIONS

International Search Report and Written Opinion received for PCT Patent Application No. PCT/US2021/055822, dated May 24, 2022, 36 pages.

(Continued)

*Primary Examiner* — Elizabeth M Imani
(74) *Attorney, Agent, or Firm* — Shook, Hardy & Bacon L.L.P.

(57) ABSTRACT

Aspects herein are directed to a recyclable, asymmetrical-faced composite nonwoven textile suitable for use in apparel and other articles and methods of making the same. In example aspects, the asymmetrical-faced composite nonwoven textile includes a first face formed, at least in part from a first entangled web of fibers and an opposite second face formed, at least in part from a second entangled web of fibers. When incorporated into an article of apparel, the first face forms an outer-facing surface of the article of apparel, and the second face forms an inner-facing surface of the article of apparel. The first face includes features making it suitable to form the outer-facing surface such as resistance to abrasion, and the second face includes features making it suitable to form an inner-facing surface such as a soft hand.

24 Claims, 24 Drawing Sheets

Related U.S. Application Data

(60) Provisional application No. 63/218,070, filed on Jul. 2, 2021, provisional application No. 63/125,720, filed on Dec. 15, 2020, provisional application No. 63/108,042, filed on Oct. 30, 2020.

(51) Int. Cl.
| | |
|---|---|
| *B32B 5/06* | (2006.01) |
| *B32B 5/26* | (2006.01) |
| *B32B 7/00* | (2019.01) |
| *B32B 7/022* | (2019.01) |
| *B32B 7/027* | (2019.01) |
| *B32B 7/14* | (2006.01) |
| *B32B 25/10* | (2006.01) |
| *B32B 27/12* | (2006.01) |
| *D04H 1/435* | (2012.01) |
| *D04H 1/4358* | (2012.01) |
| *D04H 1/46* | (2012.01) |
| *D04H 1/498* | (2012.01) |
| *D04H 1/541* | (2012.01) |
| *D04H 1/555* | (2012.01) |
| *D04H 1/593* | (2012.01) |
| *D04H 1/66* | (2012.01) |
| *D04H 1/74* | (2006.01) |
| *D04H 3/03* | (2012.01) |
| *D04H 3/105* | (2012.01) |
| *D04H 13/00* | (2006.01) |

(52) U.S. Cl.
CPC ............... *B32B 7/00* (2013.01); *B32B 7/022* (2019.01); *B32B 7/027* (2019.01); *B32B 7/14* (2013.01); *B32B 25/10* (2013.01); *B32B 27/12* (2013.01); *D04H 1/435* (2013.01); *D04H 1/4358* (2013.01); *D04H 1/46* (2013.01); *D04H 1/498* (2013.01); *D04H 1/5412* (2020.05); *D04H 1/555* (2013.01); *D04H 1/593* (2013.01); *D04H 1/66* (2013.01); *D04H 1/74* (2013.01); *D04H 3/03* (2013.01); *D04H 3/105* (2013.01); *D04H 13/002* (2013.01); *B32B 2250/03* (2013.01); *B32B 2250/20* (2013.01); *B32B 2250/40* (2013.01); *B32B 2255/02* (2013.01); *B32B 2262/02* (2013.01); *B32B 2262/0215* (2013.01); *B32B 2262/0276* (2013.01); *B32B 2262/0292* (2013.01); *B32B 2262/124* (2021.05); *B32B 2307/306* (2013.01); *B32B 2307/51* (2013.01); *B32B 2307/718* (2013.01); *B32B 2437/00* (2013.01); *D10B 2331/04* (2013.01); *D10B 2401/04* (2013.01); *D10B 2401/041* (2013.01); *D10B 2401/061* (2013.01); *D10B 2401/062* (2013.01); *D10B 2401/20* (2013.01); *D10B 2501/00* (2013.01); *D10B 2501/04* (2013.01)

(56) References Cited

U.S. PATENT DOCUMENTS

| | | | |
|---|---|---|---|
| 3,476,626 A | 11/1969 | Charlton et al. | |
| 4,211,593 A | 7/1980 | Lochner | |
| 4,326,003 A | 4/1982 | Bouhaniche | |
| 4,435,458 A | 3/1984 | Hill | |
| 4,446,189 A | 5/1984 | Romanek | |
| 4,478,895 A | 10/1984 | Makami et al. | |
| 4,569,874 A | 2/1986 | Kuznetz | |
| 4,652,484 A | 3/1987 | Shiba et al. | |
| 4,726,978 A | 2/1988 | Simpson | |
| 4,939,016 A | 7/1990 | Radwanski et al. | |
| 5,047,276 A | 9/1991 | Chomarat et al. | |
| 5,334,446 A | 8/1994 | Quantrille et al. | |
| 5,393,599 A * | 2/1995 | Quantrille | D04H 1/492 |
| | | | 428/152 |
| 5,418,045 A | 5/1995 | Pike et al. | |
| 5,431,991 A | 7/1995 | Quantrille et al. | |
| 5,458,944 A | 10/1995 | Austin | |
| 5,540,976 A | 7/1996 | Shawver et al. | |
| 5,681,645 A | 10/1997 | Strack et al. | |
| 5,783,504 A * | 7/1998 | Ehret | D04H 13/00 |
| | | | 442/400 |
| 5,804,021 A | 9/1998 | Abuto et al. | |
| 5,874,159 A | 2/1999 | Cruise et al. | |
| 6,573,204 B1 * | 6/2003 | Philipp | D04H 1/492 |
| | | | 442/388 |
| 7,390,760 B1 * | 6/2008 | Chen | D04H 1/43838 |
| | | | 442/403 |
| 7,659,217 B2 | 2/2010 | Narayanan et al. | |
| 8,282,877 B2 | 10/2012 | White et al. | |
| 8,765,255 B2 | 7/2014 | Conley et al. | |
| 9,815,258 B2 | 11/2017 | Stanley et al. | |
| 2002/0197924 A1 | 12/2002 | Halley et al. | |
| 2004/0097154 A1 | 5/2004 | Bansal | |
| 2006/0035555 A1 | 2/2006 | Narayanan et al. | |
| 2006/0057924 A1 | 3/2006 | Cheng et al. | |
| 2006/0147698 A1 | 7/2006 | Carroll et al. | |
| 2007/0124870 A1 | 6/2007 | Turner | |
| 2009/0068912 A1 | 3/2009 | Boscolo et al. | |
| 2009/0169802 A1 | 7/2009 | Miyamura et al. | |
| 2009/0209155 A1 | 8/2009 | Goulet | |
| 2009/0280710 A1 | 11/2009 | Zafiroglu | |
| 2010/0222755 A1 | 9/2010 | Westwood | |
| 2011/0275267 A1 | 11/2011 | Smith et al. | |
| 2012/0190258 A1 | 7/2012 | Glaser | |
| 2012/0302982 A1 | 11/2012 | Takebe et al. | |
| 2013/0025767 A1 | 1/2013 | Jolly et al. | |
| 2013/0278019 A1 | 10/2013 | Preisler et al. | |
| 2013/0288553 A1 | 10/2013 | Pensak | |
| 2013/0288554 A1 | 10/2013 | Mallen et al. | |
| 2016/0040337 A1 | 2/2016 | Dutkiewicz et al. | |
| 2016/0122920 A1 | 5/2016 | Hobbs et al. | |
| 2017/0087029 A1 | 3/2017 | Nelson et al. | |
| 2018/0014678 A1 | 1/2018 | Zafiroglu et al. | |
| 2018/0035636 A1 | 2/2018 | Cummins | |
| 2018/0105964 A1 | 4/2018 | Okawa | |
| 2018/0142387 A1 | 5/2018 | Wang et al. | |
| 2019/0134943 A1 * | 5/2019 | Cheng | B32B 5/028 |
| 2019/0193383 A1 | 6/2019 | Kien et al. | |

FOREIGN PATENT DOCUMENTS

| | | |
|---|---|---|
| CN | 1407926 A | 4/2003 |
| CN | 1441102 A | 9/2003 |
| CN | 1441103 A | 9/2003 |
| CN | 1697639 A | 11/2005 |
| CN | 101074515 A | 11/2007 |
| CN | 101166858 A | 4/2008 |
| CN | 101257872 A | 9/2008 |
| CN | 101657326 A | 2/2010 |
| CN | 102869829 A | 1/2013 |
| CN | 102971454 A | 3/2013 |
| CN | 203567274 U | 4/2014 |
| CN | 104818579 A | 8/2015 |
| CN | 105229212 A | 1/2016 |
| CN | 205035594 U | 2/2016 |
| CN | 105690811 A | 6/2016 |
| CN | 105765117 A | 7/2016 |
| CN | 106029302 A | 10/2016 |
| CN | 106999321 A | 8/2017 |
| CN | 107072835 A | 8/2017 |
| CN | 108608790 A | 10/2018 |
| CN | 109311263 A | 2/2019 |
| CN | 109496242 A | 3/2019 |
| CN | 110446601 A | 11/2019 |
| CN | 111527252 A | 8/2020 |
| EP | 0103039 A1 | 3/1984 |
| EP | 0452727 A1 | 10/1991 |
| TW | 201213634 A | 4/2012 |
| TW | I434971 B | 4/2014 |

(56) References Cited

FOREIGN PATENT DOCUMENTS

| TW | 202012592 A | 4/2020 |
|---|---|---|
| TW | 202035813 A | 10/2020 |
| WO | 2012/145599 A1 | 10/2012 |
| WO | 2018/144118 A1 | 8/2018 |
| WO | 2019/022966 A1 | 1/2019 |
| WO | 2019/231580 A1 | 12/2019 |
| WO | 2020/218092 A1 | 10/2020 |

OTHER PUBLICATIONS

Kothari et al., "Super Absorbent Nonwovens For Protective Apparels", TechnicalTextile.net, Available online at: <https://www.technicaltextile.net/articles/super-absorbent-nonwovens-for-protective-apparels-7553>, Accessed on Nov. 5, 2021, pp. 1-13.
Invitation to Pay Additional Fees received for PCT Patent Application No. PCT/US2021/055822, dated Feb. 1, 2022, 10 pages.
Non-Final Office Action received for U.S. Appl. No. 17/509,995, dated Aug. 24, 2023, 7 pages.
1 Non-Final Office Action received for U.S. Appl. No. 17/509,945, dated Jun. 21, 2023, 12 pages.
Non-Final Office Action received for U.S. Appl. No. 17/512,149, dated Oct. 12, 2023, 9 pages.
International Preliminary Report on Patentability received for PCT Patent Application No. PCT/US2021/055822, dated Apr. 24, 2023, 18 pages.
Final Office Action received for U.S. Appl. No. 17/509,945, mailed on Feb. 1, 2024, 13 pages.
Non-Final Office Action received for U.S. Appl. No. 17/511,173, mailed on Jan. 31, 2024, 7 pages.
Final Office Action received for U.S. Appl. No. 17/509,995, mailed on Jan. 23, 2024, 13 pages.
Office Action received for European Application No. 21806576.1, mailed on Mar. 4, 2024, 5 pages.
Office Action received for China Application No. 202111272375A, mailed on Mar. 7, 2024, 8 pages.
Final Office Action received for U.S. Appl. No. 17/512,149 mailed on Apr. 10, 2024, 11 pages.
Non-Final Office Action received for U.S. Appl. No. 17/511,110, mailed on Apr. 10, 2024, 12 pages.

\* cited by examiner

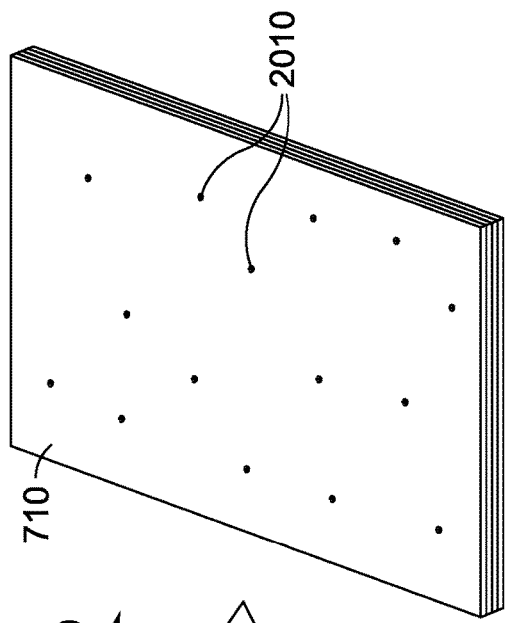
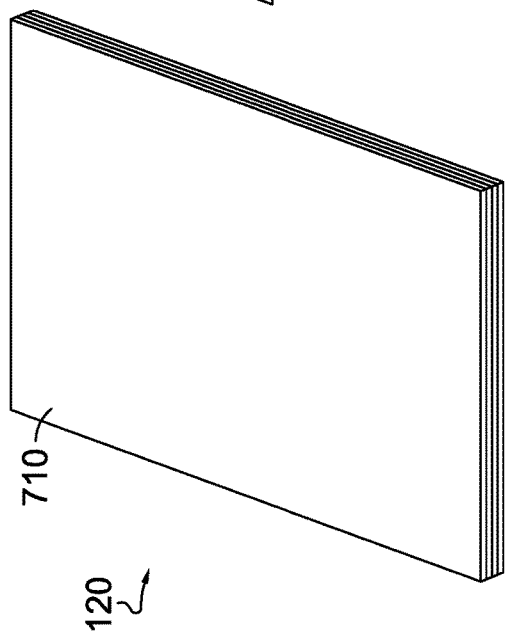
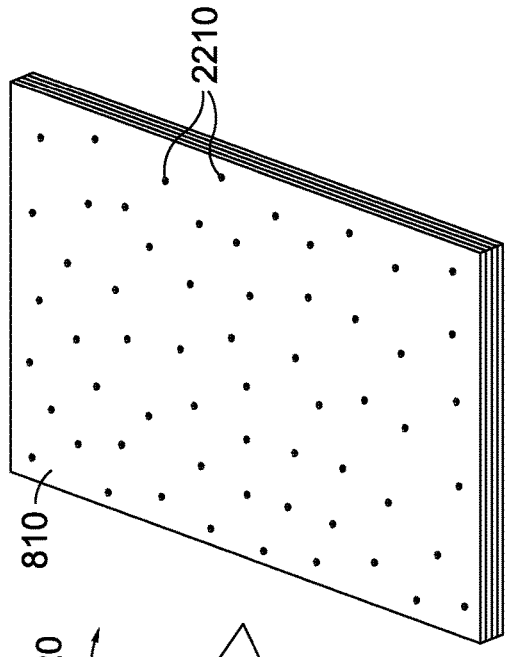

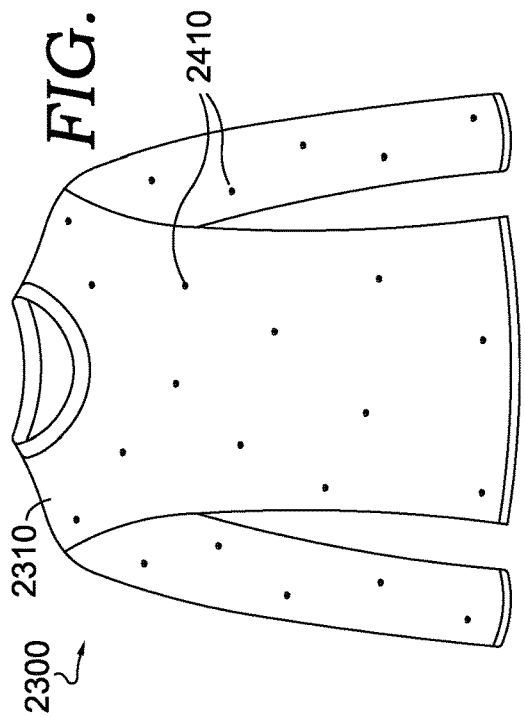
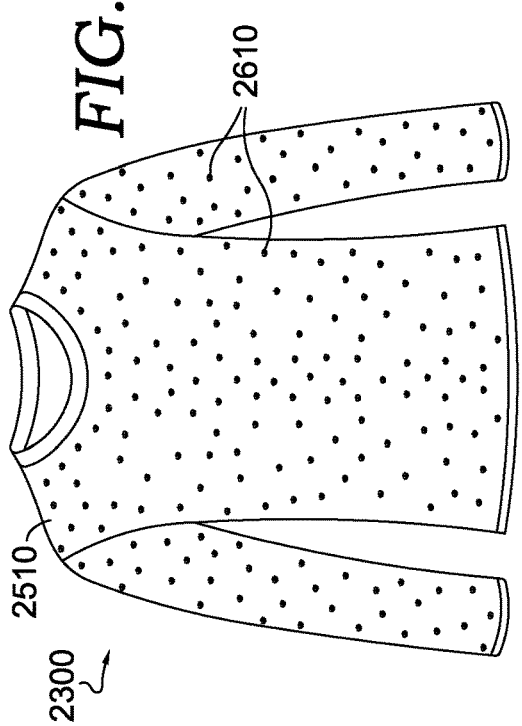
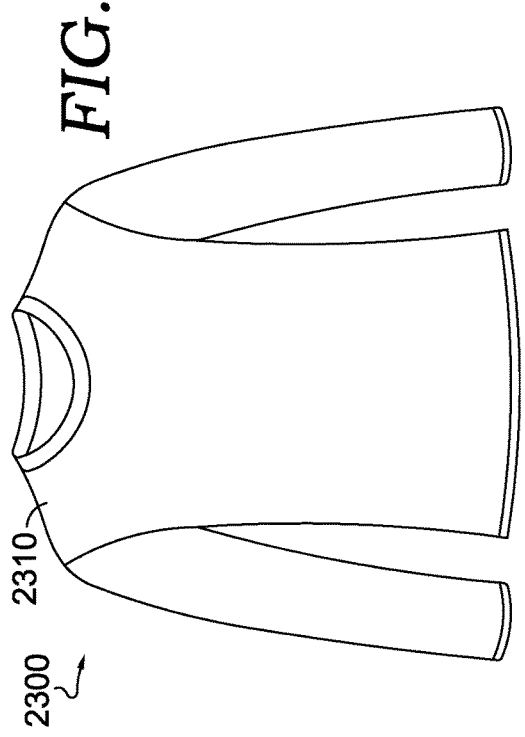
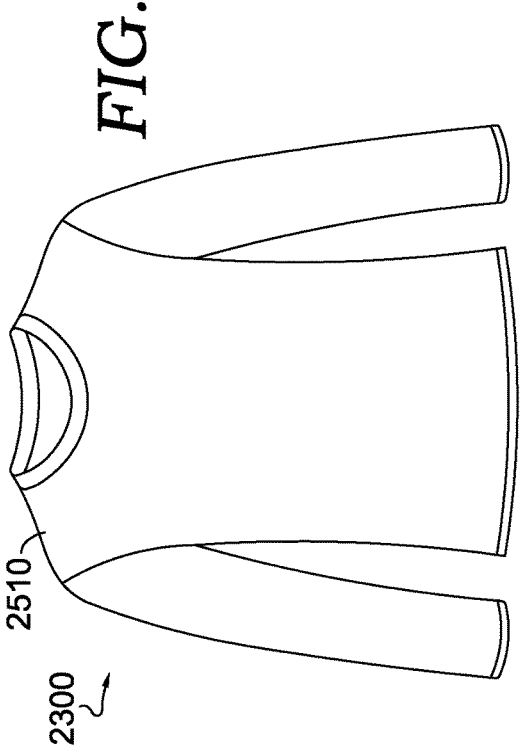

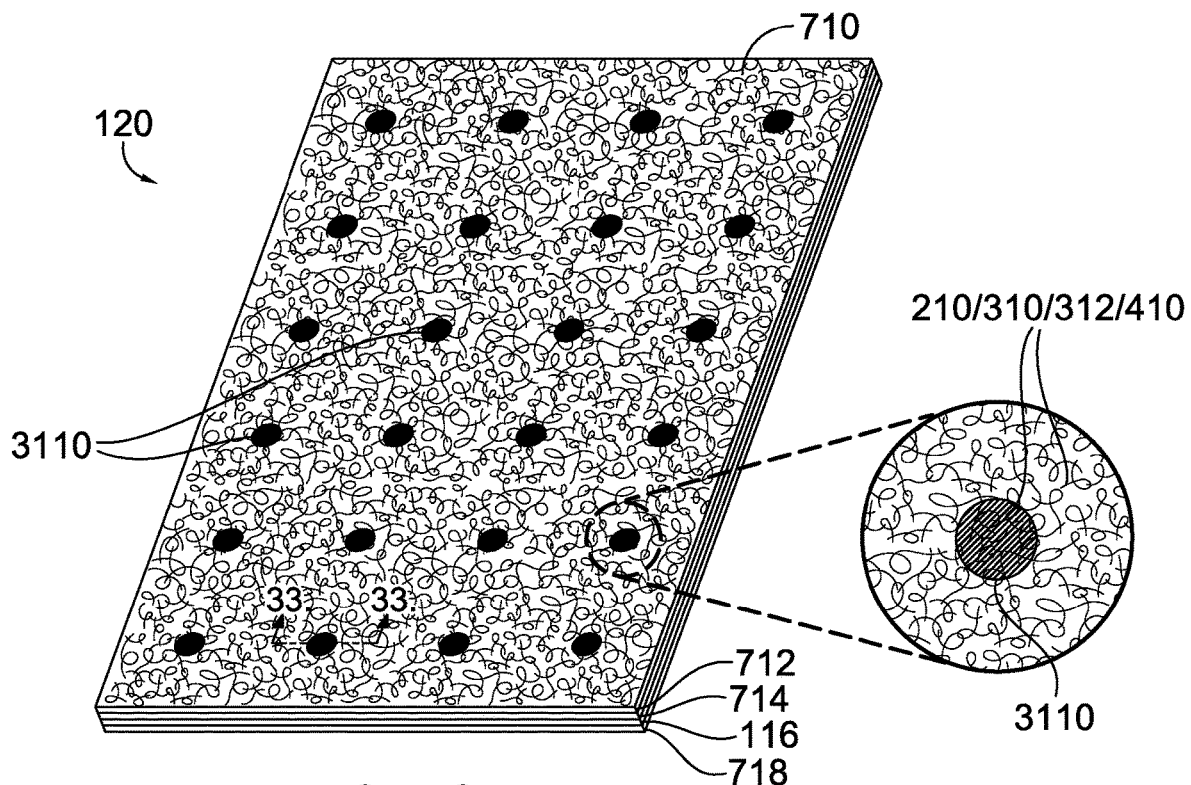
FIG. 31.
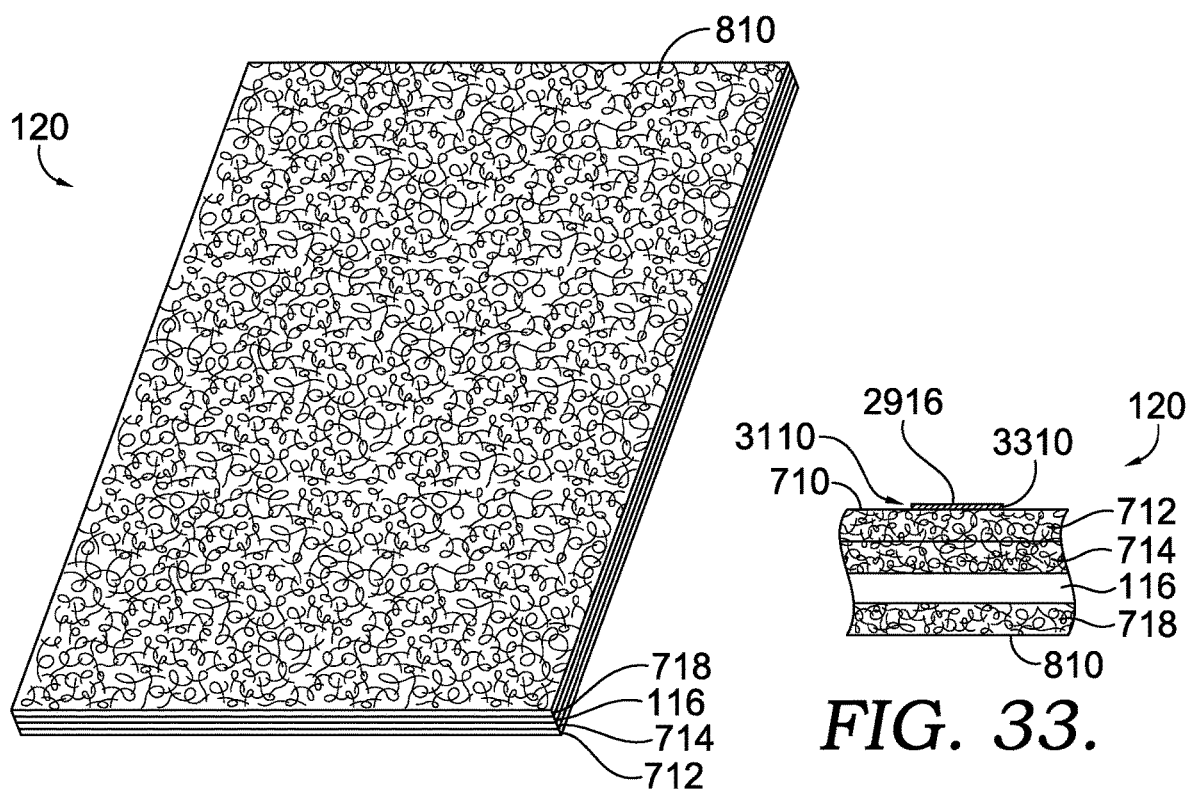
FIG. 32.
FIG. 33.

RECYCLABLE, ASYMMETRICAL-FACED COMPOSITE NONWOVEN TEXTILE HAVING VARIED DENIER

CROSS-REFERENCE TO RELATED APPLICATIONS

This application, "Recyclable, Asymmetrical-Faced Composite Nonwoven Textile Having Varied Denier," is a continuation of PCT App. No. PCT/US2021/055822, filed Oct. 20, 2021, and titled "Asymmetric Faced Composite Nonwoven Textile and Methods of Manufacturing the Same," which claims the benefit of priority of U.S. App. No. 63/108,042, filed Oct. 30, 2020, and titled "Recyclable, Asymmetrical-Faced Composite Nonwoven Textile Suitable for Apparel and Methods for Producing the Same," U.S. App. No. 63/125,720, filed Dec. 15, 2020, and titled "Recyclable, Asymmetrical-Faced Composite Nonwoven Textile Suitable for Apparel and Methods for Producing the Same," and U.S. App. No. 63/218,070, filed Jul. 2, 2021, and titled "Recyclable, Asymmetrical-Faced Composite Nonwoven Textile Having Increased Pilling Resistance." The entireties of the aforementioned applications are incorporated by reference herein.

TECHNICAL FIELD

Aspects herein are directed to a recyclable, asymmetrical-faced composite nonwoven textile suitable for apparel and other articles and methods for producing the same.

BACKGROUND

Traditional nonwoven textiles are generally not suitable for use in articles of apparel due to a lack of stretch and recovery properties, heavy weights, lack of drapability, a rough hand, and, in some instances where increased insulation is desired, lack of insulation properties. Moreover, traditional nonwoven textiles generally have symmetric faces to provide a uniform textile suitable for use in, for instance, the cleaning industry and the personal hygiene industry. However, having uniform faces may not be suitable for use in articles of apparel where different properties may be desired for textile surfaces facing toward a skin surface of a wearer and textile surfaces exposed to the external environment.

BRIEF DESCRIPTION OF THE FIGURES

Examples of aspects herein are described in detail below with reference to the attached drawing figures, wherein:

FIG. 19 illustrates the first face the example composite nonwoven textile of FIG. 1 at a first point in time in accordance with aspects herein;

FIG. 20 illustrates the first face of the example composite nonwoven textile depicted in FIG. 19 at a second point in time in accordance with aspects herein;

FIG. 21 illustrates the second face of the example composite nonwoven textile of FIG. 1 at a first point in time in accordance with aspects herein;

FIG. 22 illustrates the second face of the example composite nonwoven textile depicted in FIG. 21 at a second point in time in accordance with aspects herein;

FIG. 23 illustrates an outer-facing surface of an apparel item formed from the example composite nonwoven textile of FIG. 1 at a first point in time in accordance with aspects herein;

FIG. 24 illustrates the outer-facing surface of the apparel item of FIG. 23 at a second point in time in accordance with aspects herein;

FIG. 25 illustrates an inner-facing surface of the apparel item of FIG. 23 at a first point in time in accordance with aspects herein;

FIG. 26 illustrates the inner-facing surface of the apparel item depicted in FIG. 25 at a second point in time in accordance with aspects herein;

FIG. 31 illustrates the first face of the composite nonwoven textile after the chemical binder has been applied using the example rotogravure system of FIG. 29 in accordance with aspects herein;

FIG. 32 illustrates an opposite second face of the composite nonwoven textile of FIG. 31 in accordance with aspects herein;

FIG. 33 illustrates a cross-section of the composite nonwoven textile of FIG. 31 in accordance with aspects herein;

DETAILED DESCRIPTION

Figure 1:
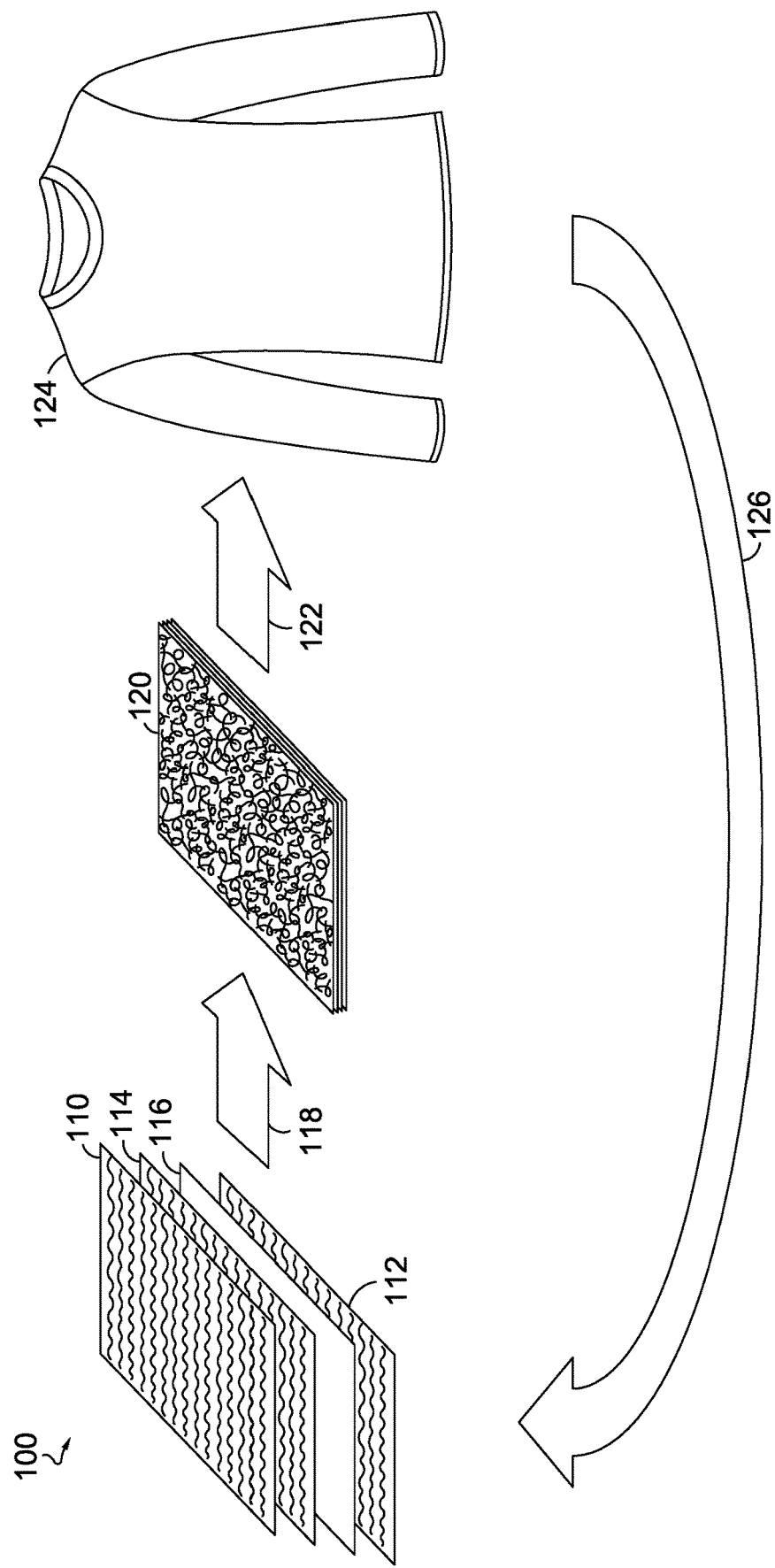
FIG. 1 illustrates an example lifecycle for an example composite nonwoven textile in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditional nonwoven textiles are generally not suitable for use in articles of apparel due to a lack of stretch and recovery properties, heavy weights, lack of drapability, a rough hand, and, in some instances where increased insulation is desired, lack of insulation properties. Moreover, traditional nonwoven textiles generally have symmetric faces or sides to provide a uniform textile suitable for use in, for instance, the cleaning industry and the personal hygiene industry. However, having uniform faces may not be suitable for use in articles of apparel where different properties may be desired for textile surfaces facing toward a skin surface of a wearer and textile surfaces exposed to the external environment.

Aspects herein are directed to a recyclable, asymmetrical-faced, composite nonwoven textile suitable for use in apparel and other articles and methods of making the same. In example aspects, the asymmetrical-faced composite nonwoven textile includes a first face formed, at least in part from a first entangled web of fibers and an opposite second face formed, at least in part from a second entangled web of fibers. When formed into an article of apparel, the first face forms an outer-facing surface of the article of apparel, and the second face forms an inner-facing surface of the article of apparel. The first entangled web of fibers may have features that make it suitable for exposure to an external environment when the asymmetrical-faced composite nonwoven textile is formed into the article of apparel. For example, the fibers that form the first entangled web may have a denier that is about two times greater than the denier of the fibers used to form the second entangled web such that the first entangled web may better withstand abrasion forces without breakage of the fibers.

Features of the second entangled web of fibers make it suitable for forming a skin-facing surface when the asymmetrical-faced composite nonwoven textile is formed into the article of apparel. For instance, the fibers that form the second entangled web may have a denier that is about half the denier of the fibers used to form the first entangled web because the second face may be less exposed to abrasion forces. Moreover, a smaller denier may produce a soft hand making it comfortable for skin or near skin contact. Moreover, the second entangled web may include silicone-coated fibers which also imparts a soft hand and improves drapability of the textile (i.e., makes the textile less stiff).

In further example aspects, the second face may include loops and/or fiber ends that extend away from the second face in a direction perpendicular to the surface plane of the second face to form a pile. For example, the loops and/or fiber ends may extend from about 1.5 mm to about 8.1 mm away from the second face. The pile helps to trap air heated by a wearer thereby improving the insulation properties of the nonwoven textile. The pile also provides additional comfort to the wearer.

In further aspects, the asymmetrical-faced composite nonwoven textile may also include different color properties associated with the first face and the second face. In one aspect, the color properties may be in the form of a heather effect that is more pronounced on one face compared to the other face. The different color properties may impart a desirable aesthetic to an apparel item formed from the nonwoven textile and may also provide a visual marker to a wearer as to which side of the apparel item is outer-facing and which side is inner-facing. The different color properties may also make the apparel item suitable for reversible wear (i.e., wearing the apparel item "inside out"). The different color properties may, for instance, be imparted to the faces by selecting particular colors for fibers forming the different layers of the textile and/or by selecting entanglement parameters such that the colored fibers are selectively moved more to the first face as compared to the second face or vice versa.

The asymmetrical-faced composite nonwoven textile may further include an elastomeric layer positioned between the first and second entangled webs of fibers. The elastomeric layer imparts stretch and recovery properties to the composite nonwoven textile making it suitable for use in articles of apparel such as upper-body garments and lower-body garments. On its own, the elastomeric layer may lack sufficient tensile strength to withstand normal wearer and tear. Thus, the elastomeric layer is integrated into the composite nonwoven textile by extending fibers from the different webs through the elastomeric layer using an entanglement process to produce a cohesive structure.

In some example aspects, the composite nonwoven textile includes additional entangled webs (e.g., a third entangled web of fibers, a fourth entangled web of fibers, etc.) layered together with the elastomeric layer. The weights of the pre-entangled webs may be selected to achieve a lightweight composite nonwoven textile having a minimal thickness after entanglement. Moreover, selection of the number of entangled webs, fiber denier, type of fiber, length of fibers, and the like, produces a resulting composite nonwoven textile that provides enhanced insulation through trapping of air between the fibers forming the textile. Additionally, properties of the different webs and/or the number of webs used to form the composite nonwoven textile may be adjusted to achieve different desired end properties for the nonwoven textile including different desired end properties for each of the faces of the composite nonwoven textile. The result is a lightweight, asymmetrical-faced composite nonwoven textile with thermal properties, stretch and recovery, good drape, an interesting visual aesthetic, good resistance to abrasion, and a soft hand, making the composite nonwoven textile ideal for forming articles of apparel suitable for athletic wear.

The composite nonwoven textile contemplated herein may be finished in a variety of ways. For instance, the textile may be printed with one or more patterns, graphics, logos, and the like using selected printing techniques. In one example aspect, printing may be applied to one or more of the webs of fibers prior to entanglement such that the printed component is integrated into the nonwoven textile during entanglement. When the nonwoven textile is formed into an article of apparel, different techniques may be used to seam textile edges together. For example, textile edges may be overlapped, and an entanglement process may be used to entangle together fibers from the textile edges thereby forming a seam.

Aspects herein further contemplate that the asymmetrical-faced composite nonwoven textile is recyclable, and in some aspects, the textile may be fully recyclable. Thus, in aspects, the fibers selected to form the entangled webs may include recycled materials including recycled polyethylene terephthalate (PET) fibers, commonly known as polyester fibers. Additionally, materials selected to form the elastomeric layer may also be fully recyclable. Use of recycled fibers and materials reduces the carbon footprint of the composite nonwoven textile.

The asymmetrical-faced composite nonwoven textile is formed by positioning an elastomeric layer between two or more webs of fibers. The selection of properties for the different webs, such as number of webs, fiber denier, weight of the individual webs, fiber length, fiber color, and fiber coating, is based on desired end properties of the asymmetrical-faced composite nonwoven textile. Once the elastomeric layer is positioned between the two or more webs of fibers a mechanical entanglement process is performed. In one example aspect, the mechanical entanglement process is needlepunching. Different parameters associated with the needlepunching process such as needle selection, stitch density, penetration depth, direction of penetration, number of needle passes, and the like, are selected based on the desired end properties of the asymmetrical-faced composite nonwoven textile. For example, the parameters may be selected to produce a nonwoven textile that has a desired thickness, a desired degree of stretch and recovery, a desired weight, a desired drape or stiffness, and the like.

The selection of properties for the different webs in combination with the needling parameters may produce asymmetries in the nonwoven textile after wash and/or wear. In some aspects, the asymmetries produced by wash and/or wear may be a desirable attribute. For example, the second face of the nonwoven textile may pill to a greater extent than the first face of the nonwoven textile. When the nonwoven textile is incorporated into an article of apparel, this means that the inner-facing surface of the article of apparel may pill to a greater extent than the outer-facing surface of the article of apparel. The differential pilling may, in example aspects, be due to use of silicone-coated fibers for the second entangled web that forms, in part, the second face of the nonwoven textile. The silicone coating may increase the tendency of the fibers to migrate (i.e., there is less friction to keep the fibers entangled) such that the fiber ends become exposed on the second face where they may form pills. In example aspects, the presence of pills may be a desirable aesthetic and factors associated with the selection of the webs and/or entanglement parameters may be adjusted to increase the likelihood of pill formation. Further, having a greater number of pills on an inner-facing surface of an article of apparel formed from the composite nonwoven textile may contribute to wearer comfort similar to that experienced when donning an old sweatshirt. In example aspects, if the formation of pills is not a desired attribute, the composite nonwoven textile may undergo post-processing steps such as ironing, calendaring, embossing, thermal bonding, and/or the application of coatings to the faces of the composite nonwoven textile to increase the resistance to pilling.

Additional manufacturing steps may be implemented to achieve additional desired properties for the resulting nonwoven textile. For example, a needlepunching process typically used to manufacture Dilour carpets may be utilized to form a pile on the second face, and not the first face, of the nonwoven textile. In this aspect, brushes are positioned adjacent to the second face of the nonwoven textile during the needlepunching process. Needles are used to push fibers and/or fiber loops from the webs into the brushes where they are held in place until the needlepunching process is complete. When the nonwoven textile is removed from the brushes, the fibers and/or fiber loops that were held by the brushes are oriented in a common direction that is perpendicular to the surface plane of the second face.

As used herein, the term "article of apparel" is intended to encompass articles worn by a wearer. As such, they may include upper-body garments (e.g., tops, t-shirts, pullovers, hoodies, jackets, coats, and the like), and lower-body garments (e.g., pants, shorts, tights, capris, unitards, and the like). Articles of apparel may also include hats, gloves, sleeves (arm sleeves, calf sleeves), articles of footwear such as uppers for shoes, and the like. The term "inner-facing surface" when referring to the article of apparel means the surface that is configured to face towards a body surface of a wearer, and the term "outer-facing surface" means the surface that is configured to face opposite of the inner-facing surface, away from the body surface of the wearer, and toward an external environment. The term "innermost-facing surface" means the surface closest to the body surface of the wearer with respect to other layers of the article of apparel, and the term "outermost-facing surface" means the surface that is positioned furthest away from the body surface of the wearer with respect to the other layers of the article of apparel.

As used herein, the term "nonwoven textile" refers to fibers that are held together by mechanical and/or chemical interactions without being in the form of a knit, woven, braided construction, or other structured construction. In a particular aspect, the nonwoven textile includes a collection of fibers that are mechanically manipulated to form a mat-like material. Stated differently nonwoven textiles are directly made from fibers. The nonwoven textile may include different webs of fibers formed into a cohesive structure, where the different webs of fibers may have a different or similar composition of fibers and/or different properties. The term "web of fibers" refers to a layer prior to undergoing a mechanical entanglement process with one or more other webs of fibers. The web of fibers includes fibers that have undergone a carding and lapping process that generally aligns the fibers in one or more common directions that extend along an x, y plane and that achieves a desired basis weight. The web of fibers may also undergo a light needling process or mechanical entanglement process that entangles the fibers of the web to a degree such that the web of fibers forms a cohesive structure that can be manipulated (e.g., rolled on to a roller, un-rolled from the roller, stacked, and the like). The web of fibers may also undergo one or more additional processing steps such as printing prior to being entangled with other webs of fibers to form the composite nonwoven textile. The term "entangled web of fibers" when referring to the composite nonwoven textile refers to a web of fibers after it has undergone mechanical entanglement with one or more other webs of fibers. As such, a web of entangled fibers may include fibers originally present in the web of fibers forming the layer as well as fibers that are present in other webs of fibers that have been moved through the entanglement process into the web of entangled fibers.

The mechanical entanglement process contemplated herein may include needle entanglement (commonly known as needlepunching) using barbed or structured needles (e.g., forked needles), or fluid entanglement. In aspects contemplated herein, needlepunching may be utilized based on the small denier of the fibers being used and the ability to fine tune different parameters associated with the needlepunching process. Needlepunching generally uses barbed or spiked needles to reposition a percentage of fibers from a generally horizontal orientation (an orientation extending along an x, y plane) to a generally vertical orientation (a z-direction orientation). Referring to the needlepunching process in general, the carded, lapped, and pre-needled webs may be stacked with other carded, lapped, and pre-needled webs and other layers such as an elastomeric layer and passed between a bed plate and a stripper plate positioned on opposing sides of the stacked web configuration. Barbed needles, which are fixed to a needle board, pass in and out through the stacked web configuration, and the stripper plate strips the fibers from the needles after the needles have moved in and out of the stacked web configuration. The distance between the stripper plate and the bed plate may be adjusted to control web compression during needling. The needle board repeatedly engages and disengages from the stacked web configuration as the stacked web configuration is moved in a machine direction along a conveyance system such that the length of the stacked web configuration is needled. Aspects herein contemplate using multiple needle boards sequentially positioned at different points along the conveyance system where different needle boards may engage the stacked web configuration from different faces of the stacked web configuration (e.g., an upper face and a lower face with respect to the conveyance system) as the stacked web configuration moves in the machine direction. Each engagement of a needle board with the stacked web configuration is known herein as a "pass." Parameters associated with particular needle boards may be adjusted to achieve desired properties of the resulting needled nonwoven textile (e.g., basis weight, thickness, and the like). The different parameters may include stitch density (SD) which is the number of needles per $cm^2$ ($n/cm^2$) used during an entanglement pass and penetration depth (PD) which is how far the needle passes through the stacked web configuration before being pulled out of the stacked web configuration. Parameters associated with the needlepunching process in general may also be adjusted such as the spacing between the bed plate and the stripper plate and the speed of conveyance of the stacked web configuration.

Aspects herein contemplate using a barbed needle (a needle having a pre-set number of barbs arranged along a length of the needle) although other needle types are contemplated herein. The barbs on the needle "capture" fibers as the barb moves from a first face to an opposing second face of the stacked web configuration. The movement of the needle through the stacked web configuration effectively moves or pushes fibers captured by the barbs from a location near or at the first face to a location near or at the second face and further causes physical interactions with other fibers helping to "lock" the moved fibers into place through, for example, friction. It is also contemplated herein that the needles may pass through the stacked web configuration from the second face toward the first face. In example aspects, the number of barbs on the needle that interact with fibers may be based on the penetration depth of the needle. For example, all the barbs may interact with fibers when the penetration depth is a first amount, and fewer than all the barbs may interact with fibers as the penetration depth decreases. In further example aspects, the size of the barb may be adjusted based on the denier of fibers used in the web(s). For example, the barb size may be selected so as to engage with small denier (e.g. fine) fibers but not with large denier fibers so as to cause selective movement of the small denier fibers but not the large denier fibers. In another example, the barb size may be selected so as to engage with both small denier and large denier fibers so as to cause movements of both fibers through the webs.

After entanglement, the nonwoven textile may include a first face and an opposite second face which both face outward with respect to an interior of the nonwoven textile and comprise the outermost faces of the nonwoven textile. As such, when viewing the nonwoven textile, the first face and the second face are each fully visible. The first face and the second face may both extend along x, y planes that are generally parallel and offset from each other. For instance, the first face may be oriented in a first x, y plane and the second face may be oriented in a second x, y plane generally parallel to and offset from the first x, y plane.

The term "elastomeric layer" as used herein refers to a layer that has stretch and recovery properties (i.e., is elastically resilient) in at least one orientational axis, which includes both a layer having stretch and recovery in a single orientational axis and a layer having stretch and recovery in multiple orientational axes. Examples of an orientational axis include a length direction, a width direction, an x-direction, a y-direction, and any direction angularly offset from a length direction, a width direction, an x-direction, and a y-direction. The elastomeric layer may be formed from thermoplastic elastomers such as thermoplastic polyurethane (TPU), thermoplastic polyether ester elastomer (TPEE), combinations of TPU and TPEE and the like. The elastomeric layer may comprise a spunbond layer, a meltblown layer, a film, a web, and the like. In example aspects, the elastomeric layer may include a spunbond TPEE or a meltblown TPU. Nonwoven elastomeric materials such as a spunbond TPEE or a meltblown TPU allow for lower basis weights than elastomeric films. As well, they are generally more breathable and permeable due to the fibrous nature of the web versus a film, and they are generally more pliable (i.e., less stiff) than films. These factors (low basis weight, breathable and permeable, pliable) make them ideal for use in the example composite nonwoven textile described herein especially in the apparel context where these are desirable features.

When referring to fibers, the term denier or denier per fiber is a unit of measure for the linear mass density of the fiber and more particularly, it is the mass in grams per 9000 meters of the fiber. In one example aspect, the denier of a fiber may be measured using ASTM D1577-07. The dtex of a fiber is the mass of an individual fiber in grams per 10,000 meter of fiber length. The diameter of a fiber may be calculated based on the fiber's denier and/or the fiber's dtex. For instance, the fiber diameter, d, in millimeters may be calculated using the formula: d=square root of dtex divided by 100. In general, the diameter of a fiber has a direct correlation to the denier of the fiber (i.e., a smaller denier fiber has a smaller diameter). Fibers contemplated herein may be formed of a number of different materials (e.g., cotton, nylon and the like) including polyethylene terephthalate (PET) commonly known as polyester. The PET fibers may include virgin PET fibers (fibers that have not been recycled), and recycled PET fibers. Recycled PET fibers include shredded PET fibers derived from shredded articles and re-extruded PET fibers (fibers that are re-extruded using recycled PET chips).

The term "silicone-coated fiber" as used herein may mean a fiber having a continuous silicone coating such that the silicone coating completely covers the fiber along its length. In one example, the fiber may form a core and the silicone may form a sheath surrounding the core. In other example aspects, the term "silicone-coated fiber" may mean a fiber that has an intermittent coating of silicone in at least some areas along the length of the fiber. For instance, the fiber may be sprayed with a silicone coating. In this aspect, if a particular web of fibers includes 100% by weight of silicone-coated fibers, it is contemplated herein that the fibers that form the web may have areas that do not include the silicone coating. It is contemplated herein that the silicone-coated fibers are incorporated into the webs of fibers that form the composite nonwoven textile. Said differently, the silicone coating on the fibers is not applied to the fibers after the composite nonwoven textile is formed using, for example, a silicone spray finish.

The term "color" or "color property" as used herein when referring to the nonwoven textile generally refers to an observable color of fibers that form the textile. Such aspects contemplate that a color may be any color that may be afforded to fibers using dyes, pigments, and/or colorants that are known in the art. As such, fibers may be configured to have a color including, but not limited to red, orange, yellow, green, blue, indigo, violet, white, black, and shades thereof. In one example aspect, the color may be imparted to the fiber when the fiber is formed (commonly known as dope dyeing). In dope dyeing, the color is added to the fiber as it is being extruded such that the color is integral to the fiber and is not added to the fiber in a post-formation step (e.g., through a piece dyeing step).

Aspects related to a color further contemplate determining if one color is different from another color. In these aspects, a color may comprise a numerical color value, which may be determined by using instruments that objectively measure and/or calculate color values of a color of an object by standardizing and/or quantifying factors that may affect a perception of a color. Such instruments include, but are not limited to spectroradiometers, spectrophotometers, and the like. Thus, aspects herein contemplate that a "color" of a textile provided by fibers may comprise a numerical color value that is measured and/or calculated using spectroradiometers and/or spectrophotometers. Moreover, numerical color values may be associated with a color space or color model, which is a specific organization of colors that provides color representations for numerical color values, and thus, each numerical color value corresponds to a singular color represented in the color space or color model.

In these aspects, a color may be determined to be different from another color if a numerical color value of each color differs. Such a determination may be made by measuring and/or calculating a numerical color value of, for instance, a first textile having a first color with a spectroradiometer or a spectrophotometer, measuring and/or calculating a numerical color value of a second textile having a second color with the same instrument (i.e., if a spectrophotometer was used to measure the numerical color value of the first color, then a spectrophotometer is used to measure the numerical color value of the second color), and comparing the numerical color value of the first color with the numerical color value of the second color. In another example, the determination may be made by measuring and/or calculating a numerical color value of a first area of a textile with a spectroradiometer or a spectrophotometer, measuring and/or calculating a numerical color value of a second area of the textile having a second color with the same instrument, and comparing the numerical color value of the first color with the numerical color value of the second color. If the numerical color values are not equal, then the first color or the first color property is different than the second color or the second color property, and vice versa.

Further, it is also contemplated that a visual distinction between two colors may correlate with a percentage difference between the numerical color values of the first color and the second color, and the visual distinction will be greater as the percentage difference between the color values increases. Moreover, a visual distinction may be based on a comparison between colors representations of the color values in a color space or model. For instance, when a first color has a numerical color value that corresponds to a represented color that is black or navy and a second color has a numerical color value that corresponds to a represented color that is red or yellow, a visual distinction between the first color and the second color is greater than a visual distinction between a first color with a represented color that is red and a second color with a represented color that is yellow.

The term "pill" or "pilling" as used herein refers to the formation of small balls of fibers or fibers ends on a facing side of the nonwoven textile. The pill may extend away from a surface plane of the face. Pills are generally formed during normal wash and wear due to forces (e.g., abrasion forces) that cause the fiber ends to migrate through the face of the nonwoven textile and entangle with other fiber ends. A textile's resistance to pilling may be measured using standardized tests such as Random Tumble and Martindale Pilling tests. The term "pile" as used herein generally refers to a raised surface or nap of a textile consisting of upright loops and/or terminal ends of fibers that extend from a face of the textile in a common direction.

Various measurements are provided herein with respect to the pre-entangled webs and the resulting composite nonwoven textile. A thickness of the resulting composite nonwoven may be measured using a precision thickness gauge. To measure thickness, for example, the textile may be positioned on a flat anvil and a pressure foot is pressed on to it from the upper surface under a standard fixed load. A dial indicator on the precision thickness gauge gives an indication of the thickness in mm. Basis weight is measured using ISO3801 testing standard and has the units grams per square meter (gsm). Textile stiffness, which generally corresponds to drape is measured using ASTMD4032 (2008) testing standard and has the units kilogram force (Kgf). Fabric growth and recovery is measured using ASTM2594 testing standard and is expressed as a percentage. The term "stretch" as used herein means a textile characteristic measured as an increase of a specified distance under a prescribed tension and is generally expressed as a percentage of the original benchmark distance (i.e., the resting length or width). The term "growth" as used herein means an increase in distance of a specified benchmark (i.e., the resting length or width) after extension to a prescribed tension for a time interval followed by the release of tension and is usually expressed as a percentage of the original benchmark distance. "Recovery" as used herein means the ability of a textile to return to its original benchmark distance (i.e., its resting length or width) and is expressed as a percentage of the original benchmark distance. Thermal resistance, which generally corresponds to insulation features, is measured using ISO11092 testing standard and has the units of RCT ($M^2$*K/W).

Unless otherwise noted, all measurements provided herein are measured at standard ambient temperature and pressure (25 degrees Celsius or 298.15 K and 1 bar) with the nonwoven textile in a resting (un-stretched) state.

FIG. 1 is a schematic depiction of an example lifecycle for the composite nonwoven textile contemplated herein. Reference numeral 100 generally indicates a first web of fibers 110, a second web of fibers 112, a third web of fibers 114, and an elastomeric layer 116 in a stacked configuration prior to entanglement. It is contemplated herein that in some example aspects, one or more of the webs of fibers may be optional. In example aspects, the fibers used to form the first, second, and third web of fibers 110, 112, and 114 may include recycled fibers and, in particular, recycled PET fibers. Additionally, the elastomeric layer 116, in example aspects, may be formed of a material that is recyclable. Arrow 118 schematically represents an entanglement step where the fibers in the first web of fibers 110, the second web of fibers, 112, and the third web of fibers 114 are entangled with each other such that one or more of the fibers extend through the elastomeric layer 116 to form a cohesive composite nonwoven textile 120. Arrow 122 schematically represents a processing step where the composite nonwoven textile 120 is formed into an article of apparel 124. Although the article of apparel 124 is shown as an upper-body garment, it is contemplated herein that the article of apparel 124 may take other forms such as a lower-body garment, an upper of a shoe, a hat, gloves, sleeves, and the like. At the end of the life of the article of apparel 124, it is contemplated that a wearer may return the article of apparel 124 to, for example, the manufacturer/retailor where the article of apparel 124 may be fully recycled as indicated by arrow 126 to form shredded fibers and/or re-extruded fibers that are used to form webs of fibers such as the webs of fibers 110, 112, and 114 and potentially an elastomeric layer such as the elastomeric layer 116 thus creating a self-sustaining loop. This self-sustaining loop reduces the carbon impact typically associated with creating articles of apparel including knit, woven, and nonwoven articles of apparel.

Figure 2:
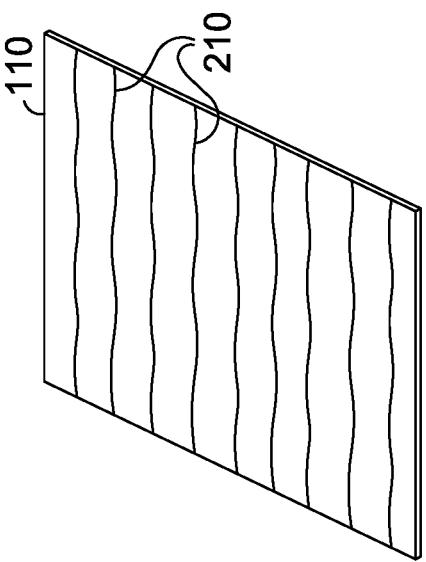
FIG. 2 illustrates a first web of fibers for use in the example composite nonwoven textile of FIG. 1 in accordance with aspects herein.

FIG. 2 depicts the first web of fibers 110 prior to being entangled with other webs. In example aspects, properties associated with the first web of fibers 110 may be selected to achieve desired end properties for the composite nonwoven textile 120. As discussed above, when entangled with other webs, it is contemplated herein that the first web of fibers 110 forms a first face of the composite nonwoven textile 120. When the composite nonwoven textile 120 is formed into an article of apparel, it is contemplated that the first face forms an outer-facing surface, and in some aspects an outermost-facing surface of the article of apparel. As such, desired properties associated with the first web of fibers 110 include, for example, durability and resistance to abrasion and coverage for modesty. In example aspects, the first web of fibers 110 has a basis weight of from about 20 grams per square meter (gsm) to about 150 gsm, from about 35 gsm to about 65 gsm, from about 40 gsm to about 60 gsm, from about 45 gsm to about 55 gsm, or about 50 gsm. As used herein, the term "about" means generally within ±10% of an indicated value unless indicated otherwise. Targeting a basis weight in this range for the first web of fibers 110 provides for a resulting nonwoven textile having a basis weight in a desired range after the first web of fibers 110 is combined with other webs and/or elastomeric layers.

The first web of fibers 110 is formed of fibers, such as fibers 210 (depicted schematically) that may be oriented generally in a common direction, or two or more common directions, due to a carding and cross-lapping process. In example aspects, the fibers 210 may include PET fibers (recycled or virgin) although other virgin and recycled fiber types are contemplated herein (e.g., polyamide, cotton, and the like). In one example aspect, the fibers 210 may include 100% by weight of recycled fibers such as 100% by weight of recycled PET fibers. However, in other aspects, the fibers 210 may include 100% by weight virgin fibers, or other combinations of virgin and recycled fibers, as desired. The staple length of the fibers 210 may range from about 40 mm to about 60 mm, from about 45 mm to about 55 mm, or about 51 mm. Use of this fiber length provides optimal entanglement. For instance, when below 40 mm, the fibers may not have sufficient length to become entangled, and when above 60 mm, the fibers may actually become un-entangled when the needle is withdrawn from the nonwoven textile during entanglement. In example aspects, the fibers 210 may comprise a uniform length such as when the fibers are formed from virgin extruded PET or re-extruded PET and cut to a defined length. In other aspects, the fibers 210 may include a variation of staple length such as when the fibers 210 are derived from a shredded fiber source. Any and all aspects, and any variation thereof, are contemplated as being within aspects herein.

The fibers 210 may include a denier of greater than or equal to about 1.2 D, or from about 1.2 D to about 3.5 D, from about 1.2 D to about 1.7 D, from about 1.3 D to about 1.6 D, or about 1.5 D. Utilizing a denier within this range makes the fibers 210 less susceptible to breakage which, in turn, enhances the durability and abrasion resistance of the first face of the composite nonwoven textile 120. Moreover, selecting a denier within this range while still achieving the basis weight of the first web of fibers 110 provides good, uniform coverage of the first face which helps enhance the durability features of the first face. Selecting a denier of greater than, for instance 3.5 D while still maintaining the basis weight for the first web of fibers 110 may not provide uniform coverage for the first face.

In example aspects, the fibers 210 used to form the first web of fibers 110 may include a first color property. The first color property may be imparted to the fibers 210 during, for example, the extrusion process when the fibers 210 are being formed such that the fibers 210 are dope dyed. In one example aspect, the color property may be white although other colors are contemplated herein. Forming the composite nonwoven textile 120 using dope dyed fibers eliminates post-processing dyeing steps which further helps to reduce the carbon footprint of the nonwoven textile 120. For example, it is contemplated herein that the composite nonwoven textile 120 is not piece dyed.

Figure 3:
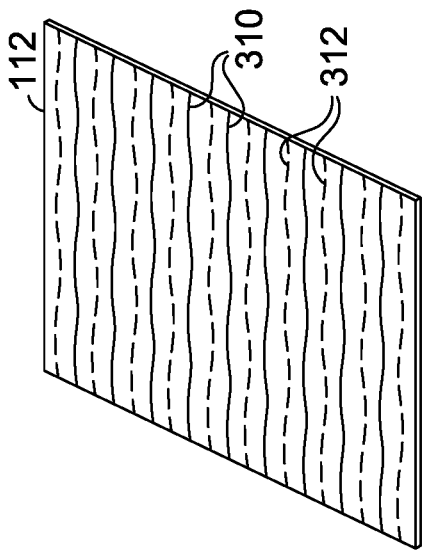
FIG. 3 illustrates a second web of fibers for use in the example composite nonwoven textile of FIG. 1 in accordance with aspects herein.

FIG. 3 depicts the second web of fibers 112 prior to being entangled with other webs. In example aspects, properties associated with the second web of fibers 112 may be selected to achieve desired end properties for the composite nonwoven textile 120. As discussed above, when entangled with other webs, it is contemplated herein that the second web of fibers 112 forms an opposite second face of the composite nonwoven textile 120. When the composite nonwoven textile 120 is formed into an article of apparel, it is contemplated herein that the second face forms an inner-facing surface, and in some aspects an innermost-facing surface of the article of apparel. As such, properties associated with the second web of fibers 112 include, for example, a soft hand or feel. In example aspects, the second web of fibers 112 has a basis weight of from about 20 gsm to about 150 gsm, from about 35 grams per square meter (gsm) to about 65 gsm, from about 40 gsm to about 60 gsm, from about 45 gsm to about 55 gsm, or about 50 gsm. In example aspects, the second web of fibers 112 has generally the same basis weight as the first web of fibers 110. Targeting a basis weight in this range for the second web of fibers 112 provides for a resulting nonwoven textile having a basis weight in a desired range after the second web of fibers 112 is combined with other webs and/or elastomeric layers.

In example aspects, the second web of fibers 112 may be formed of two types of fibers, such as fibers 310 (depicted schematically) and fibers 312 (depicted schematically) that may be oriented generally in a common direction, or two or more common directions, due to a carding and cross-lapping process. In example aspects, the fibers 310 may include PET fibers (recycled or virgin) although other virgin and recycled fiber types are contemplated herein (e.g., polyamide, cotton, and the like). In one example aspect, the fibers 310 may include 100% by weight of recycled fibers such as 100% by weight of recycled PET fibers. However, in other aspects, the fibers 310 and/or 312 may include 100% by weight virgin fibers, or other combinations of virgin and recycled fibers, as desired.

The fibers 312 are shown in dashed line to indicate that they have different features than the fibers 310. For example, the fibers 312 include silicone-coated fibers. The fibers 312 may be coated with silicone prior to incorporating the fibers 312 into the second web of fibers 112. In example aspects, the second web of fibers 112 may include about 10% to about 95% by weight of the fibers 312, about 40% by weight of the fibers 310 and about 60% by weight of the fibers 312, about 45% by weight of the fibers 310 and about 55% by weight of the fibers 312, about 50% by weight of the fibers 310 and about 50% by weight of the fibers 312, about 55% by weight of the fibers 310 and about 45% by weight of the fibers 312, or about 60% by weight of the fibers 310 and about 40% by weight of the fibers 312. In particular aspects, the second web of fibers 112 may include about 50% by weight of the fibers 310 and about 50% by weight of the fibers 312. As stated, it is contemplated herein that the fibers 312 may be intermittently coated with silicone along their length, or the fibers 312 may have a core/sheath configuration. Utilizing the fibers 312 in the ranges above provides a good hand feel to the second face formed by the second web of fibers 112. It also provides a good drape to the composite nonwoven textile 120. Stated differently, the resulting nonwoven textile 120 is not as stiff as traditional nonwovens used in the cleaning space and the personal hygiene space. Further, utilizing the fibers 310 and the fibers 312 in the ranges above may reduce the amount of needle force needed to entangle the web of fibers described herein since the silicone-coated fibers may move more easily during the entanglement process. When incorporating silicone-coated fibers below the ranges described above, the second face may feel dry and uncomfortable during wear. Conversely, when incorporating silicone-coated fibers above the ranges described above, the second face may feel slick, which also may be unpleasant to a wearer. Moreover, using silicone-coated fibers above the ranges described above may make the carding process difficult since the card wires may not be able to frictionally engage with the fibers to achieve a uniform carded web. In addition, using silicone-coated fibers above the ranges described above may also fail to create adequate entanglement between the fibers since frictional forces are reduced due to the silicone thus impacting the structural integrity of the composite nonwoven textile 120.

Utilizing the silicone-coated fibers 312 eliminates the need for adding a silicone finish to the composite nonwoven textile 120 in a post-processing step. As known in the textile space, it is common practice to add silicone softener finishes to knitted or woven products in a post-processing step. By eliminating this step, the carbon footprint of the composite nonwoven textile 120 is further reduced.

The staple length of each of the fibers 310 and 312 may range from about 40 mm to about 60 mm, from about 45 mm to about 55 mm, or about 51 mm. Similar to the fibers 210, this length may provide for optimal entanglement. In example aspects, the fibers 310 and/or 312 may comprise a uniform length such as when the fibers are formed from virgin extruded PET or re-extruded PET and cut to a defined length. In other aspects, the fibers 310 and/or 312 may include a variation of staple length such as when the fibers 310 and/or 312 are derived from a shredded fiber source. Any and all aspects, and any variation thereof, are contemplated as being within aspects herein.

Each of the fibers 310 and 312 may include a denier of less than or equal to about 1 D. For example, the denier may be about 0.1 D, about 0.2 D, about 0.3 D, about 0.4 D, about 0.5 D, about 0.6 D, about 0.7 D, about 0.8 D, or about 0.9 D. In example aspects, the denier of the fibers 310 and 312 may be from about 0.6 D to about 1 D, from about 0.7 D to about 0.9 D, or about 0.8 D. Utilizing a denier within this range helps to provide a soft feel or hand to the second face formed from the second web of fibers 112. Moreover, selecting a denier within this range while still achieving the basis weight of the second web of fibers 112 provides good coverage of the second face.

In example aspects, each of the fibers 310 and 312 used to form the second web of fibers 112 may include a color property which may be the same or different. In example aspects, both of the fibers 310 and 312 include the first color property of the fibers 210. Similar to the fibers 210, each of the fibers 310 and 312 may be dope dyed further reducing the need for post-processing dyeing steps for the resulting composite nonwoven textile.

Figure 5:
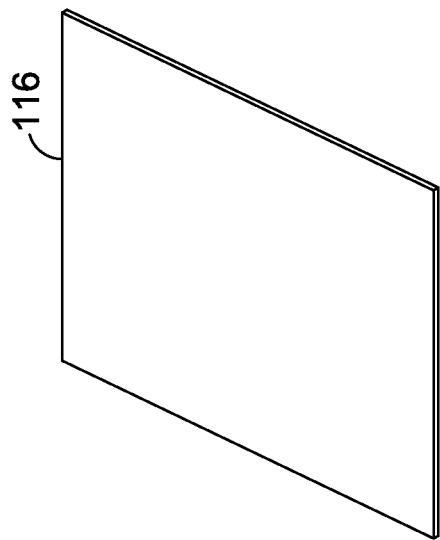
FIG. 5 illustrates an elastomeric layer for use in the example composite nonwoven textile of FIG. 1 in accordance with aspects herein.

FIG. 5 depicts the elastomeric layer 116. In example aspects, the elastomeric layer 116 may have a basis weight from about 20 gsm to about 150 gsm, from about 50 gsm to about 70 gsm, from about 55 gsm to about 65 gsm, or about 60 gsm. The basis weight of the elastomeric layer 116 may be selected to achieve a desired basis weight for the resulting composite nonwoven textile. Aspects herein contemplate forming the elastomeric layer 116 from a thermoplastic elastomer such as a thermoplastic polyurethane (TPU), a thermoplastic polyether ester elastomer (TPEE), combinations of TPU and TPEE, and the like. The elastomeric layer may include a spunbond layer, a meltblown layer, a film, a web, and the like. In a particular example aspect, the elastomeric layer 116 may comprise a TPEE spunbond layer, and in another particular aspect, the elastomeric layer 116 may comprise a TPU meltblown layer. In general, the elastomeric layer 116 is selected to provide desirable stretch and recovery properties to the composite nonwoven textile 120 while generally maintaining structural integrity during the entanglement process. The elastomeric layer 116 may also be selected to have a low basis weight to maintain a low basis weight for the resulting composite nonwoven textile 120, to be breathable and permeable which contributes to the comfort features of an apparel item formed from the composite nonwoven textile 120, and to be pliable to reduce the stiffness of the composite nonwoven textile 120. It is contemplated herein that the elastomeric layer 116 has a color property. In example aspects, the color property may be the first color property associated with the fibers 210, 310, and 312, although different color properties (e.g., a second color property) are contemplated herein.

Figure 4:
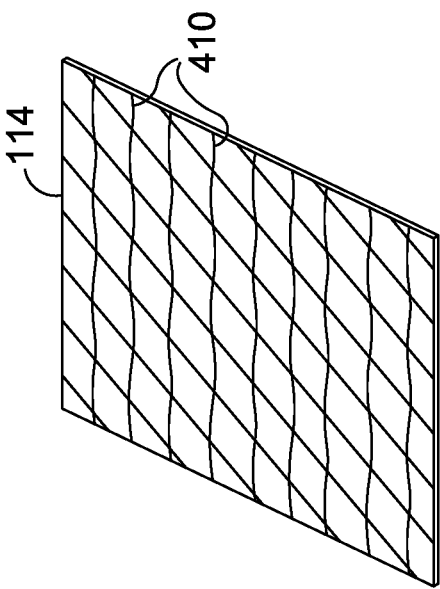
FIG. 4 illustrates a third web of fibers for use in the example composite nonwoven textile of FIG. 1 in accordance with aspects herein.

FIG. 4 depicts the optional third web of fibers 114 prior to being entangled with other webs. When incorporated into the composite nonwoven textile 120, it is contemplated herein that the third web of fibers 114 is positioned between the first web of fibers 110 and the second web of fibers 112. In example aspects, properties associated with the third web of fibers 114 may be selected to achieve desired end properties for the composite nonwoven textile 120. In example aspects, the third web of fibers 114 may be incorporated into the composite nonwoven textile 120 to achieve a desired basis weight for the composite nonwoven textile 120, to achieve a desired thickness for the composite nonwoven textile 120, to achieve a desired insulation property for the composite nonwoven textile 120, to achieve a desired pile for the composite nonwoven textile 120, and the like. As explained further below, to impart a visual aesthetic to the composite nonwoven textile 120, fibers forming the third web of fibers 114 may have a different color property than fibers used to form the first web of fibers 110 and the second web of fibers 112. Similar to the first web of fibers 110 and the second web of fibers 112, the third web of fibers 114 has a basis weight of from about 20 gsm to about 150 gsm, from about 35 grams gsm to about 65 gsm, from about 40 gsm to about 60 gsm, from about 45 gsm to about 55 gsm, or about 50 gsm. Targeting a basis weight in this range for the third web of fibers 110 provides for a resulting nonwoven textile having a basis weight in a desired range after the third web of fibers 114 is combined with other webs and/or elastomeric layers.

The third web of fibers 114 is formed of fibers, such as fibers 410 (depicted schematically) that may be oriented generally in a common direction, or two or more common directions, due to a carding and cross-lapping process. In example aspects, the fibers 410 may include PET fibers (recycled or virgin) although other virgin and recycled fiber types are contemplated herein (e.g., polyamide, cotton, and the like). In one example aspect, the fibers 410 may include 100% by weight of recycled fibers such as 100% by weight of recycled PET fibers. However, in other aspects, the fibers 410 may include 100% by weight virgin fibers, or other combinations of virgin and recycled fibers, as desired. Similar to the fibers 210, 310 and 312, the staple length of the fibers 410 may range from about 40 mm to about 60 mm, from about 45 mm to about 55 mm, or about 51 mm. In example aspects, the fibers 410 may comprise a uniform length such as when the fibers are formed from virgin extruded PET or re-extruded PET and cut to a defined length. In other aspects, the fibers 410 may include a variation of staple length such as when the fibers 410 are derived from a shredded fiber source. Any and all aspects, and any variation thereof, are contemplated as being within aspects herein.

The fibers 410 may include a denier of greater than or equal to about 1.2 D, from about 1.2 D to about 3.5 D, from about 1.3 D to about 1.6 D, or about 1.5 D. Utilizing a denier within this range makes the fibers 410 less susceptible to breakage which, in turn, enhances the durability and abrasion resistance of the composite nonwoven textile 120. Since the third web of fibers 114, when used, is positioned between the first web of fibers 110 and the second web of fibers 112, having a soft hand is not as important as, for example, the second web of fibers 112. Selecting a denier within this range while still achieving the basis weight of the third web of fibers 114 enhances the overall coverage and/or opacity of the composite nonwoven textile 120.

In example aspects, the fibers 410 used to form the third web of fibers 114 may include a second color property different from the first color property. This is depicted in FIG. 4 through the use of diagonal shading lines. It is contemplated herein that the fibers 410 are dope dyed further reducing the carbon footprint of the composite nonwoven textile 120. As will be explained in greater detail below, during the entanglement of the first, second, and third webs of fibers 110, 112 and 114, the fibers 410 may be moved more toward one face than the other face such that the second color property is visually discernible or distinguishable to a greater degree on the one face compared to the other face. It is contemplated herein that the fibers 210 of the first web of fibers 110, the fibers 310 of the second web of fibers 112, and the fibers 410 of the third web of fibers 114 are not coated with silicone.

Figure 6:
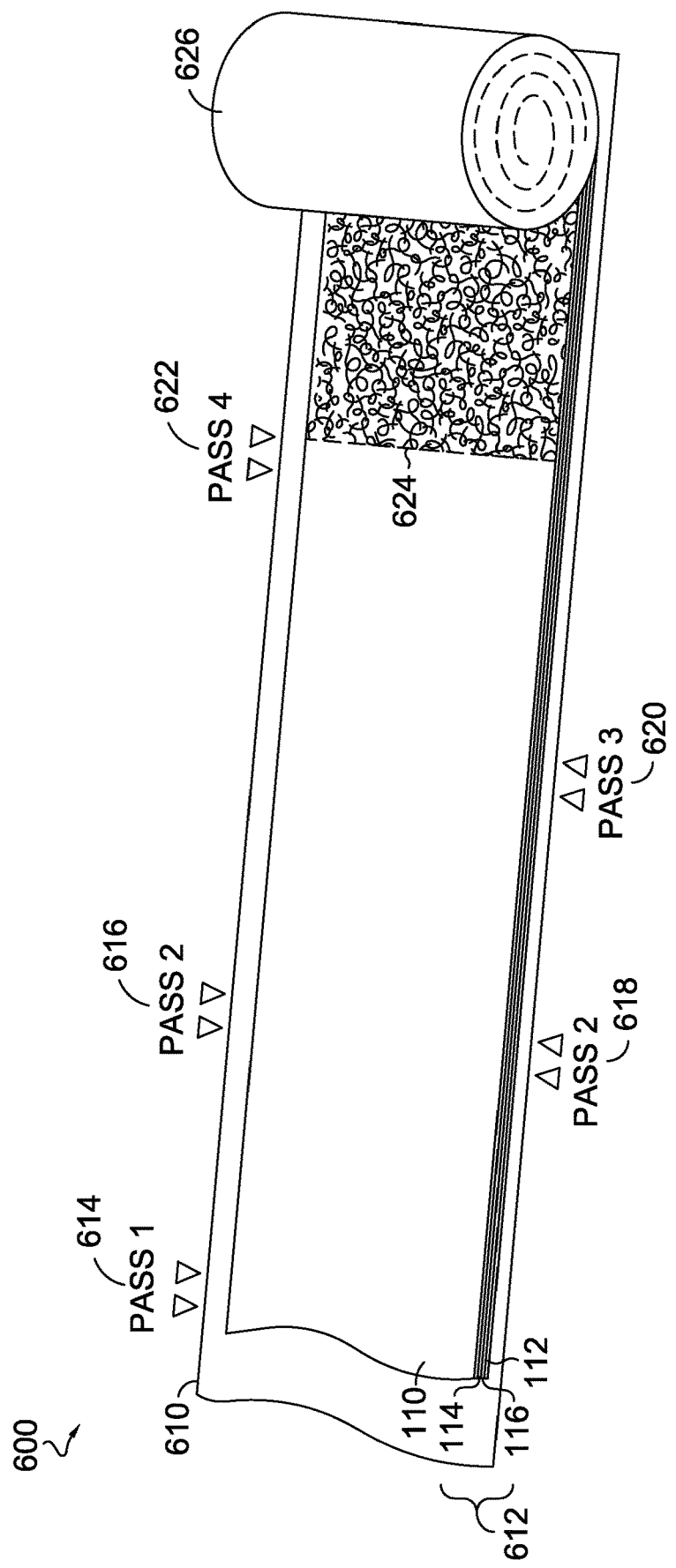
FIG. 6 illustrates an example manufacturing process for use in making the example composite nonwoven textile of FIG. 1 in accordance with aspects herein.

FIG. 6 illustrates an example manufacturing process, referenced generally by the numeral 600, for use in making the example composite nonwoven textile 120. The depiction of the manufacturing components in FIG. 6 is illustrative only and is meant to convey general features of the manufacturing process 600. FIG. 6 depicts a conveyance system 610 that transports a stacked configuration 612 of the first web of fibers 110, the second web of fibers 112, the third web of fibers 114, and the elastomeric layer 116 in a machine direction. In one example aspect, the third web of fibers 114 is positioned between the first web of fibers 110 and the elastomeric layer 116 as shown. In another example aspect, the third web of fibers 114 is positioned between the second web of fibers 112 and the elastomeric layer 116. As described, each of the first web of fibers 110, the second web of fibers 112, and the third web of fibers 114 has been carded and lapped to achieve a desired basis weight. As well, each of the webs 110, 112, and 114 has been lightly needled to achieve a cohesive structure. Because the fibers in each of the first, second, and third web of fibers 110, 112, and 114 are in a generally loose web state, they are available for movement during the needle entanglement process. In example aspects, the conveyance system 610 may convey the stacked configuration 612 at a rate from about 2 m/min to about 2.5 m/min, from about 2.1 m/min to about 2.4 m/min, or about 2.3 m/min. This rate provides for a needed level of entanglement via needle beds to produce desired end properties of the composite nonwoven textile (e.g., basis weight, thickness, growth and recovery). Slower rates may cause increased entanglement, which impacts the desired end properties of the composite nonwoven textile 120, and increased rates may be cause insufficient entanglement which also impacts the desired end properties of the composite nonwoven textile 120.

The stacked configuration 612 passes a first needle board indicated as Pass 1 at reference numeral 614. The needles used in the needle boards of the manufacturing process 600 may be selected to optimally interact with the specific denier of the fibers used in the first, second, and third web of fibers 110, 112, and 114. They also may be selected to include a desired number of barbs to achieve a desired degree of entanglement. In example aspects, Pass 1 614 occurs from the first web of fibers 110 in a direction toward the second web of fibers 112 and functionally has the effect of moving and entangling the fibers 210 from the first web of fibers 110 into the third web of fibers 114 and into the second web of fibers 112 and further moving and entangling the fibers 410 from the third web of fibers 114 into the second web of fibers 112. Having Pass 1 614 occur in this direction helps to ensure that the barbs are full of fibers from the first web of fibers 110 and, optionally, the third web of fibers 114 before contacting the elastomeric layer 116 thereby reducing the chances of empty barbs cutting the elastomeric layer 116 and impacting the resulting growth and recovery properties of the composite nonwoven textile 120.

In example aspects, Pass 1 614 may have a stitch density from about 40 n/cm$^2$ to about 60 n/cm$^2$, from about 45 n/cm$^2$ to about 55 n/cm$^2$, or about 50 n/cm$^2$. The penetration depth for Pass 1 614 may be from about 10 mm to about 14 mm, from about 11 mm to about 13 mm, or about 12 mm. A penetration depth of this amount, in example aspects, will generally engage all the barbs of the needles. In one example aspect, all the barbs may comprise five barbs. This penetration depth ensures that the needles pass entirely through the stacked configuration 612 such that fibers in each of the webs 110, 112, and 114 are engaged with the needles. Stated differently, having a penetration depth as described for Pass 1 614 ensures that at least some of the fibers 210 from the first web of fibers 110 are entangled with the fibers 410 of the third web of fibers 114 and entangled with the fibers 310 and 312 of the second web of fibers 112, and at least some of the fibers 410 of the third web of fibers 114 are entangled with the fibers 310 and 312 of the second web of fibers 112. In example aspects, there is an inverse relationship between stitch density and penetration depth. This is to avoid overworking the fibers and potentially breaking them. Stated differently, when penetration depth is high as with Pass 1 614, the stitch density is lower to avoid potentially breaking the fibers. After Pass 1 614 is complete, the stacked configuration 612 may have a decreased thickness due to the z-direction movement and entanglement of the fibers from the different webs. The stacked configuration 612 may also grow slightly in the cross-machine direction due to cross-machine draft.

Pass 2 indicated by reference numbers 616 and 618, which occurs subsequent to (i.e., temporally after) Pass 1, occurs from both sides of the stacked configuration 612 in an alternating manner. Stated differently, Pass 2 occurs from both the first web of fibers 110 toward the second web of fibers 112 (reference numeral 616) and from the second web of fibers 112 toward the first web of fibers 110. Thus, Pass 2 616 acts to move the fibers 210 from the first web of fibers 110 into the third web of fibers 114 and into the second web of fibers 112. It also moves the fibers 410 from the third web of fibers 114 through the elastomeric layer 116 and into the second web of fibers 112. Pass 2 618 moves the fibers 310 and 312 through the elastomeric layer 116 and into the third web of fibers 114 and into the first web of fibers 110.

Both Pass 2 616 and Pass 2 618 have a stitch density of from about 40 n/cm$^2$ to about 60 n/cm$^2$, from about 45 n/cm$^2$ to about 55 n/cm$^2$, or about 50 n/cm$^2$. Keeping the stitch density relatively low helps to prevent overworking of the elastomeric layer 116 and thus helps to maintain the desired growth and recovery properties for the resulting composite nonwoven textile 120. The penetration depth for Pass 2 616 and Pass 2 618 is from about 6 mm to about 8 mm. In one example aspect, the penetration depth for Pass 2 616 is about 6 mm, and the penetration depth for Pass 2 618 is about 8 mm. In another example aspect, the penetration depth for Pass 2 616 is about 8 mm, and the penetration depth for Pass 2 618 is about 6 mm. Because the thickness of the stacked configuration 612 is decreased because of Pass 1 614, the penetration depth is reduced for Pass 2 616 and Pass 2 618. It is contemplated herein that the penetration depth for Pass 2 616 and Pass 2 618 is sufficient such that the needles pass completely through the stacked configuration 612. In one example aspect, when the penetration depth is 8 mm, it is contemplated herein that three of the needle barbs are engaged, and when the penetration depth is 6 mm, it is contemplated herein that two of the needle barbs are engaged. After Pass 2 616 and Pass 2 618 are complete, the stacked configuration 612 has even further reduced thickness compared to the stacked configuration 612 after Pass 1 614 and may grow slightly in the cross-machine direction. The end result of Pass 2 216 and Pass 2 618 is further entanglement of the fibers forming the first web of fibers 110, the second web of fibers 112, and the third web of fibers 114.

Pass 3 which is indicated by reference numeral 620, occurs subsequent to Pass 2 616 and Pass 2 618 and occurs from the second web of fibers 112 toward the first web of fibers 110. The stitch density for Pass 3 620 is from about 175 n/cm$^2$ to about 225 n/cm$^2$, from about 180 n/cm$^2$ to about 220 n/cm$^2$, from about 190 n/cm$^2$ to about 210 n/cm$^2$, or about 200 n/cm$^2$. The higher stitch density of Pass 3 620 achieves a more uniform texturing or working of the stacked configuration 612 compared to passes with lower stitch densities such as Pass 1 614, Pass 2 616, and Pass 3 618. The penetration depth for Pass 3 620 is from about 1 mm to about 5 mm, from about 2 mm to about 4 mm, or about 3 mm. In example aspects, this engages one barb of the needle. The purpose of Pass 3 620 is to tuck some of the fibers into the stacked configuration 612 that are present on the face of the second web of fibers 112 without necessarily creating more entanglement. Said differently, Pass 3 620 helps to reduce the hairiness on the face of the second web of fibers 112.

Pass 4 which is indicated by reference numeral 622, occurs subsequent to Pass 3 620 and occurs from the first web of fibers 110 toward the second web of fibers 112. Similar to Pass 3 620, the stitch density for Pass 4 622 is from about 175 n/cm$^2$ to about 225 n/cm$^2$, from about 180 n/cm$^2$ to about 220 n/cm$^2$, from about 190 n/cm$^2$ to about 210 n/cm$^2$, or about 200 n/cm$^2$. Also similar to Pass 3 620, the penetration depth for Pass 4 622 is from about 1 mm to about 5 mm, from about 2 mm to about 4 mm, or about 3 mm. In example aspects, this engages one barb of the needle. The purpose of Pass 4 622 is to tuck some of the fibers into the stacked configuration 612 that are present on the face of the first web of fibers 110 without necessarily creating more entanglement. Stated differently, Pass 4 622 helps to reduce the hairiness on the face of the first web of fibers 110. In total, the overall stitch density for the composite nonwoven textile 120 is about 550 with a stitch density of about 300 on the first face formed, at least in part, from the first web of fibers 110 and a stitch density of about 250 on the second face formed, at least in part, from the second web of fibers 112. An overall stitch density of 550 is lower than stitch densities associated with typical nonwovens such as felts in order to achieve more loft and a better hand feel. Moreover, having a lower overall stitch density works less of the fibers such that the fibers from the different webs 110, 112, and 114 are unevenly distributed through the composite nonwoven textile 120, which produces, at least in part, the asymmetric features associated with the different faces. As a result of the different entanglement passes, some of the fibers forming the composite nonwoven textile 120 may be broken such that a staple length of at least some of the fibers forming the composite nonwoven textile 120 may be from about 30 mm to about 45 mm.

After Pass 4 622, in example aspects, the entanglement process is complete and the composite nonwoven textile 120 is formed. This is schematically illustrated by the dashed line 624. After Pass 4 622, in example aspects, the composite nonwoven textile 120 may have grown in the machine direction (i.e., the length direction) and in the cross-machine direction (i.e., the width direction). This concept is known as machine drafting. For example, growth in the cross-machine direction may occur because as the needle passes through the webs of fibers 110, 112, and 114, it creates a void which is filled with fibers which may cause a gradual increase in width dependent upon the stitch density. Growth in the machine direction generally depends on the rate of conveyance and the penetration depth. The stacked configuration 612 continues to move during the entanglement process so an increase in penetration depth may cause a deflection of the fibers based on the dwell time of the needle (i.e., the conveyance rate). This stretches the composite nonwoven textile 120 in the machine direction.

In further example aspects, the composite nonwoven textile 120 exhibits a greater resistance to stretch in the length direction (i.e., the machine direction) compared to the width direction (i.e., the cross-machine direction). Stated differently, the textile 120 exhibits an anisotropic stretch property. This difference may be due to the machine drafting as discussed above. For instance, the growth in the machine direction may place the fibers forming the first, second, and third webs 110, 112, and 114 under tension resulting in a greater stretch resistance in the machine direction. This anisotropic stretch feature may impact how pattern pieces are cut and positioned on an article of apparel. For example, with respect to an article of apparel such as an upper-body garment, a greater degree of stretch is generally desired in the horizontal direction (e.g., from a first sleeve opening to a second sleeve opening) compared to the vertical direction (e.g., from a neck opening to a waist opening). Thus, a pattern piece for the upper-body garment would be cut and positioned such that the width of the textile 120 would extend in the horizontal direction and the length of the textile 120 would extend in the vertical direction. Stated differently, the cross-machine direction of the textile 120 would extend in the horizontal direction and the machine direction of the textile 120 would extend vertically.

In example aspects, after entanglement, the composite nonwoven textile 120 is ironed. The ironing process, in example aspects, may help to flatten terminal fiber ends extending from facing surfaces of the composite nonwoven textile 120 such that the terminal fiber ends are generally planar with the faces of the composite nonwoven textile 120. This, in turn, may reduce pilling tendencies. Moreover, the ironing process may utilize rollers, and as the composite nonwoven textile 120 wraps around the rollers under tension and is pre-strained, some of the fiber entanglement causes by the manufacturing process 600 may be loosened which may improve the drape and recovery characteristics of the composite nonwoven textile 120. After ironing, the composite nonwoven textile 120 is rolled to form a rolled good 626, which can later be used for forming articles of apparel. It is also contemplated herein that the composite nonwoven textile 120 may undergo processing steps. For example, the composite nonwoven textile 120 may be conveyed to a patterning station where different pattern shapes may be cut from the nonwoven textile 120. The composite nonwoven textile 120 may also be conveyed to a printing station where various prints are applied to faces of the nonwoven textile 120. The nonwoven textile 120 may also be subject to calendaring, embossing, or different coatings to increase resistance to pilling when this attribute is desired. Any and all aspects, and any variation thereof, are contemplated as being within aspects herein.

In general, based on the properties selected for each of the first web of fibers 110, the second web of fibers 112, and the third web of fibers 114 (basis weight, fiber denier, staple length, silicone coating, type of fiber, and the like), the properties selected for the elastomeric layer 116 (type of thermoplastic elastomer, construction (film, spunbond, meltblown, web, and the like)), and selection of the entanglement parameters, the composite nonwoven textile 120 includes desired properties. For example, the composite nonwoven textile 120 may have a final thickness of from about 1.8 mm to about 2.7 mm, from about 1.9 mm to about 2.6 mm, or from about 2 mm to about 2.5 mm. The composite nonwoven textile 120 may have a basis weight from about 40 gsm to about 450 gsm, from about 100 gsm to about 350 gsm, from about 150 gsm to about 190 gsm, or about 180 gsm. The final basis weight may be impacted by the number of layers (fiber webs) used in the construction, fiber loss due to stripping, machine draft, and the like. In example aspects, the composite nonwoven textile 120 may have a thermal resistance from about 50 RCT to about 95 RCT, from about 55 RCT to about 90 RCT, from about 60 RCT to about 85 RCT, or from about 65 RCT to about 80 RCT. Thus, as seen, the composite nonwoven textile 120 may exhibit insulation properties associated with typical knit fleeces but have a lower basis weight and/or thickness.

Due to the elastomeric layer 116, the composite nonwoven textile 120 may have minimal growth properties and good recovery properties. Using the ASTMD2594 testing standard, the composite nonwoven textile 120 may have a growth in the length direction (i.e., the machine direction) of less than or equal to about 5%, less than or equal to about 4%, less than or equal to about 3%, less than or equal to about 2%, less than or equal to about 1%, less than or equal to about 0.1%, or less than or equal to 0%. The composite nonwoven textile 120 may have a growth in the width direction (i.e., the cross machine direction) of less than or equal to about 10%, less than or equal to about 9%, less than or equal to about 8%, less than or equal to about 7%, less than or equal to about 6%, less than or equal to about 5%, less than or equal to about 4%, less than or equal to about 3%, less than or equal to about 2%, less than or equal to about 1%, less than or equal to about 0.1%, or less than or equal to 0%. Using the ASTMD2594 testing standard, the composite nonwoven textile 120 may have a recovery of within about 10% of its resting length and width, within about 9% of its resting length and width, within about 8% of its resting length and width, within about 7% of its resting length and width, within about 6% of its resting length and width, within about 5% of its resting length and width, within about 4% of its resting length and width, within about 3% of its resting length and width, within about 2% of its resting length and width, or within about 1% of its resting length and width. The stiffness of the composite nonwoven textile 120, which relates to the drapability of the textile 120, is less than or equal to about 0.4 Kgf, less than or equal to about 0.3 Kgf, less than or equal to about 0.2 Kgf, less than or equal to about 0.1 Kgf, or from about 0.1 Kgf to about 0.4 Kgf.

The features described above (basis weight, thickness, thermal resistance, growth and recovery, and stiffness) may, in some example aspects, make the composite nonwoven textile 120 suitable for a lightweight, thermal article of apparel for use in cool to cold weather conditions (e.g., a pullover, a hoodie, sweat pants, and the like). In other aspects, the features described above may make the composite nonwoven textile 120 suitable for uses in other articles where asymmetric faces are desired such as an upper for an article of footwear.

Figure 7:
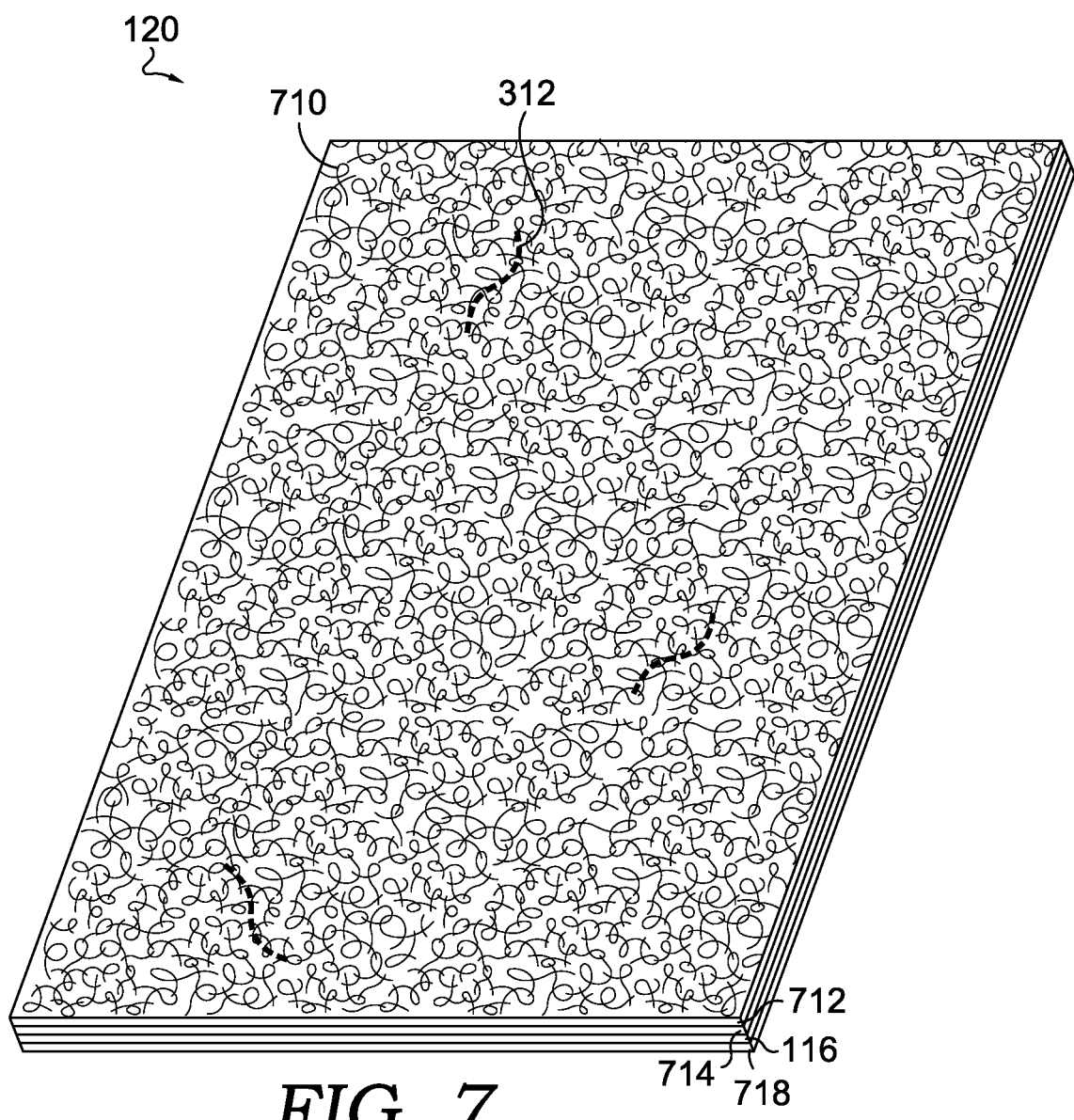
FIG. 7 illustrates a first face of the example composite nonwoven textile of FIG. 1 in accordance with aspects herein.
Figure 8:
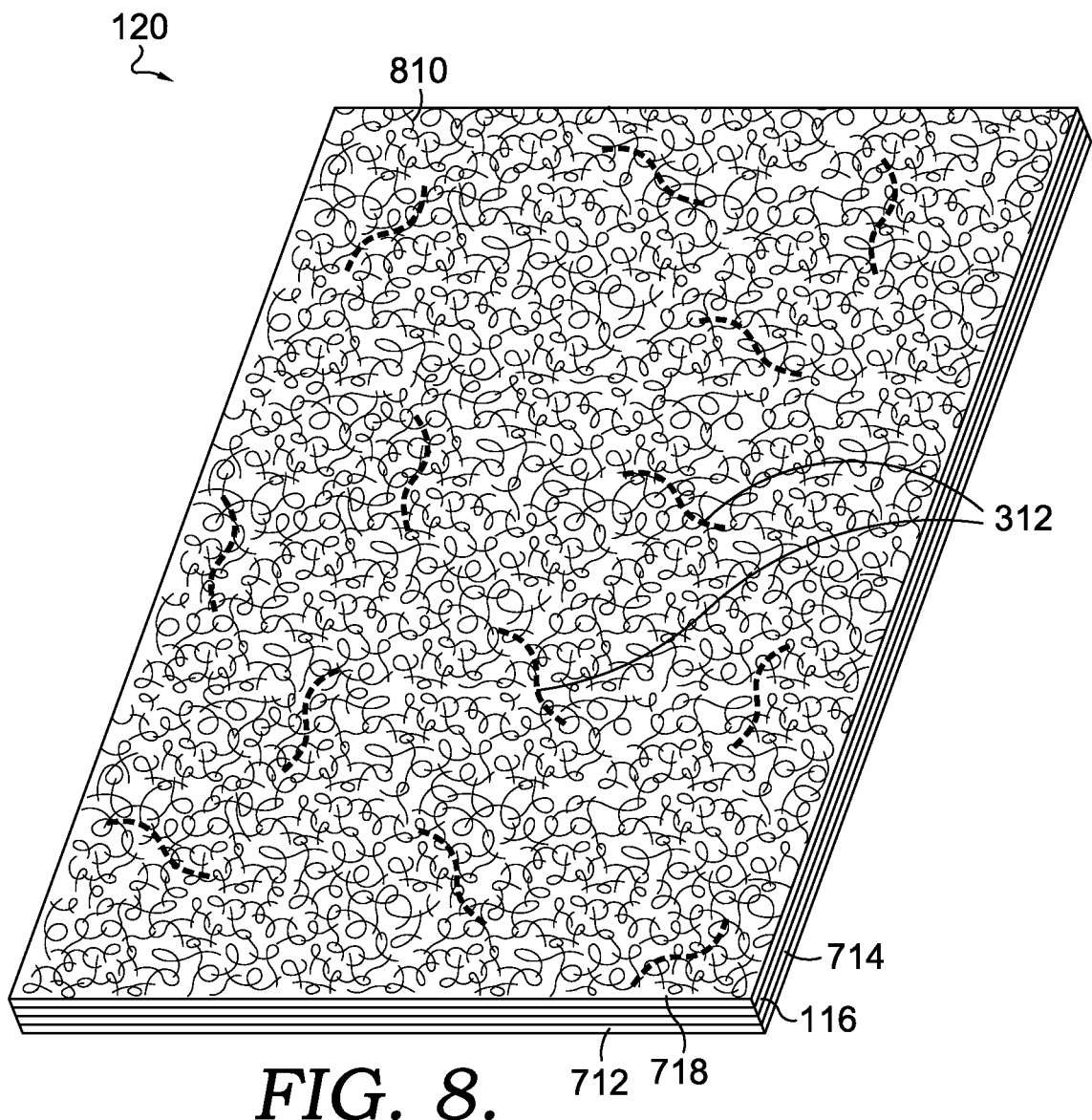
FIG. 8 illustrates an opposite second face of the example composite nonwoven textile of FIG. 1 in accordance with aspects herein.

FIGS. 7 and 8 illustrate the different faces of the composite nonwoven textile 120. FIG. 7 depicts a first face 710 of the composite nonwoven textile 120 along with the layers of the composite nonwoven textile 120. The first face 710 is formed from a first entangled web of fibers 712. In turn, the first entangled web of fibers 712 includes the fibers 210 from the first web of fibers 110, the fibers 310 and 312 from the second web of fibers 112, and the fibers 410 from the third web of fibers 114. In example aspects, due to the entanglement parameters, the first entangled web of fibers 712 primarily includes the fibers 210 from the first web of fibers 110, while the fibers 310, 312, and 410 are present in smaller amounts. Thus, a unit area, defined herein as a 1 cm×1 cm area ($cm^2$) of the first entangled web of fibers 712 includes a first number of fibers having a first denier from about 1.2 D to about 3.5 D, or about 1.5 denier such as the fibers 210 and the fibers 410 and a second number of fibers having a second denier from about 0.6 D to about 1 D, or about 0.8 D such as the fibers 310 and 312, where the first number of fibers is greater than the second number of fibers. Described differently, the unit area of the first entangled web of fibers 712 has a ratio of the first denier to the second denier in a range of from about 1.5:1 to about 2:1 or about 1.9:1. Another way to describe this is that the first entangled web of fibers 712 has a first average denier per $cm^2$. The first average denier may be determined by taking a set number of fibers (e.g., 100 fibers) per $cm^2$, determining the denier of the fibers, and determining the average denier. In example aspects, the first average denier per $cm^2$ may be from about 1.1 D to about 1.4 D.

FIG. 7 further depicts a second entangled web of fibers 718 that forms a second face 810 of the composite nonwoven textile 120 as shown in FIG. 8. The second entangled web of fibers 718 includes the fibers 310 and 312 from the second web of fibers 112, the fibers 410 from the third web of fibers 114, and the fibers 210 from the first web of fibers 110. In example aspects, due to the entanglement parameters, the second entangled web of fibers 718 primarily includes the fibers 310 and 312 from the second web of fibers 112, while the fibers 210 and 410 are present in smaller amounts. Thus, a unit area of the second entangled web of fibers 718 includes a third number of fibers having a third denier from about 0.6 to about 1 D, or about 0.8 D such as the fibers 310 and 312, and a fourth number of fibers having a fourth denier from about 1.2 D to about 3.5 D, or about 1.5 denier such as the fibers 210 and the fibers 410, where the third number of fibers is greater than the fourth number of fibers. Described differently, a unit area of the second entangled web of fibers 718 has a ratio of the third denier to the fourth denier in a range of from about 0.3:1 to about 0.7:1, or about 0.5:1. Another way to describe this is that the second entangled web of fibers 718 has a second average denier per $cm^2$. The second average denier per $cm^2$ may be less than the first average denier per $cm^2$. In example aspects, the second average denier per $cm^2$ may be from about 0.9 D to about 1 D.

As shown in both FIGS. 7 and 8, the composite nonwoven textile 120 further includes a third entangled web of fibers 714. The third entangled web of fibers 714 includes the fibers 410 from the third web of fibers 114, the fibers 310 and 312 from the second web of fibers 112, and the fibers 210 from the first web of fibers 110. In example aspects, due to the entanglement parameters, the third entangled web of fibers 714 primarily includes the fibers 410 from the third web of fibers 114, while the fibers 310, 312, and 210 are present in smaller amounts. More particularly, because the needles pass through the first web of fibers 110 and/or the second web of fibers 112 before contacting the third web of fibers 114, the needle barbs are generally full of fibers and thus there may not be a lot of movement of the fibers 410 during the entanglement process. Thus, a unit area of the third entangled web of fibers 714 includes a fifth number of fibers having a fifth denier from about 1.2 D to about 3.5 D, or about 1.5 denier such as the fibers 410 and the fibers 210 and a sixth number of fibers having a sixth denier from about 0.6 D to about 1 D, or about 0.8 D such as the fibers 310 and 312, where the fifth number of fibers is greater than the sixth number of fibers. Described differently, a unit area of the third entangled web of fibers 714 has a ratio of the fifth denier to the sixth denier in a range of from about 1.5:1 to about 2:1 or about 1.9:1. Another way to describe this is that the third entangled web of fibers 714 has a third average denier per $cm^2$. In example aspects, the third average denier per $cm^2$ may be greater than the second average denier per $cm^2$. In example aspects, the third average denier per $cm^2$ may be from about 1.1 D to about 1.4 D.

The composite nonwoven textile 120 shown in FIGS. 7 and 8 further includes the elastomeric layer 116. In the configuration shown in FIGS. 7 and 8 where the elastomeric layer 116 is positioned between second entangled web of fibers 718 and the third entangled web of fibers 714, at least some of the fibers from the first entangled web of fibers 712 and the third entangled web of fibers 714 extend through the elastomeric layer 116 and are entangled with the fibers of the second entangled web of fibers 718, and at least some of the fibers of the second entangled web of fibers 718 extend through the elastomeric layer 116 and are entangled with the fibers of the first entangled web of fibers 712 and the third entangled web of fibers 714. In example aspects, portions of the elastomeric layer 116 do not appreciably move in the z-direction during the entanglement process. Stated differently, the elastomeric layer 116 extends generally uniformly along an x, y plane and generally remains as a cohesive, unitary structure except for holes through which fibers of the different entangled webs 712, 714, and 718 extend.

Although the different entangled webs 712, 714 and 718 are shown as distinct layers in FIGS. 7 and 8, it is contemplated herein, that the entangled webs 712, 714 and 718 are entangled to form a cohesive structure. That said, in example aspects, each of the webs 712, 714, and 718 retains features of a distinct layer such that the entangled webs 712, 714 and 718 are distinctly visible in a cross-section of the composite nonwoven textile 120 thus providing a unique aesthetic to cut edges of the composite nonwoven textile 120.

As further shown in FIGS. 7 and 8, the second face 810 formed from the second entangled web of fibers 718 includes the silicone-coated fibers 312 (shown in dashed line) in a greater number than the silicone-coated fibers 312 present on the first face 710 formed from the first entangled web of fibers 712. Stated differently, a unit area of the second entangled web of fibers 718 includes a greater number of the silicone-coated fibers 312 than a unit area of the first entangled web of fibers 712. Further, a unit area of the third entangled web of fibers 714 includes a smaller number of silicone-coated fibers 312 as compared to a unit area of the second entangled web of fibers 718. In example aspects, it is contemplated herein that the composite nonwoven textile 120 may comprise from about 10% to about 25% by weight of the silicone-coated fibers 312. As stated previously, having the second face 810 of the composite nonwoven textile 120 include silicone-coated fibers provides a soft hand to the second face 810 and reduces the stiffness (i.e., increases the drapability) of the composite nonwoven textile 120.

Figure 9:
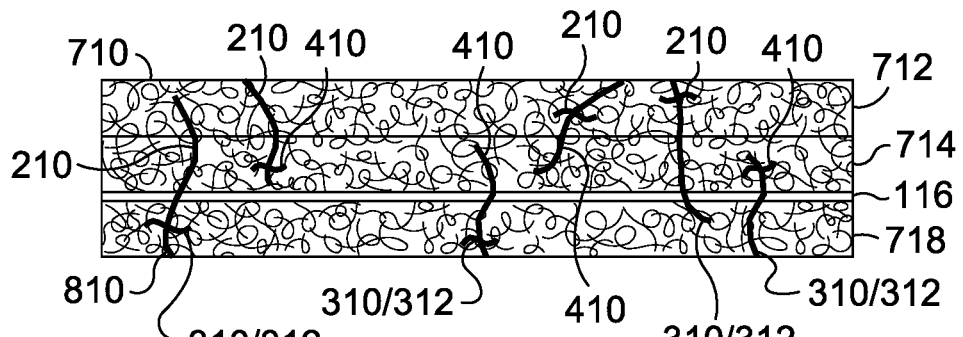
FIG. 9 illustrates a cross-section view of the example composite nonwoven textile of FIG. 7 in accordance with aspects herein.

FIG. 9 depicts a cross-section of the composite nonwoven textile 120 of FIG. 7 and illustrates the entanglement of fibers from the different entangled webs of fibers. As shown, the composite nonwoven textile 120 includes the first entangled web of fibers 712 that forms the first face 710, the second entangled web of fibers 718 that forms the second face 810, the third entangled web of fibers 714, and the elastomeric layer 116. In the cross-section shown in FIG. 9, the third entangled web of fibers 714 is positioned between the first entangled web of fibers 712 and the elastomeric layer 116 although other aspects contemplate that the third entangled web of fibers 714 is positioned between the second entangled web of fibers 718 and the elastomeric layer 116. As stated previously, it is contemplated herein that one or more of the entangled webs of fibers 712, 714, and/or 718 may be optional.

Moving from left to right, the fiber 210 from the first entangled web of fibers 712 is shown entangled with the fibers 310 and/or 312 from the second entangled web of fibers 718, and the fiber 210 from the first entangled web of fibers 712 is shown entangled with the fiber 410 from the third entangled web of fibers 714. The fiber 410 from the third entangled web of fibers 714 is shown entangled with the fibers 310 and/or 312 from the second entangled web of fibers 718, and the fiber 410 from the third entangled web of fibers 714 is shown entangled with the fiber 210 from the first entangled web of fibers 712. The fibers 310 and/or 312 from the second entangled web of fibers 718 is shown entangled with the fiber 210 from the first entangled web of fibers 712, and the fibers 310 and/or 312 is shown entangled with the fiber 410 from the third entangled web of fibers 714. As shown, one or more of the fibers 210, 310, 312, and 410 extend through the elastomeric layer 116. Some of the fibers in FIG. 9 are shown as darkened but this is for illustrative purposes only.

Figure 10:
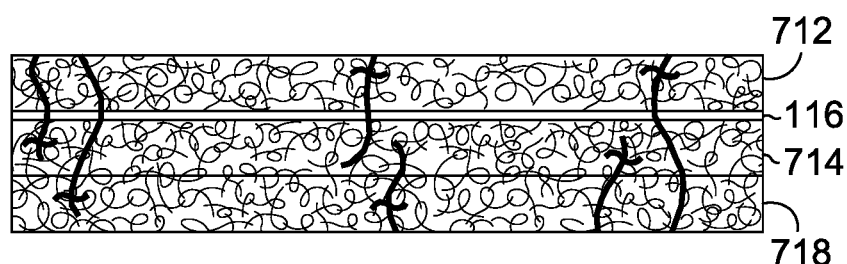
FIG. 10 illustrates a cross-section view of an alternative construction for the example composite nonwoven textile in accordance with aspects herein.

FIG. 10 depicts an alternative cross-section of the composite nonwoven textile 120. As shown in FIG. 10, instead of the elastomeric layer 116 being positioned between the third entangled web of fibers 714 and the second entangled web of fibers 718, the elastomeric layer 116 is positioned between the first entangled web of fibers 712 and the third entangled web of fibers 714. The fibers of the different layers are shown entangled together and extending through the elastomeric layer 116 as described for FIG. 9.

Figure 11:
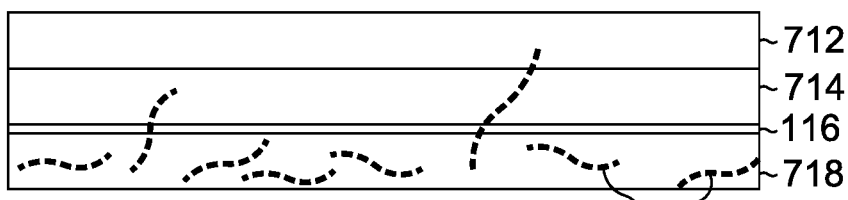
FIG. 11 illustrates the cross-section view of FIG. 9 depicting only silicone-coated fibers in accordance with aspects herein.

FIG. 11 depicts the cross-section of FIG. 9 with only the silicone-coated fibers 312 shown. As shown in FIG. 11, the silicone-coated fibers 312 are present in a greater amount in the second entangled web of fibers 718 but extend through the elastomeric layer 116 into the first entangled web of fibers 712 and the third entangled web of fibers 714.

Figure 12:
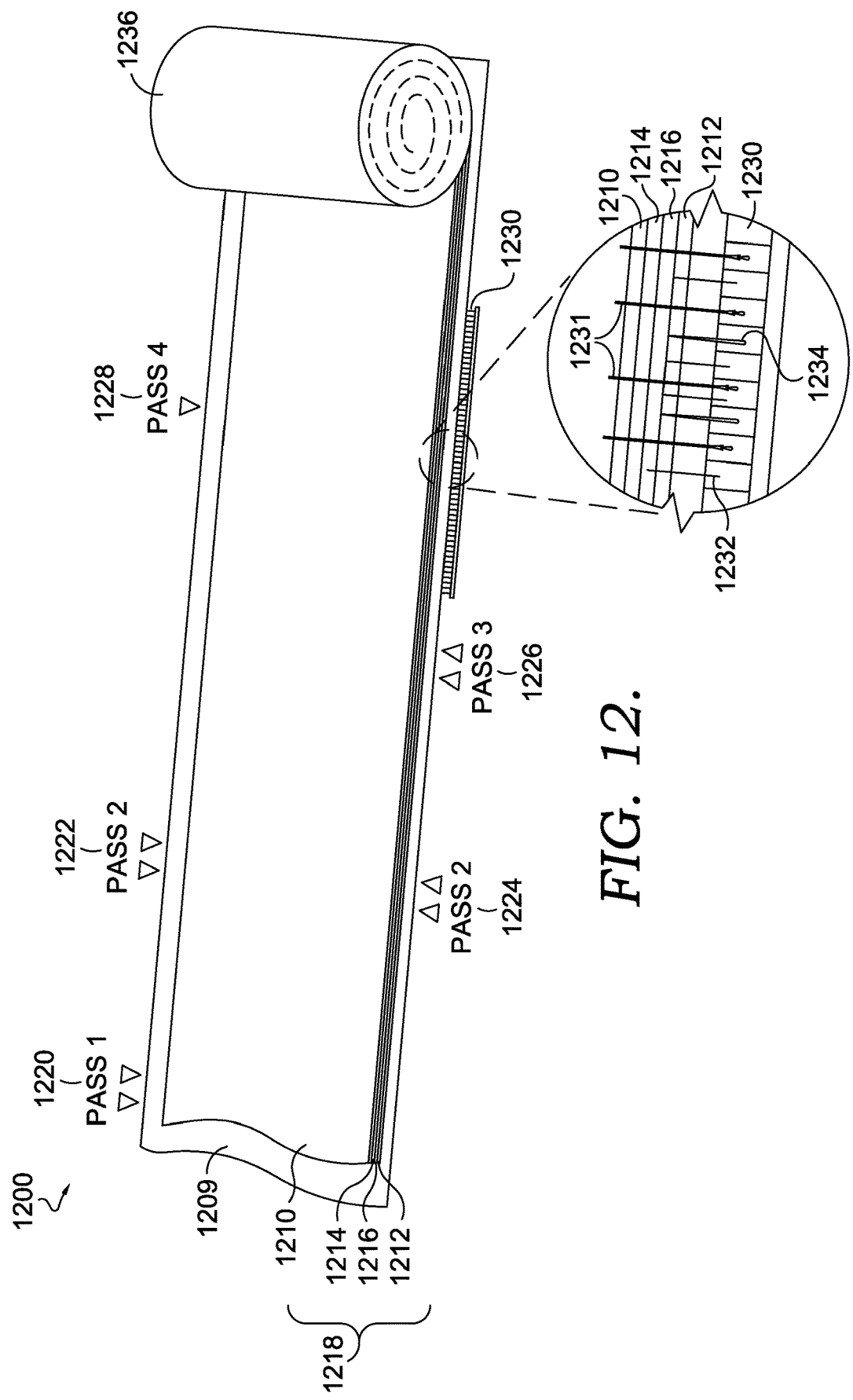
FIG. 12 illustrates an example manufacturing process for use in making an example composite nonwoven textile having a pile in accordance with aspects herein.

FIG. 12 illustrates an example manufacturing process, referenced generally by the numeral 1200, for use in producing a pile on a second face of a composite nonwoven textile. Aspects of the manufacturing process 1200 as described below have traditionally been used to form Dilour carpets used in, for example, the automotive industry. In the more traditional Dilour process, needles punch through a single layer fibrous web, and the punched fibers are retained by a set of brushes. The web is then pulled off the brushes which creates a pile on one side of the web. Adaptations to this traditional Dilour process are described herein to make a resulting composite nonwoven textile with features suitable for use in an article of apparel (e.g., a drapable, lofty, soft textile with stretch and recovery features). The depiction of the manufacturing components in FIG. 12 is illustrative only and is meant to convey general features of the manufacturing process 1200. Some of the features of the manufacturing process 1200 are the same as the manufacturing process 600, and, as such, disclosure relating to those steps is the same as that described in relation to FIG. 6. Disclosure with respect to FIG. 12 generally focuses on the differences between the manufacturing process 600 and the manufacturing process 1200 and how those differences impact the properties of the resulting composite nonwoven textile.

FIG. 12 depicts a conveyance system 1209 that transports a stacked configuration 1218 of a first web of fibers 1210, a second web of fibers 1212, a third web of fibers 1214, and a elastomeric layer 1216 in a machine direction. Each of the first web of fibers 1210, the second web of fibers 1212, and the third web of fibers 1214 has been carded and lapped to achieve a desired basis weight. As well, each of the webs 1210, 1212, and 1214 has been lightly needled to achieve a cohesive structure. The number of webs shown is illustrative, and it is contemplated that the number of webs may be different (less or more) than that shown, Because the fibers in each of the first, second, and third web of fibers 1210, 1212, and 1214 are in a generally loose web state, they are available for movement during the needle entanglement process. In example aspects, the first, second, and third web of fibers 1210, 1212, and 1214 may be the same as the first, second, and third web of fibers 110, 112, and 114 used in the manufacturing process 600, and the elastomeric layer 1216 may be the same as the elastomeric layer 116 used in the manufacturing process 600. In some example aspects, the staple length of the fibers used to form the first, second, and third web of fibers 1210, 1212, and 1214 may be slightly longer than the staple length of the fibers used to form the first, second, and third web of fibers 110, 112, and 114. For instance, the staple length may be from about 60 mm to about 70 mm, from about 62 mm to about 68 mm, or about 64 mm. In other aspects, the fibers used to form the first, second, and third web of fibers 1210, 1212, and 1214 may be the same as the fibers used to form the first, second, and third web of fibers 110, 112, and 114 (e.g., same fiber type, denier, coatings, color properties, and the like). In example aspects, the rate of conveyance may be the same or different from the rate of conveyance as described for the manufacturing process 600. In example aspects, the rate of conveyance is selected to achieve the desired entanglement and pile of the resulting composite nonwoven textile.

The stacked configuration 1218 passes a first needle board indicated as Pass 1 at reference numeral 1220. The entanglement parameters associated with Pass 1 1220 may be the same as Pass 1 614, and, as such, the description of Pass 1 614 is the same for Pass 1 1220 and will not be repeated here. Similarly, Pass 2 1222, and Pass 2 1224 are the same as Pass 2 616 and Pass 2 618 of the manufacturing process 600 and, as such, the description of Pass 2 616 and Pass 2 618 is the same for Pass 2 1222 and Pass 2 1224 and will not be repeated here.

In example aspects, Pass 3 1226 may differ from Pass 3 620 of the manufacturing process 600. For example, in some aspects, Pass 3 1226 may be eliminated completely as further explained below. In other example aspects, Pass 3 1226 may have a reduced stitch density such as, for example, between about 30 n/cm$^2$ to about 175 n/cm$^2$, or from about 100 n/cm$^2$ to about 150 n/cm$^2$.

Pass 4 1228, also known as a Dilour pass, occurs subsequent to Pass 3 1226, or if Pass 3 1226 is eliminated, Pass 4 1228 occurs subsequent to Pass 2 1222 and Pass 2 1224. In example aspects, one or more special needles may be used for Pass 4 1228. For example, one or more of the needles, or all of the needles, may include a forked tip that captures a fiber along its length as the needle traverses the stacked configuration 1218 to form a loop. Pass 4 1226 occurs from the direction of the first web of fibers 1210 toward the second web of fibers 1212. A set of brushes 1230 is positioned adjacent to a face of the second web of fibers 1212. As shown in the magnified view, as fibers from the first, second, and third web of fibers 1210, 1212, and 1214 are pushed through the face of the second web of fibers 1212 by the needles 1231, the terminal ends of the fibers, such as fiber 1232, and/or the apexes of loops of fibers, such as loop 1234, are pushed into the set of brushes 1230 where they are held during Pass 4 1228. As the stacked configuration 1218 continues to move in a machine direction, the fibers retained by the set of brushes 1230 are pulled off of the brushes 1230. After being pulled off of the set of brushes 1230, the fibers and fiber loops held by the set of brushes 1230 have a common orientation in a z-direction with respect to a surface plane of, for example, the second web of fibers 1212. As discussed more with respect to FIG. 15, the distal ends of the fibers and fiber loops held by the set of brushes 1230 extend a predetermined distance away from the face of the second web of fibers 1212.

To ensure that an adequate number of fibers and/or fiber loops are pushed into the set of brushes 1230 in order to produce a sufficient pile having an even coverage on the face of the resulting composite nonwoven textile, the stitch density of Pass 4 1228 is greater than the stitch density of the previous passes. For example, the stitch density of Pass 4 1228 is from about 300 n/cm$^2$ to about 1200 n/cm$^2$, from about 400 n/cm$^2$ to about 800 n/cm$^2$, from about 500 n/cm$^2$ to about 700 n/cm$^2$, or about 600 n/cm$^2$. In some example aspects, it has been found that subjecting the first face to a high stitch density such as that used in Pass 4 1228 may reduce the formation of pills on the first face of the resulting composite nonwoven textile. The penetration depth of Pass 4 1228 may be adjusted to produce a longer pile or a shorter pile. In example aspects, the penetration depth may be from about 3 mm to about 10 mm, from about 3.5 mm to about 8 mm, from about 4 mm to about 6 mm, or about 4 mm. After Pass 4 1228, the resulting composite nonwoven textile may be rolled to form a rolled good 1236 although other processing steps are contemplated herein (e.g., ironing, pattern cutting, printing, calendaring, embossing, coating, and the like) as discussed above with respect to the manufacturing process 600.

In example aspects, the stitch density before Pass 4 1228 is reduced compared to the stitch density of the manufacturing process 600 to ensure that the elastomeric layer 1216 is not overneedled before Pass 4 1228 since the stitch density of Pass 4 1228 is high. Overneedling the elastomeric layer 1216 may impact the structural integrity of the elastomeric layer 1216 and negatively affect the growth and recovery properties of the resulting composite nonwoven textile. The end result of the manufacturing process 1200 is a composite nonwoven textile having a desired basis weight, a desired loft, and a pile that has a uniform coverage on a second face of the textile, where the coverage may include both terminal fibers ends and fiber loops, just terminal fiber ends, or just fiber loops depending on needle selection.

Figure 13:
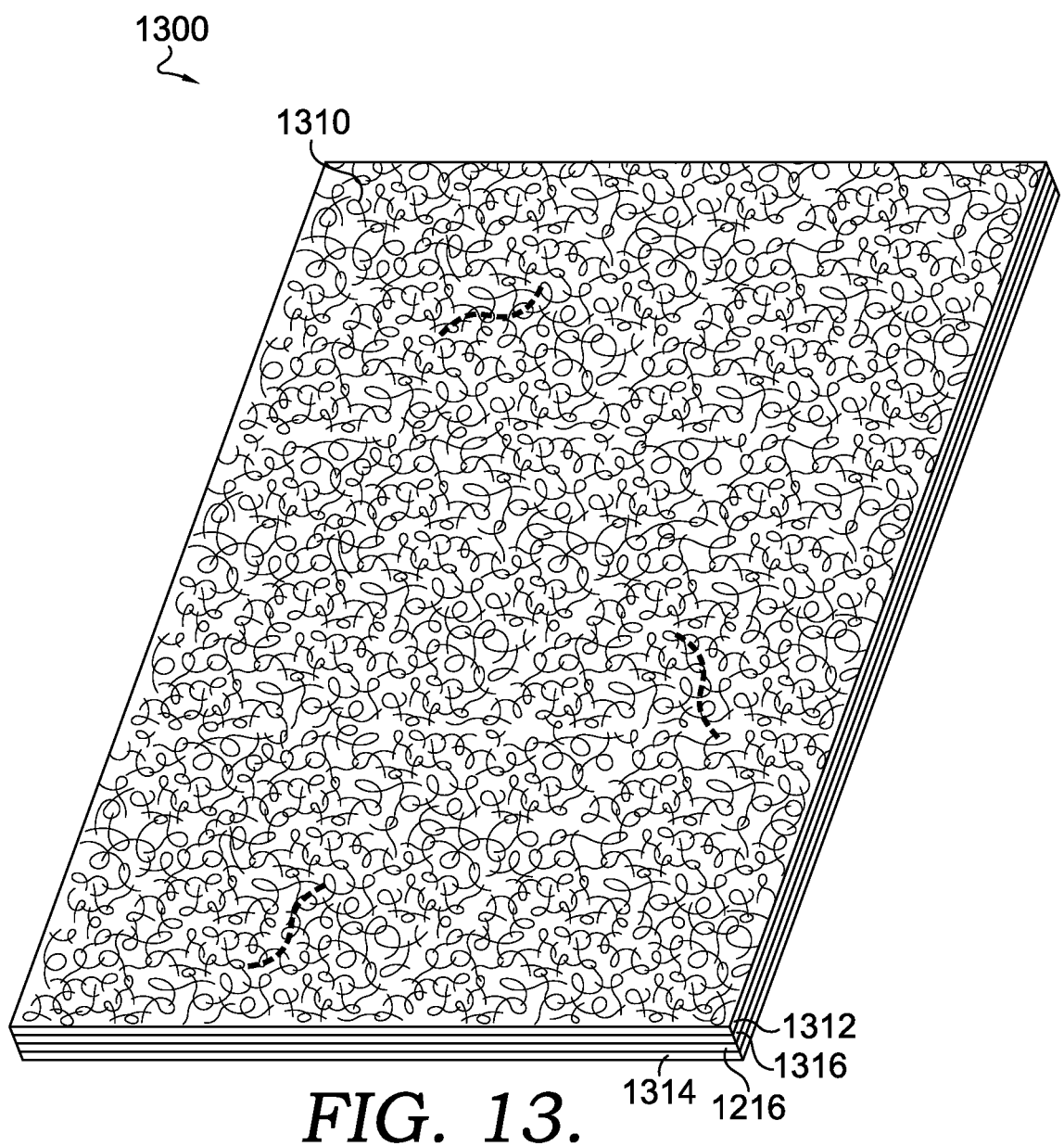
FIG. 13 illustrates a first face of the example composite nonwoven textile produced using the manufacturing process of FIG. 12 in accordance with aspects herein.
Figure 14:
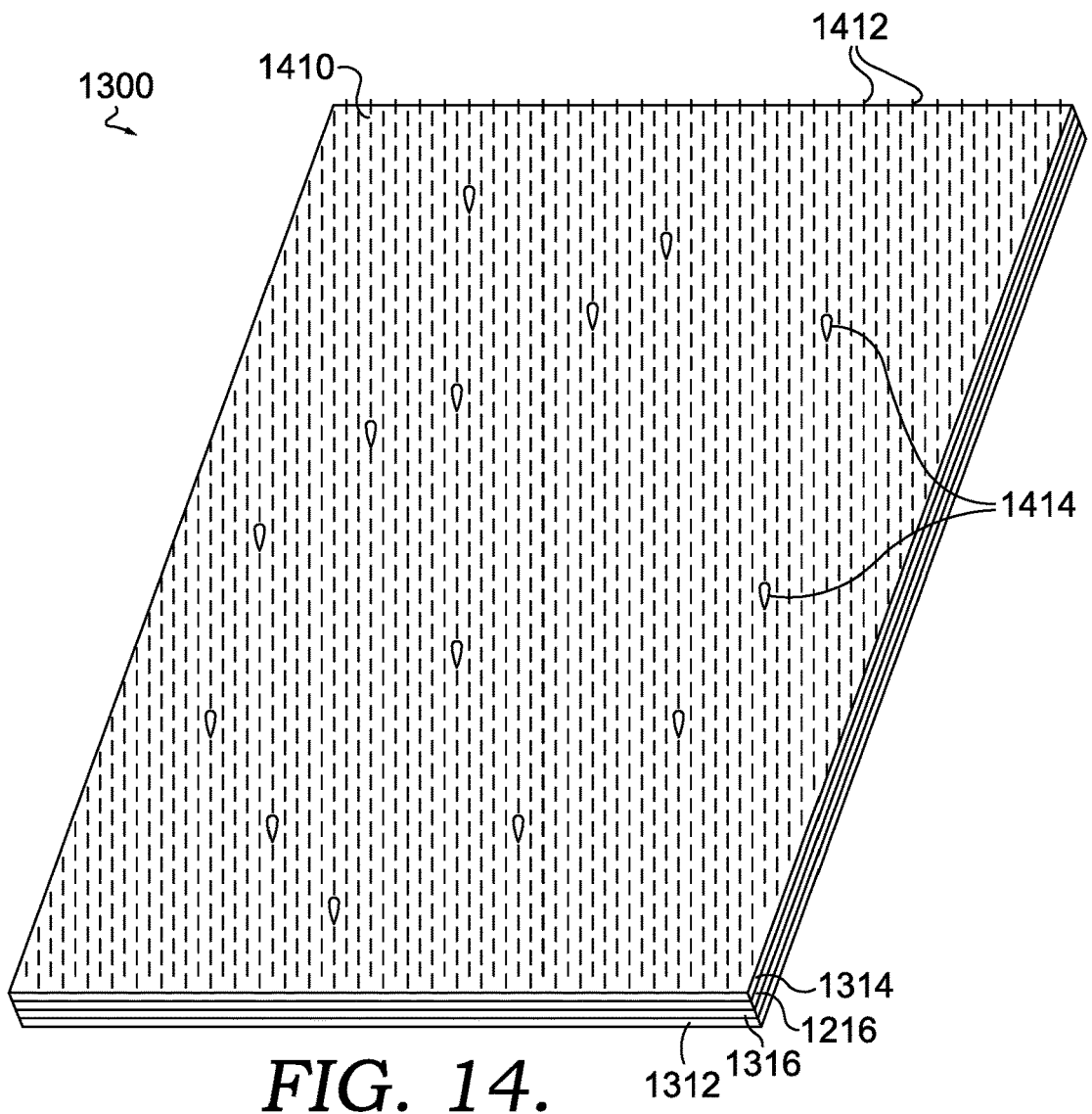
FIG. 14 illustrates a second face of the example composite nonwoven textile of FIG. 13 in accordance with aspects herein.

FIGS. 13 and 14 respectively depict a first face 1310 and an opposite second face 1410 of a composite nonwoven textile 1300 produced by the manufacturing process 1200. The composite nonwoven textile 1300 includes a first entangled web of fibers 1312, a second entangled web of fibers 1314, a third entangled web of fibers 1316, and the elastomeric layer 1216. The description of the different layers of the composite nonwoven textile 1300 is generally the same as the description of the different layers of the composite nonwoven textile 120 described in relation to FIGS. 7 and 8 and as such, will not be repeated here.

With respect to FIG. 14, the second face 1410 includes terminal ends of fibers 1412 as well as loops 1414 that extend away from the second face 1410 by a predetermined amount. The number of the fibers 1412 and the loops 1414 depicted in FIG. 14 is illustrative only, and it is contemplated herein that the second face 1410 may include all loops 1414, all terminal ends of fibers 1412, and any combination thereof. The fibers 1412 may include fibers from the first web of fibers 1210, the second web of fibers 1212, and/or the third web of fibers 1214. Similarly, the loops 1414 may be formed from fibers of the first web of fibers 1210, the second web of fibers 1212, and/or the third web of fibers 1214. Thus, the denier of the fibers 1412 may be from about 0.6 D to about 1 D, or about 0.8 D. Or the denier of the fibers 1412 may be from about 1.3 D to about 3.5 D, or about 1.5 D. Similarly, the denier of the fibers forming the loops 1414 may be from about 0.6 D to about 1 D, or about 0.8 D. Or the denier of the fibers forming the loops 1414 may be from about 1.3 D to about 3.5 D, or about 1.5 D.

Figure 15:
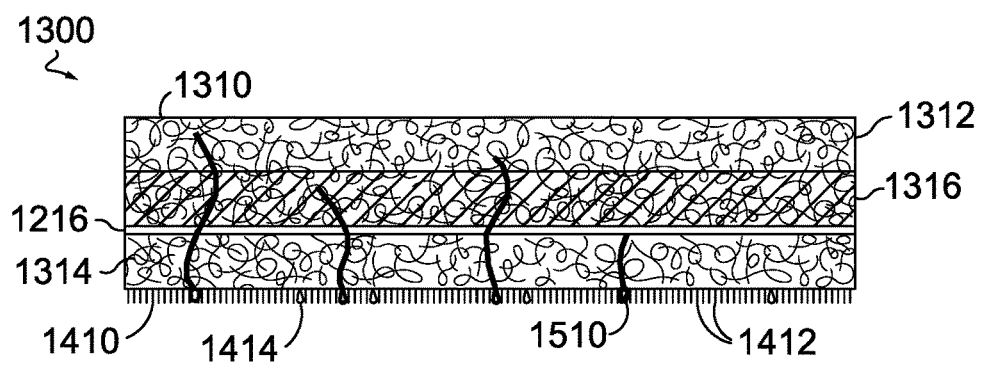
FIG. 15 illustrates a cross-section view of the example composite nonwoven textile of FIG. 13 in accordance with aspects herein.

FIG. 15 is a cross-section of the composite nonwoven textile 1300 and includes the first entangled web of fibers 1312, the second entangled web of fibers 1314, the third entangled web of fibers 1316, and the elastomeric layer 1216. In example aspects, each of the first, second, and third entangled webs of fibers 1312, 1314, and 1316 extend in respective x, y planes that are generally parallel and offset from each other. As shown, the fibers 1412 and the fiber loops 1414 extend in a z-direction away from the second face 1410 of the composite nonwoven textile 1300. More particularly, at least a portion of the fibers forming the second entangled web of fibers 1314 have a longitudinal length that extends from the elastomeric layer 1216 to a distal end of the respective fibers, where the distal end of the respective fibers, as shown by reference numeral 1510 (darkened for illustrative purposes), extends in a z-direction away from the second face 1410 by a predetermined amount. The distal ends of the respective fibers may include a terminal end such as with the fibers 1412 or an apex of a loop as with the loops 1414. In example aspects, the predetermined amount may be from about 1.5 mm to about 8.1 mm, from about 3.5 mm to about 6.5 mm, from about 3 mm to about 6 mm, or about 4 mm.

Figure 17:
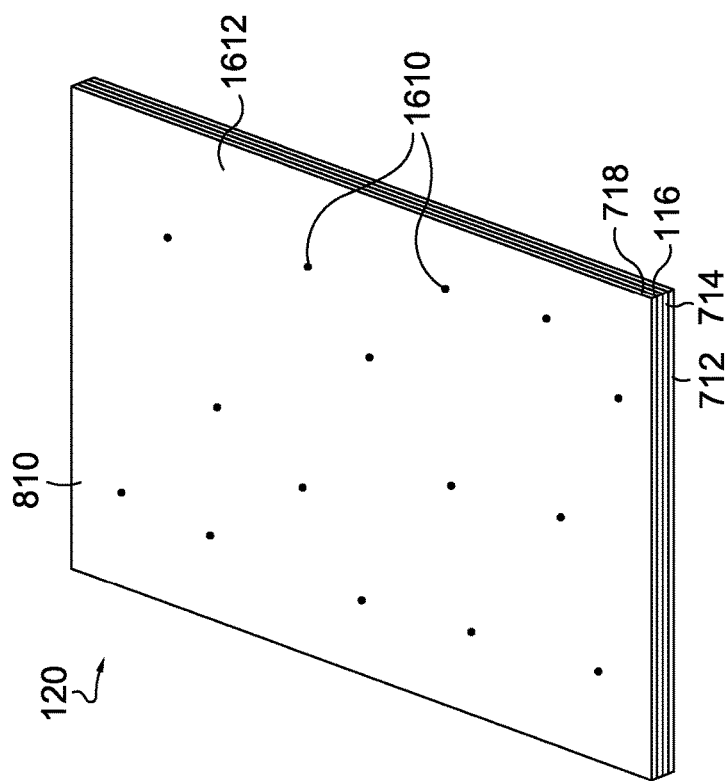
FIG. 17 illustrates an opposite second face of the example composite nonwoven textile of FIG. 16 in accordance with aspects herein.
Figure 16:
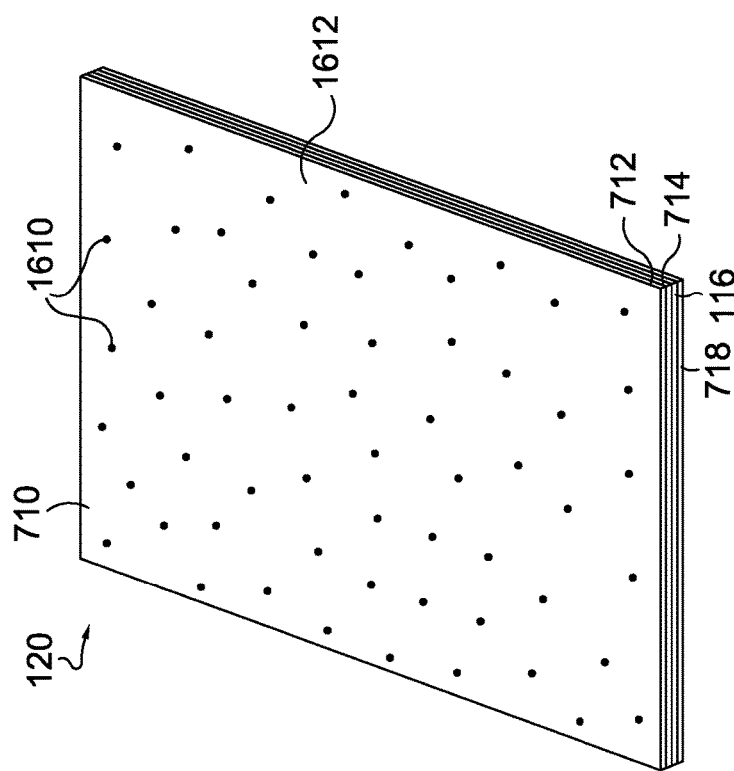
FIG. 16 illustrates a first face of the example composite nonwoven textile of FIG. 1 where the first face has a first color property and a second color property in accordance with aspects herein.
Figure 18:
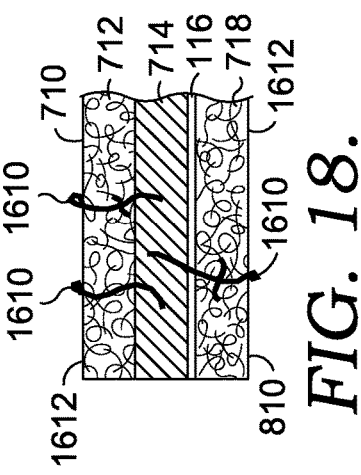
FIG. 18 illustrates a cross-section view of the example composite nonwoven textile of FIG. 16 in accordance with aspects herein.

Returning to the example composite nonwoven textile 120, the fibers forming the different layers of the composite nonwoven textile 120 may have different color properties that impart a unique aesthetic to the nonwoven textile 120 as shown in FIGS. 16-18. FIG. 16 depicts the first face 710 of the composite nonwoven textile 120, and FIG. 17 depicts the second face 810 of the composite nonwoven textile 120. As stated earlier, in example aspects it is contemplated herein that the fibers 210 of the first web of fibers 110 have a first color property, the fibers 310 and 312 of the second web of fibers 112 have the first color property, and the elastomeric layer 116 may have the first color property or may have a different color property (e.g., a second color property). The fibers 410 of the third web of fibers 114 have a second color property that is different from the first color property. During the manufacturing process 600, the fibers 410 of the third entangled web of fibers 114 are unequally pushed to the first face 710 and the second face 810 of the composite nonwoven textile 120 based, at least in part, on the order of the webs in the stacked configuration 612 and the entanglement parameters. The dark dots shown in FIGS. 16 and 17 represent the second color property (referenced by numeral 1610) imparted by the fibers 410 and the white space represents the first color property (referenced by numeral 1612) imparted by the fibers 210, 310, 312, and 410. In example aspects, the second color property 1610 is visually discernible or distinguishable to a greater degree on the first face 710 compared to the second face 810 when the third web of fibers 1214 is positioned between the first web of fibers 1210 and the elastomeric layer 1216. Stated differently, in example aspects, the fibers 410 with the second color property 1610 may include a greater number of fibers per unit area on the first face 710 compared to the second face 810. It is contemplated herein that the first color property 1612 on the second face 810 may be enhanced (or more visually perceptible) due to the elastomeric layer 116 having the first color property 1612 as the elastomeric layer may be visible in some areas on the second face 810. The overall look imparted by the fibers 410 to the first face 710 and the second face 810 is a heather-like effect with the heather-like effect being more pronounced on the first face 710. In example aspects, when the third web of fibers 1214 is positioned between the second web of fibers 1212 and the elastomeric layer 1216, the heather-like effect may be more pronounced on the second face 810.

The patterning of the first color property 1612 and the second color property 1610 shown in FIGS. 16 and 17 is illustrative only, and it is contemplated herein that the patterning may be different from that shown. For example, the manufacturing process 600 produces a random entanglement of the different fibers of the composite nonwoven textile 120 such that the patterning is variable over the first face 710 and the second face 810 of the nonwoven textile 120. Moreover, the overall color properties of the different faces 710 and 810 of the composite nonwoven textile 120 may be adjusted by varying the color properties of the fibers forming the different layers of the textile 120, changing the entanglement parameters, varying the stacking order of the carded webs prior to entanglement, and the like. Any and all aspects, and any variation thereof, are contemplated as being within aspects herein.

FIG. 18 depicts a cross-section of the composite nonwoven textile 120 of FIG. 16. As shown, the fibers 410 having the second color property 1610 are pushed to both the first face 710 and the second face 810 of the composite nonwoven textile 120 such that the second color property 1610 is visually perceived on the opposing first and second faces 710 and 810. As further shown in FIG. 18, in example aspects, more of the fibers 410 may be pushed to the first face 710 compared to the second face 810 such that the second color property 1610 is visually discernible to a greater degree on the first face 710 compared to the second face 810. Having a composite nonwoven textile with different color properties on opposing surfaces may be useful when the textile is incorporated into an article of apparel. For example, the different color properties may provide a visual marker to a wearer as to which side of the article of apparel is outer-facing or inner-facing. In another example, the different color properties may enable the article of apparel to be worn in two different configurations (right-side out and inside out) where different visual appearances are associated with each configuration.

Aspect herein contemplate that the composite nonwoven textile 120 may exhibit a different resistance to pilling on the first face 710 compared to the second face 810 in response to wash and wear. In some example aspects, the different resistances to pilling between the first face 710 and the second face 810 may be a desired property to produce a desired aesthetic and hand feel. Properties associated with the first, second, and third webs 110, 112, and 114, properties associated with the order of stacking of the webs 110, 112, and 114, and the entanglement parameters may be adjusted to engineer a differential resistance to pilling on the first face 710 and the second face 810. In general, the first face 710 is more resistant to pilling compared to the second face 810. Stated differently, the second face 810 may produce a greater number of pills per $cm^2$ in response to wash and wear compared to the first face 710. The different in resistance to pilling between the first face 710 and the second face 810 of the nonwoven textile 120 may be due to a number of factors. For example, the greater number of silicone-coated fibers 312 present on the second face 810 increases the likelihood of fiber ends migrating out of the second face 810 and entangling with other fibers ends to form pills that extend away from the second face 810. In addition, the second face 810 has a lower stitch density than the first face 710 (250 versus 300) which may produce a lesser degree of entanglement when compared to the first face 710. Because the fibers may be less entangled, there may be an increased likelihood of fiber end migration out of the second face 810. Another reason may be that Pass 4 622 is from the first face 710 toward the second face 810. This pass may push some of the fibers ends out through the second face 810 where they may entangle to form pills.

The differential pilling between the first face 710 and the second face 810 over time is illustrated in FIGS. 19-21. FIG. 19 illustrates the first face 710 of the composite nonwoven textile 120 at a first point in time. In example aspects, the first point in time may be immediately after the nonwoven textile 120 is formed. The first face 710 is shown without a depiction of the fibers forming the first face 710 to better illustrate the pills. In example aspects, the first face 710 may not include any pills (as shown), or it may include a first number of pills per $cm^2$. FIG. 21 illustrates the second face 810 of the composite nonwoven textile 120 at the first point in time. The second face 810 is also shown without a depiction of the fibers forming the second face 810 to better illustrate the pills. In example aspects, the second face 810 may not include any pills (as shown), or it may include a second number of pills per $cm^2$.

FIG. 20 illustrates the first face 710 at a second point in time after the first point in time. The second point in time may be after one or more washes or after a certain amount of wear or use. At the second point in time, the first face 710 includes a third number of pills per $cm^2$, such as pills 2010, where the third number of pills per $cm^2$ is greater than the first number of pills per $cm^2$. FIG. 22 illustrates the second face 810 at the second point in time. At the second point in time, the second face 810 includes a fourth number of pills per $cm^2$, such as pills 2210, where the fourth number of pills per $cm^2$ is greater than the second number of pills per $cm^2$. Additionally, the fourth number of pills per $cm^2$ is greater than the third number of pills per $cm^2$ present on the first face 710 at the second point in time.

When the composite nonwoven textile 120 is incorporated into an article of apparel, it is contemplated herein that the first face 710 forms an outer-facing surface of the article of apparel and, in example aspects, may form an outermost-facing surface of the article of apparel. The second face 810 forms an inner-facing surface of the article of apparel and, in example aspects, may form an innermost-facing surface of the article of apparel. Thus, in example aspects, the greater rate of pilling (or less pilling resistance) of the second face 810 may cause the inner-facing surface of the article of apparel to have a greater number of pills per $cm^2$ compared to the outer-facing surface of the article of apparel which is somewhat contrary to typical articles of apparel where pills may preferentially form on the outer-facing surface in areas exposed to greater abrasion (e.g., elbow area).

The differential pilling between the outer-facing surface of an article of apparel and the inner-facing surface of the article of apparel over time is illustrated in FIGS. 23-26. FIG. 23 illustrates an outer-facing surface 2310 of an article of apparel 2300 at a first point in time, where the article of apparel 2300 is formed from the composite nonwoven textile 120 such that the first face 710 of the composite nonwoven textile 120 forms the outer-facing surface 2310. In example aspects, the first point in time may be immediately after the article of apparel 2300 is formed. The outer-facing surface 2310 is shown without a depiction of the fibers forming the outer-facing surface 2310 to better illustrate the pills. In example aspects, the outer-facing surface 2310 may not include any pills (as shown), or it may include a first number of pills per $cm^2$. FIG. 25 illustrates an inner-facing surface 2510 of the article of apparel 2300 at the first point in time, where the inner-facing surface 2510 is formed from the second face 810 of the composite nonwoven textile 120. The inner-facing surface 2510 is also shown without a depiction of the fibers forming the inner-facing surface 2510 to better illustrate the pills. In example aspects, the inner-facing surface 2510 may not include any pills (as shown), or it may include a second number of pills per $cm^2$.

FIG. 24 illustrates the outer-facing surface 2310 at a second point in time after the first point in time. The second point in time may be after one or more washes or after a certain amount of wear. At the second point in time, the outer-facing surface 2310 includes a third number of pills per $cm^2$, such as pills 2410, where the third number of pills per $cm^2$ is greater than the first number of pills per $cm^2$. FIG. 26 illustrates the inner-facing surface 2510 at the second point in time. At the second point in time, the inner-facing surface 2510 includes a fourth number of pills per $cm^2$, such as pills 2610, where the fourth number of pills per $cm^2$ is greater than the second number of pills per $cm^2$. Additionally, the fourth number of pills per $cm^2$ is greater than the third number of pills per $cm^2$ present on the outer-facing surface 2310 at the second point in time.

In other example aspects, it may be desirable to reduce the number of pills formed on the first face 710 and/or the second face 810 of the composite nonwoven textile 120 to achieve a different aesthetic and/or a different hand feel. In this aspect, the composite nonwoven textile 120 may be subjected to a number of post-processing steps that increase the resistance to pilling on the first face 710 and the second face 810. Example post-processing steps may include calendaring (hot or cold), embossing, treating the first face 710 and/or second face 810 with coatings such as, for example, an oil-based polyurethane, and the like. Any and all aspects, and any variation thereof, are contemplated as being within aspects herein.

Figure 27:
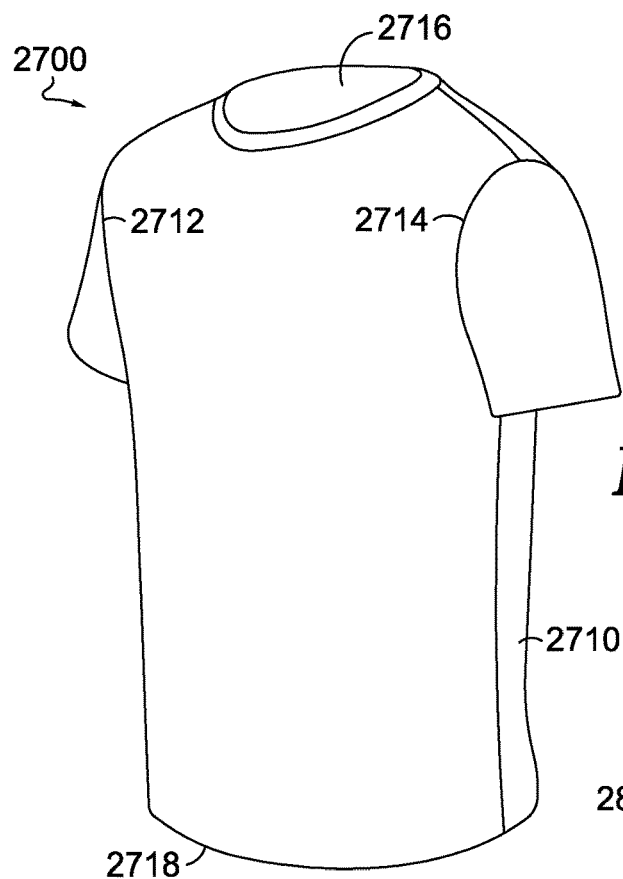
FIG. 27 illustrates an example upper-body garment formed from the example composite nonwoven textile described herein in accordance with aspects herein.

FIG. 27 illustrates an example article of apparel 2700 formed from the composite nonwoven textile 120 and/or the composite nonwoven textile 1300. The article of apparel 2700 is in the form of an upper-body garment with short sleeves although other configurations are contemplated herein such as a jacket, a hoodie, a long-sleeved shirt, a sleeveless shirt, a vest, and the like. The article of apparel 2700 includes an outer-facing surface 2710 and an inner-facing surface (not visible). As shown, the outer-facing surface 2710 is an outermost-facing surface of the article of apparel. In example aspects, the inner-facing surface is an innermost-facing surface of the article of apparel 2700. With respect to the composite nonwoven textile 120, the first face 710 forms the outer-facing surface 2710 and the second face 810 forms the inner-facing surface of the article of apparel 2700. With respect to the composite nonwoven textile 1300, the first face 1310 forms the outer-facing surface 2710 and the second face 1410 forms the inner-facing surface of the article of apparel 2700. In example aspects, the composite nonwoven textiles 120 and/or 1300 are oriented such that the width direction of the textiles 120 and/or 1300 (i.e., the cross-machine direction) is oriented to extend between a first sleeve opening 2712 and a second sleeve opening 2714, and the length direction of the textiles 120 and/or 1300 (i.e., the machine direction) is oriented to extend between a neck opening 2716 and a waist opening 2718 of the article of apparel 2700. This reflects that the width direction of the textiles 120 and/or 1300 have less resistance to stretch than the length direction of the textiles 120 and/or 1300. This orientation may be switched if different stretch features are desired for different portions of the article of apparel 2700.

Forming the article of apparel 2700 from the composite nonwoven textiles 120 and/or 1300 impart different properties to the outer-facing surface 2710 and the inner-facing surface. For example, the outer-facing surface 2710 may have a greater resistance to abrasion due to the presence of a greater amount of the fibers 210 compared to, for example, the fibers 310 and 312. The outer-facing surface 2710 may also have different color properties than the inner-facing surface due to the unequal movement of the fibers 410 between the first face and the second face of the composite nonwoven textiles 120 and/or 1300. The inner-facing surface of the article of apparel 2700 may have a softer hand due to, for example, a greater amount of the silicone-coated fibers 312 compared to, for example, the outer-facing surface 2710. As well, the soft hand may be due to the smaller denier of the fibers 310 and 312 that primarily form the inner-facing surface of the article of apparel 2700.

Figure 28:
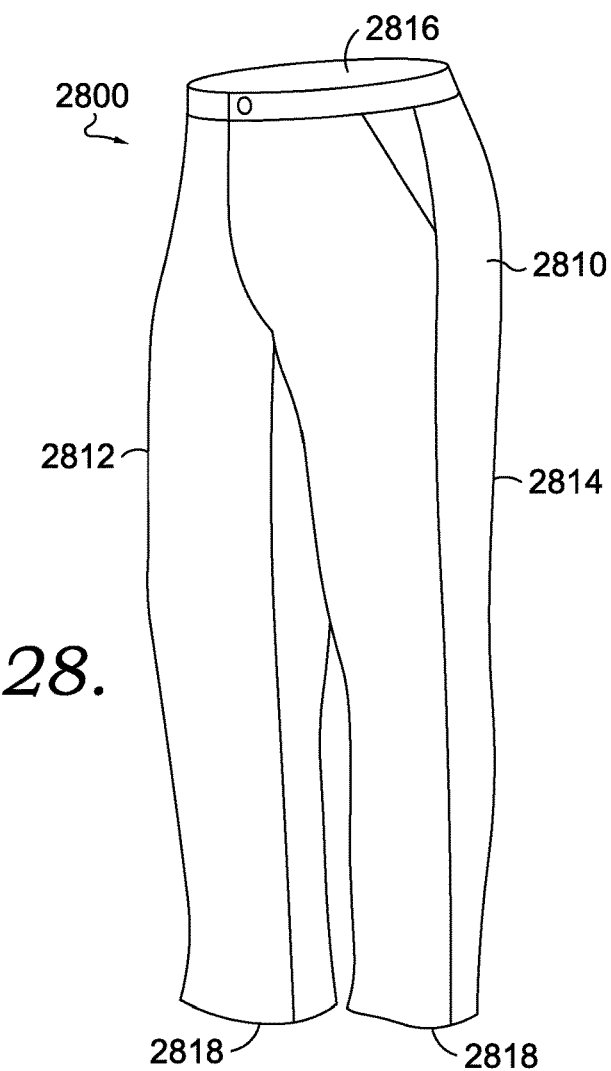
FIG. 28 illustrates an example lower-body garment formed from the example composite nonwoven textile described herein in accordance with aspects herein.

FIG. 28 depicts another example article of apparel 2800 formed from the composite nonwoven textile 120 or the composite nonwoven textile 1300. The article of apparel 2800 is in the form of a lower-body garment. Although shown as a pant, it is contemplated herein that the article of apparel 2800 may be in the form of a short, a capri, a tight, and the like. The article of apparel 2800 includes an outer-facing surface 2810 and an inner-facing surface (not visible). As shown, the outer-facing surface 2810 is an outermost-facing surface of the article of apparel. In example aspects, the inner-facing surface is an innermost-facing surface of the article of apparel 2800. With respect to the composite nonwoven textile 120, the first face 710 forms the outer-facing surface 2810 and the second face 810 forms the inner-facing surface of the article of apparel 2800. With respect to the composite nonwoven textile 1300, the first face 1310 forms the outer-facing surface 2810 and the second face 1410 forms the inner-facing surface of the article of apparel 2800. In example aspects, the composite nonwoven textiles 120 and/or 1300 are oriented such that the width direction of the textiles 120 and/or 1300 (i.e., the cross-machine direction) is oriented to extend between a first lateral side 2812 and a second lateral side 2814, and the length direction of the textiles 120 and/or 1300 (i.e., the machine direction) is oriented to extend between a waist opening 2816 and leg openings 2818 of the article of apparel 2800. This reflects that the width direction of the textiles 120 and/or 1300 have less resistance to stretch than the length direction of the textiles 120 and/or 1300. This orientation may be switched if different stretch features are desired for different portions of the article of apparel 2800.

Similar to the article of apparel 2700, the asymmetric faces of the composite nonwoven textiles 120 and/or 1300 impart different desired features to the outer-facing surface 2810 and the inner-facing surface of the article of apparel 2800. The composite nonwoven textiles 120 and/or 1300 may be utilized in other articles of apparel where different features on the outer-facing surface versus the inner-facing surface are desired. Such articles of apparel may include, for example, an upper of an article of footwear.

As stated above, it may be desirable to reduce the number of pills formed on the first face 710 and/or the second face 810 of the composite nonwoven textile 120 to achieve a different aesthetic and/or a different hand feel. In this aspect, the composite nonwoven textile 120 may be subjected to pre-formation steps and/or one or more post-processing steps that increase the resistance to pilling on the first face 710 and/or the second face 810.

Figure 29:
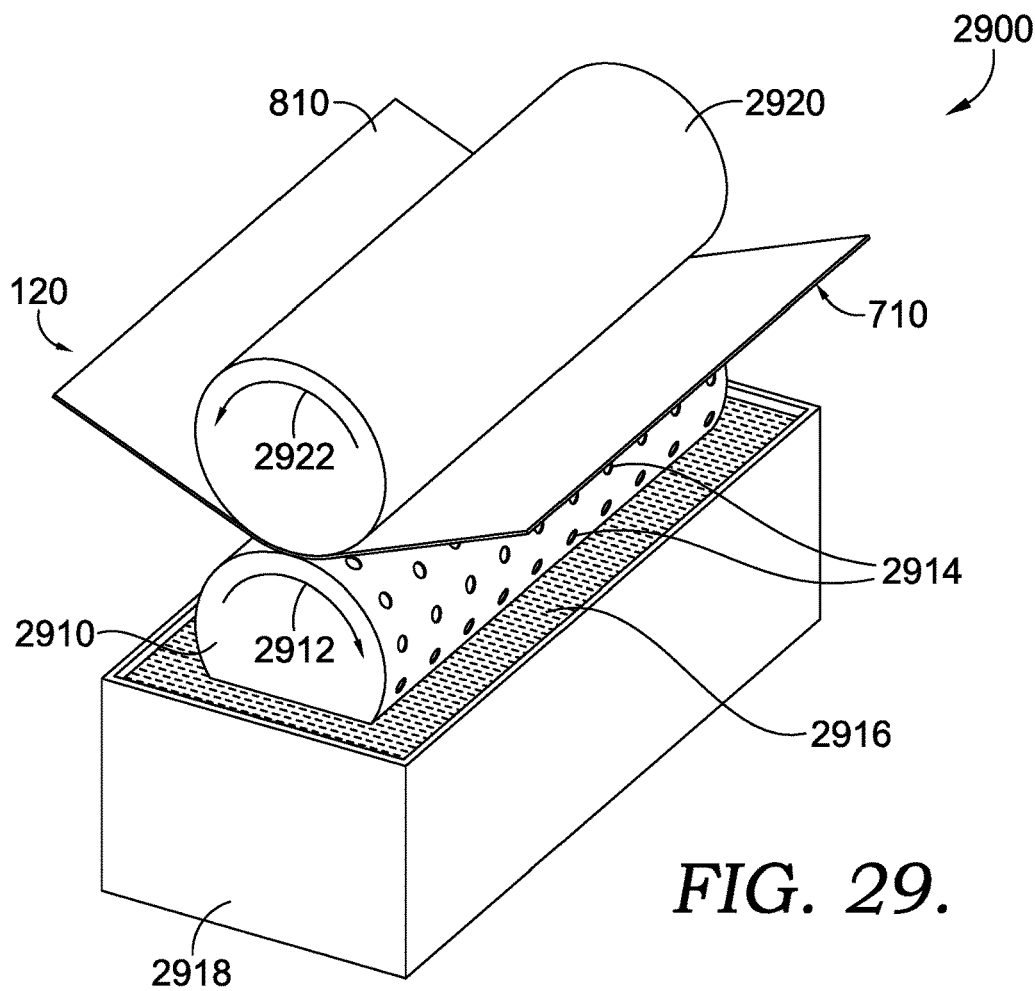
FIG. 29 illustrates an example rotogravure system for applying a chemical binder to a first face of the example composite nonwoven textile described herein in accordance with aspects herein.

FIG. 29 illustrates an example rotogravure system 2900 adapted to apply a chemical binder to the composite nonwoven textile 120 to reduce the formation of pills on at least the first face 710 of the composite nonwoven textile 120. In example aspects, the chemical binder may be applied to one or more of the webs of fibers such as the first web of fibers 110, the second web of fibers 112, and/or the third web of fibers 114 before the webs 110, 112, and/or 114 are incorporated into the composite nonwoven textile 120. In this aspect, the chemical binder may be applied to just the fibers that make up the individual webs such as the fibers 210 of the first web of fibers 110, the fibers 310 and 312 of the second web of fibers 112, and/or the fibers 410 of the third web of fibers 114. In other example aspects, the chemical binder may be applied to the finished composite nonwoven textile 120 (the composite nonwoven textile after the individual webs 110, 112, and/or 114 have been stacked and entangled with each other). In this aspect, because the fibers 110, 310 and 312, and/or 410 have been entangled with each other, when the chemical binder is applied to, for example, the first face 710, the chemical binder may bond together, for example, one or more of the fibers 210, the fibers 310 and 312, and/or the fibers 410 that are present on the first face 710.

As used herein, the term "chemical bonding" refers to the use of chemical binders (e.g., adhesive materials) that are used to hold fibers together. The chemical binder joins fibers together at fiber intersections and fiber bonding results. In one example aspect, the chemical binder may form an adhesive film the bonds the fibers together at, for example, fiber intersections. Because the fibers are adhered together, the terminal ends of the fibers are less prone to migration and pilling and the overall pilling resistance of at least the first face 710 of the composite nonwoven textile 120 is increased. Suitable chemical binders include those that comprise polymers and may include vinyl polymers and copolymers, acrylic ester polymers and copolymers, rubber and synthetic rubber, and natural binders such as starch. The chemical binder may be applied in an aqueous dispersion, an oil-based dispersion, a foam dispersion, and the like. In example aspects, a base coating or primer may be applied to the composite nonwoven textile before application of the chemical binder. In one example aspect, the chemical binder may include an oil-based polyurethane binder. The term "chemical bonding site," as used herein refers to the location of the chemical bond and it furthers refers to the chemical binder itself as applied to the composite nonwoven textile at the chemical bonding site. The components depicted in FIG. 29 are illustrative and are meant to convey general concepts associated with the rotogravure system 2900. The system 2900 may include additional components or fewer components, and the components may have different configurations than that shown.

The rotogravure system 2900 includes a gravure roller 2910 adapted to rotate in a first direction 2912. The gravure roller 2910 has an engraved pattern 2914. In example aspects, the gravure roller 2910 is supplied with a chemical binder 2916. For example, the gravure roller 2910 may be partially immersed in a tray 2918 that holds the chemical binder 2916. As the gravure roller 2910 rotates in the first direction 2912, the chemical binder 2916 fills the engraved pattern 2914. In example aspects, excess chemical binder 2916 is scraped from the gravure roller 2910 before the gravure roller 2910 makes contact with the composite nonwoven textile 120 in order to remove excess chemical binder 2916. In example aspects, a viscosity of the chemical binder 2916 before application may be selected to achieve a desired level of penetration into the composite nonwoven textile 120 after the chemical binder 2916 is applied to, for example, the first face 710 of the composite nonwoven textile 120. For example, the viscosity of the chemical binder 2916 when it is in the form of an oil-based polyurethane may range from about 960 millipascal-second (mPa·s) to about 1020 mPa·s, from about 970 mPa·s to about 1010 mPa·s, or from about 980 mPa·s to about 1000 mPa·s when at application temperatures from about 28 degrees Celsius to about 33 degrees Celsius and at a relative humidity from about 50% to about 80%.

The rotogravure system 2900 further includes an impression roller 2920 that rotates in a second direction 2922 opposite the first direction 2912. The composite nonwoven textile 120 is positioned between the impression roller 2920 and the gravure roller 2910 such that the first face 710 of the composite nonwoven textile 120 is in contact with the gravure roller 2910 and the second face 810 is in contact with the impression roller 2920. The gravure roller 2910 and the impression roller 2920 may each be adapted to apply a certain amount of pressure and heat to the composite nonwoven textile 120. For example, the pressure applied by each of the gravure roller 2910 and the impression roller 2920 may range from about 20 kg to about 60 kg, from about 25 kg to about 55 kg, or from about 30 kg to about 50 kg. Aspects herein further contemplate that the gravure roller 2910 and the impression roller 2920 may apply different amounts of pressure. For example, the gravure roller 2910 may apply a pressure of 30 kg and the impression roller 2920 may apply a pressure of 50 kg. In another example, the gravure roller 2910 may apply a pressure of 50 kg and the impression roller 2920 may apply a pressure of 30 kg. As the composite nonwoven textile 120 advances in a machine direction, the chemical binder 2916 is transferred from the engraved pattern 2914 to the first face 710. The impression roller 2920 applies force to ensure that an entirety of the first face 710 is brought into contact with the gravure roller 2910 such that an even coverage of the chemical binder 2916 is applied to the first face 710 in a pattern corresponding to the engraved pattern 2914.

Although the rotogravure system 2900 is depicted as applying the chemical binder 2916 to only the first face 710, aspects herein contemplate that the chemical binder 2916 may also be applied to the second face 810. For example, after the chemical binder 2916 is applied to the first face 710, the composite nonwoven textile 120 may be re-run through the rotogravure system 2900 such that the second face 810 is in contact with the gravure roller 2910 and the first face 710 is in contact with the impression roller 2920. In addition, or alternatively, additional rotogravure systems may be serially aligned to contact the different faces 710 and 810 of the composite nonwoven textile 120.

In example aspects, the chemical binder 2916 may compositionally comprise an oil-based dispersion of a polyurethane binder, a polyurethane binder in a dispersion that contains silica, and combinations thereof. In example aspects, the use of silica reduces the friction between fibers to which the chemical binder 2916 is applied, which will make the fibers less likely to pill when exposed to abrasion or external friction (i.e., they slide more easily relative to each other). As stated, the chemical binder 2916 acts as an adhesive helping to secure fibers together in areas where it is applied. Because the fibers are adhered together, the terminal ends of the fibers are less prone to pilling and the overall pilling resistance of at least the first face 710 of the composite nonwoven textile 120 is increased. For example, the pilling resistance may be about 2, 2.5, or more on the Martindale Pilling test. As previously described, in example aspects, when the composite nonwoven textile 120 is incorporated into a garment, the first face 710 of the composite nonwoven textile 120 forms an outer-facing surface of the garment. Thus, the application of the chemical binder 2916 helps to increase the pilling resistance of the outer-facing surface of the garment which may be more prone to abrasion than, for example, the inner-facing surface of the garment formed by the second face 810.

Figure 30:
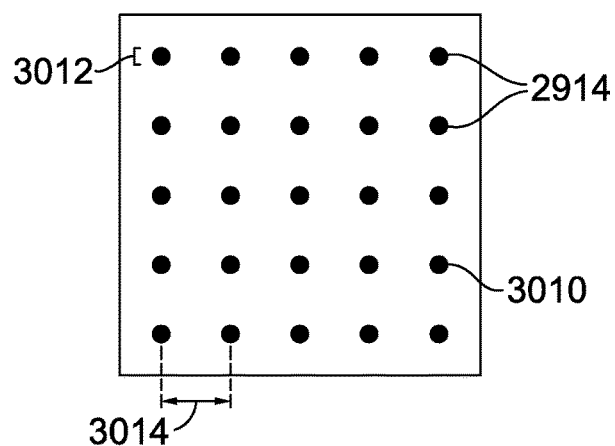
FIG. 30 illustrates an example pattern of a gravure roller of the example rotogravure system of FIG. 29 in accordance with aspects here.

FIG. 30 depicts a portion of the gravure roller 2910 including the engraved pattern 2914. The engraved pattern 2914 is depicted as a regular pattern of recessed cells, such as cell 3010, where the cells 3010 have a similar size. Aspects herein contemplate configuring the engraved pattern 2914 to include discrete shapes that are separated and distinct from one another as opposed to a continuous pattern (e.g., continuous lines or shapes that extend from each other). In example aspects, the cells 3010 may have varying depths. For example, deeper cells may transfer a larger amount of the chemical binder 2916 to the composite nonwoven textile 120 (i.e., a thicker coating), while shallower cells may transfer a smaller amount of the chemical binder 2916 to the composite nonwoven textile 120 (i.e., a thinner coating). The engraved pattern 2914 depicted in FIG. 30 is illustrative, and it is contemplated herein that other patterns, including irregular or organic patterns may be used herein. Moreover, the size of each of the cells 3010 may vary with respect to one another to achieve a desired pattern on the composite nonwoven textile 120. In example aspects, a different engraved pattern may be used when the chemical binder 2916 is applied to the second face 810. For example, to preserve the hand feel imparted by the small denier fibers 310 and 312 and the use of the silicone-coated fibers 312 on the second face 810, the engraved pattern may include smaller cells that may be spaced farther apart from each other.

In example aspects, the engraved pattern 2914 may be selected such that an average size 3012 of each cell 3010, and its corresponding chemical bonding site on the composite nonwoven textile 120 ranges from about 0.1 mm to about 1 mm. As used herein, the term "size" when referring to chemical bonding sites refers generally to the surface area occupied by the chemical bonding site. For example, if the chemical bonding site has a circular shape, the size of the chemical bonding site would be generally equal to $\Pi r^2$. Moreover, a distance 3014 between adjacent cells 3010, and the corresponding chemical bonding sites on the composite nonwoven textile 120 ranges from about 0.5 mm to about 6 mm, from about 1 mm to about 5 mm, or about 1.1 mm to about 4 mm. As used herein, the term "distance" is generally measured from a center of a first chemical bonding site to a center of a second chemical bonding site. In example aspects, the size 3012 of the cells 3010 and/or the distance 3014 between adjacent cells 3010 may be selected based on an average staple length of, for example, the fibers that form the first face 710 (e.g., the fibers 210, 310, 312, and, when used 410), and/or the fibers that form the second face 810 (e.g., the fibers 210, 310, 312, and, when used 410). As previously described, the staple length of the fibers 210, 310, and 312 may range from about 40 mm to about 60 mm, from about 45 mm to about 55 mm, or about 51 mm. In this example, the size 3012 and/or distance 3014 between adjacent cells 3010 may be less than about 60 mm, less than about 55 mm, or less than about 51 mm. This ensures that different portions of an individual fiber length are secured by the chemical binder 2916.

By configuring the engraved pattern 2914 to include discrete shapes having the size and spacing as described, a desired amount of surface area of the composite nonwoven textile 120 occupied by the resulting chemical bonding sites is achieved. In example aspects, the surface area of the composite nonwoven textile 120 occupied by the resulting chemical bonding sites is balanced by the desire to maintain the drape, hand, and growth and recovery characteristics of the composite nonwoven textile 120. For example, if the surface area of the composite nonwoven textile 120 occupied by chemical bonding sites exceeds a threshold, then the drape and growth and recovery characteristics of the composite nonwoven textile 120 are reduced due to the adhesive characteristics of the chemical binder 2916 although resistance to pilling is increased. Moreover, the hand of the composite nonwoven textile 120 may become more rubber-like which may decrease its desirability for use in apparel. Conversely, if the surface area occupied by the chemical bonding sites is below the threshold, the pilling resistance of at least the first face 710 of the composite nonwoven textile 120 may be less than desired. In example aspects, the amount of surface area of the composite nonwoven textile 120 occupied by the chemical bonding sites may be between about 10% to about 70%, or between about 40% to about 60% to produce a pilling resistance of 2 or greater while still maintaining desired drape, hand, and growth and recovery characteristics.

Using a rotogravure system, such as the rotogravure system 2900 is just one example way of applying a liquid form of the chemical binder 2916 to the composite nonwoven textile 120. Other application methods may include spraying the chemical binder 2916, and/or applying the chemical binder 2916 as a foam or powder. In these example aspects, a mask may be used in areas of the composite nonwoven textile 120 where the chemical binder 2916 is not desired. An additional application method includes digitally printing the chemical binder 2916 on to the composite nonwoven textile 120. Digital printing may be desirable, in some aspects, where a zonal application of the chemical binder 2916 is desired. For example, a computer program may be used to instruct the digital printer to print the chemical binder 2916 in a desired pattern including a pattern where the density of chemical bonding sites is greater in a first area of the composite nonwoven textile 120 compared to a second area of the composite nonwoven textile 120. As used with respect to bonding sites, the term "density" refers to a number of discrete bonding sites per $cm^2$. Zonal application of chemical bonding sites will be described further below with respect to FIGS. 34 and 35.

FIG. 31 depicts an illustrative schematic of the composite nonwoven textile 120 after being finished by the rotogravure system 2900 or the other application methods described herein. For example, FIG. 31 depicts the first face 710 of the composite nonwoven textile 120 having a plurality of chemical bonding sites 3110 with a pattern corresponding generally to, for example, the engraved pattern 2914 of the gravure roller 2910. As described, the size and spacing between adjacent chemical bonding sites 3110 may generally correspond to the size 3012 of the cells 3010 of the gravure roller 2910 and the distance 3014 between adjacent cells 3010 of the gravure roller 2910. In one example aspect, the first face 710 of the composite nonwoven textile 120 may have a first color property and the chemical bonding sites 3110 may have a second color property different from the first color property. In this aspect, the second color property of the plurality of chemical bonding sites 3110 in combination with the first color property of the first face 710 may provide an interesting visual aesthetic.

FIG. 31 further depicts a magnified view of one of the chemical bonding sites 3110. The chemical binder 2916 acts as an adhesive that chemically bonds fibers to each other at intersection points. For example, the chemical binder 2916 may chemically bond one or more of the fibers 210, the fibers 310 and 312, and/or the fibers 410 that are present on the first face 710 due to entanglement. This reduces or eliminates the tendency of the terminal ends of the fibers to extend away from the first face 710 and entangle with other fiber ends to form a pill. To describe this differently, the plurality of discrete chemical bonding sites 3110 represent isolated or discrete areas of chemically bonded fibers while remaining portions of the first face 710 include fibers that are not chemically bonded to each other.

FIG. 32 depicts an illustrative schematic of the second face 810 of the composite nonwoven textile 120. In example aspects, the chemical bonding sites 3110 may be absent from the second face 810. Stated differently, the second face 810 may not include any chemical bonding sites 3110. As previously stated, when the composite nonwoven textile 120 is incorporated into a garment, the second face 810 forms an inner-facing surface of the resulting garment. In example aspects, since the inner-facing surface is generally not visible when the resulting garment is worn, the presence or absence of pills may not be as important from an aesthetic perspective and, thus, the chemical binder 2916 may not be applied to the second face 810 in order to reduce material costs. As well, by not applying the chemical binder 2916 to the second face 810 the soft hand feel imparted by the small denier fibers 310 and 312 as well as by the use of the silicone-coated fibers 312 is preserved. However, aspects herein contemplate that the chemical binder 2916 may be applied to the second face 810 to increase the resistance to pilling when that attribute it desired. In this aspect, the surface area of the second face 810 occupied by the plurality of chemical bonding sites 3110 may be reduced compared to the first face 710. Stated differently, the surface area of the second face 810 occupied by the plurality of chemical bonding sites 3110 may be less than the surface area of the first face 710 occupied by the plurality of chemical bonding sites 3110. This is done to ensure that the soft hand imparted by the use of the silicone-coated fibers 312 and the small denier of the fibers 310 and 312 is relatively maintained.

FIG. 33 depicts a cross-section of a portion of the composite nonwoven textile 120 having a chemical bonding site 3110. In one example aspect and as shown in FIG. 33, the chemical binder 2916 at the chemical bonding site 3110 is depicted as sitting atop the first face 710 of the composite nonwoven textile 120. In example aspects, the chemical binder 2916 may have an application thickness 3310 between about 0.1 mm to about 0.2 mm to achieve a desired degree of chemical bonding of the fibers. Further, in some example aspects, the application thickness 3310 may cause the chemical binder 2916 to extend outward from the first face 710 at the chemical bonding site 3110 to form a dimple-like structure. The application thickness 3310 of the chemical binder 2916 may be adjusted based on, for instance, the depth of the cells 3010 of the gravure roller 2910 (i.e., deeper cells equates to increased thickness). In example aspects, the temperature of the gravure roller 2910 and the impression roller 2920 and the amount of pressure applied to the composite nonwoven textile 120 by the gravure roller 2910 and the impression roller 2920 as well as parameters associated with the chemical binder 2916 such as application temperature and viscosity may be adjusted to achieve more or less penetration of the chemical binder 2916 into the thickness of the composite nonwoven textile 120 with respect to the first face 710. For example, an increased pressure and a reduced viscosity may be associated with a relatively greater penetration of the chemical binder 2916 into the composite nonwoven textile 120, while a reduced temperature and an increased viscosity may be associated with a relatively reduced penetration of the chemical binder 2916 into the composite nonwoven textile 120. The level of penetration of the chemical binder 2916 may be adjusted based on desired drape, hand feel, and growth and recovery characteristics of the composite nonwoven textile 120 where a greater penetration may be associated with a reduced drape and reduced growth and recovery characteristics but an increased resistance to pilling. In example aspects, because of the material characteristics of the elastomeric layer 116 (e.g., spunbond or meltblown), the chemical binder 2916 may not extend past the elastomeric layer 116 when applied to the first face 710. Stated differently, when the chemical binder 2916 is applied to the first face 710 it does not penetrate into the second entangled web of fibers 718.

Figure 34:
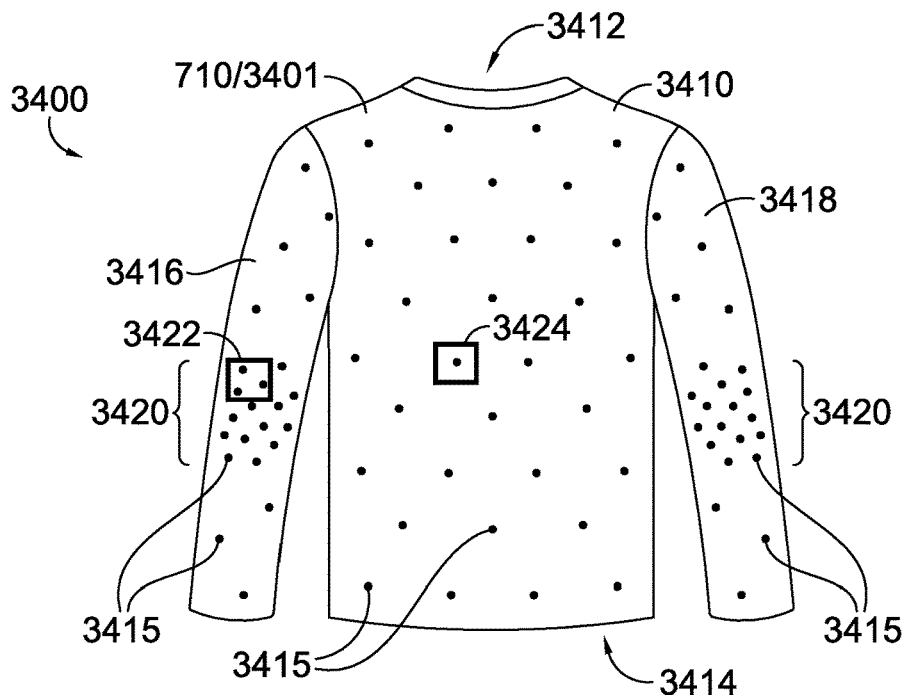
FIG. 34 illustrates a back view of an upper-body garment having a zonal application of chemical bonding sites in accordance with aspects herein.
Figure 35:
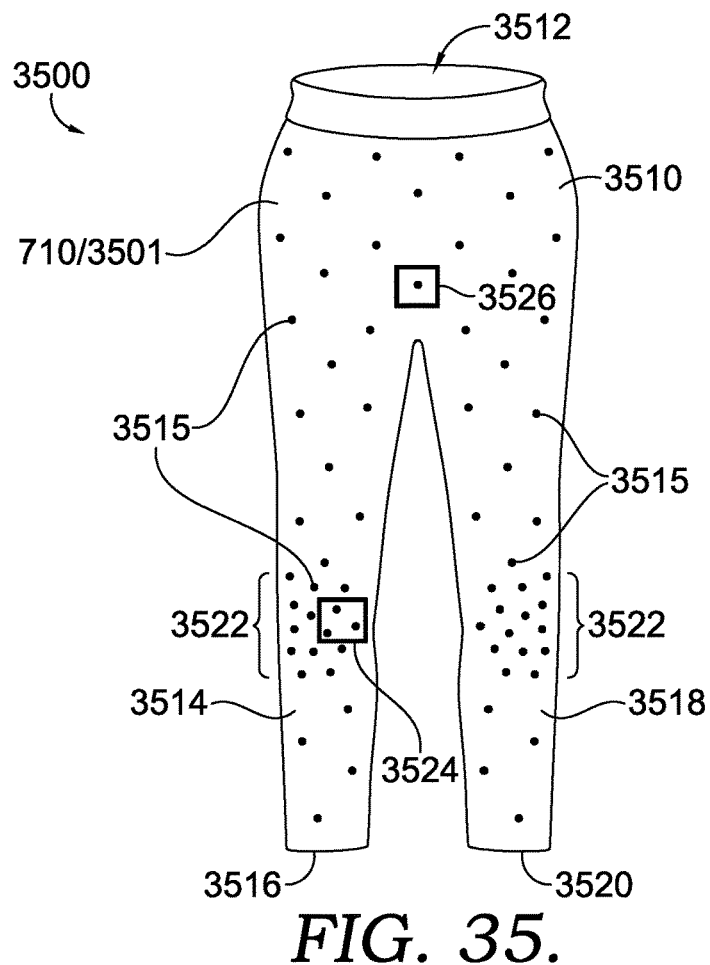
FIG. 35 illustrates a front view of a lower-body garment having a zonal application of chemical bonding sites in accordance with aspects herein.

FIGS. 34 and 35 illustrate a zonal application of the chemical binder 2916. Zonal application of the chemical binder 2916 may be executed in a number of different ways. For example, a digital printer may be used to apply the chemical binder 2916 according to a computer program that may specify areas in which a greater density of chemical bonding sites are applied and areas where a smaller density of chemical bonding sites are applied. Zonal application may also be carried out using spray, foam, or powder applications where different portions of the composite nonwoven textile are masked to produce areas having a greater density and a smaller density of chemical bonding sites. Additionally, a gravure roller, such as the gravure roller 2910 may be configured to have a greater density of cells at one portion of the gravure roller and a smaller density of cells at another portion of the gravure roller. In another example, zonal application of the chemical binder 2916 may be achieved using a cut-and-sew method where a first composite nonwoven textile may include a greater density of chemical bonding sites compared to a second composite nonwoven textile. Patterns may be cut from each of the first composite nonwoven textile and the second composite nonwoven textile, and a garment may be formed from the patterns. In this aspect, the pattern from the first composite nonwoven textile may be positioned on the garment at areas that experience relatively higher rates of abrasion.

FIG. 34 depicts a back view of an example upper-body garment 3400 having a back torso portion 3410, a front torso portion (not shown in FIG. 34) that together define a neck opening 3412 and a waist opening 3414. The upper-body garment 3400 further includes a first sleeve 3416 and an opposite second sleeve 3418. Although depicted as a long-sleeve upper-body garment, aspects herein contemplate that the upper-body garment 3400 may include other forms such as a pullover, a hoodie, a jacket/coat, a vest, a short sleeved upper-body garment, and the like. The upper-body garment 3400 may be formed from the composite nonwoven textile 120. The first face 710 of the composite nonwoven textile 120 forms an outer-facing surface 3401 of the upper-body garment 3400, and the second face 810 of the composite nonwoven textile 120 forms an inner-facing surface of the upper-body garment 3400.

The upper-body garment 3400 includes a plurality of chemical bonding sites 3415 located on at least the outer-facing surface 3401. The depiction of the chemical bonding sites is illustrative in nature and not necessarily drawn to scale. For example, the number of chemical bonding sites, the size of the chemical bonding sites, and the spacing between the chemical bonding sites is illustrative. In example aspects, the chemical bonding sites 3415 may be absent from the inner-facing surface of the upper-body garment 3400. In example aspects, a greater density of chemical bonding sites 3415 may be applied to areas of the upper-body garment 3400 that typically experience higher rates of abrasion. For example, with respect to the upper-body garment 3400, areas that may typically experience higher rates of abrasion include, for example, the elbow areas, collar area, waistband area, and cuff area. In some example aspects, the areas of application of a greater density of chemical bonding sites may be based on a particular sport for which the upper-body garment 3400 is designed. In one example where the sport is running, a greater density of chemical bonding sites may be applied along the sides of the torso portion and in the underarm portion as these areas may experience a relatively higher amount of abrasion due to a wearer's arm movements when running.

In the example shown in FIG. 34, elbow areas 3420 have a greater density of the chemical bonding sites 3415 as indicated by box 3422 compared to, for example, the back torso portion 3410, the front torso portion, and other portions of the first sleeve 3416 and the second sleeve 3418 as indicated by box 3424. The differences in density of the chemical bonding sites 3415 on the upper-body garment 3400 is illustrative, and it is contemplated herein that other portions of the upper-body garment 3400 may include a relatively greater density of the chemical bonding sites 3415 based on abrasion patterns as described above.

FIG. 35 depicts a front view of an example lower-body garment 3500 having a front torso portion 3510 and a back torso portion (not shown in FIG. 35) that together define a waist opening 3512. The lower-body garment 3500 further includes a first leg portion 3514 with a first leg opening 3516 and a second leg portion 3518 with a second leg opening 3520. Although depicted as a pant, aspects herein contemplate that the lower-body garment 3500 may include other forms such as a short, a tight, a three-quarter pant, and the like. The lower-body garment 3500 may be formed from the composite nonwoven textile 120. The first face 710 of the composite nonwoven textile 120 forms an outer-facing surface 3501 of the lower-body garment 3500, and the second face 810 of the composite nonwoven textile 120 forms an inner-facing surface of the lower-body garment 3500.

The lower-body garment 3500 includes a plurality of chemical bonding sites 3515 located on at least the outer-facing surface 3501. The depiction of the chemical bonding sites is illustrative in nature and not necessarily drawn to scale. For example, the number of chemical bonding sites, the size of the chemical bonding sites, and the spacing between the chemical bonding sites is illustrative. In example aspects, the chemical bonding sites 3515 may be absent from the inner-facing surface of the lower-body garment 3500. In example aspects, a greater density of the chemical bonding sites 3515 may be applied to areas of the lower-body garment 3500 that typically experience higher rates of abrasion. Some example locations include the knee areas, the waist opening area, leg cuff areas, and/or the buttocks portion. Similar to the upper-body garment 3400, the areas of application of a greater density of chemical bonding sites may be based on a particular sport for which the lower-body garment 3500 is designed. For example, where the sport is running or cycling, a greater density of chemical bonding sites may be applied along the inner thigh portions of the lower-body garment 3500 as these areas may experience a relatively higher amount of abrasion due to a wearer's leg movements when running and/or cycling.

In the example shown in FIG. 35, knee areas 3522 may have a greater density of the chemical bonding sites 3515 as indicated by box 3524 compared to, for example, the front torso portion 3510, the back torso portion, and other portions of the first leg portion 3514 and the second leg portion 3518 as indicated by box 3526. The difference in density of the chemical bonding sites 3515 on the lower-body garment 3500 is illustrative, and it is contemplated herein that other portions of the lower-body garment 3500 may include a relatively greater density of the chemical bonding sites 3515 based on abrasion patterns as described above.

Figure 36:
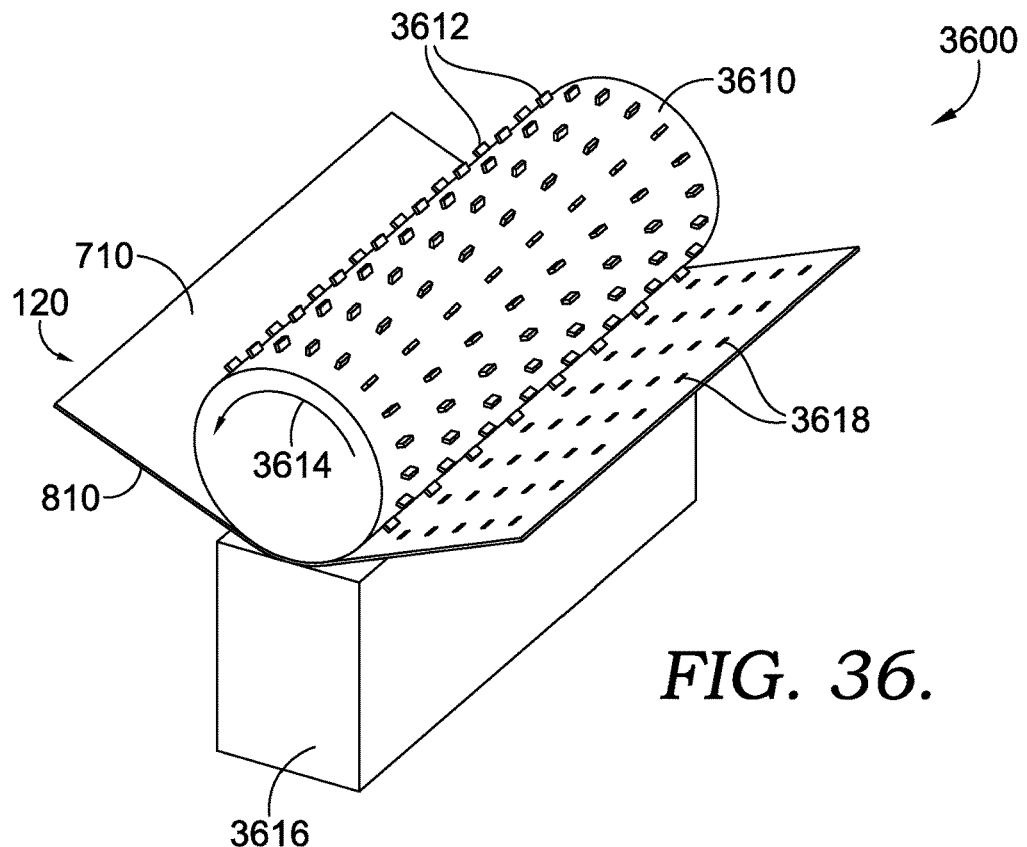
FIG. 36 illustrates an example ultrasonic bonding system for creating thermal bonding sites on the example composite nonwoven textile described herein in accordance with aspects herein.

FIG. 36 illustrates an example ultrasonic bonding system 3600 adapted to form discrete thermal bonds on the composite nonwoven textile 120 to reduce the formation of pills on at least the first face 710 of the composite nonwoven textile 120. Although an ultrasonic bonding system is described herein, aspects contemplate other ways of forming thermal bonds such as the direct application of heat (e.g., heated air) and/or pressure. In example aspects, the thermal bonding process may be applied to one or more of the webs of fibers such as the first web of fibers 110, the second web of fibers 112, and/or the third web of fibers 114 before the webs 110, 112, and/or 114 are incorporated into the composite nonwoven textile 120. In this aspect, the thermal bonds of the individual webs would include just the fibers that make up the individual webs such as the fibers 210 of the first web of fibers 110, the fibers 310 and 312 of the second web of fibers 112, and/or the fibers 410 of the third web of fibers 114. In other example aspects, the thermal bonding process may be applied to the finished composite nonwoven textile 120 (the composite nonwoven textile after the individual webs 110, 112, and/or 114 have been stacked and entangled with each other). In this aspect, because the fibers 110, 310 and 312, and/or 410 have been entangled with each other, the thermal bonds would bond together, for example, one or more of the fibers 210, the fibers 310 and 312, and/or the fibers 410.

As used herein, the term "thermal bonding" refers to a process that may include locally heating fibers to melt, partially melt, and/or soften the fibers. This permits polymer chain relaxation and diffusion or polymer flow across fiber-fiber interfaces between two crossing fibers. Subsequent cooling of the fibers causes them to re-solidify and to trap the polymer chain segments that diffused across the fiber-fiber interfaces. The thermal bonds trap the terminal ends of the fibers and makes the fibers ends less prone to interacting with other fiber ends to form pills. As used herein, the term "thermal bonding site," refers to the location of the thermal bond on the composite nonwoven textile, and the term "thermal bond structure" refers to the actual structure formed by the re-solidified fibers and/or materials and typically includes fibers and materials from the different webs of fibers used to form the composite nonwoven textile 120. The term "film form" as used herein also refers to a structure formed by the re-solidified fibers and/or materials. The components depicted in FIG. 36 are illustrative and are meant to convey general concepts associated with the ultrasonic bonding system 3600. The system 3600 may include additional components or fewer components, and the components may have different configurations than that shown.

The ultrasonic bonding system 3600 may include an impression roller 3610 having an impression pattern 3612. The impression pattern 3612, in example aspects, may include a plurality of discrete projections extending away from the impression roller 3610. As described further below, a size of the projections and a spacing between adjacent projections may be selected to provide a desired thermal bonding pattern. Although the projections are depicted as having a rectangular shape, this is illustrative and other shapes are contemplated herein (e.g., circles, triangles, squares, and the like). The impression roller 3610 is configured to rotate in a first direction 3614.

The ultrasonic bonding system 3600 further includes a sonotrode or ultrasonic horn 3616. The composite nonwoven textile 120 is positioned between the impression roller 3610 and the ultrasonic horn 3616 such that, in one example aspect, the first face 710 of the composite nonwoven textile 120 is in contact with the impression roller 3610 and the second face 810 is in contact with the ultrasonic horn 3616. Aspects herein further contemplate that the second face 810 of the composite nonwoven textile 120 is in contact with the impression roller 3610 and the first face 710 is in contact with the ultrasonic horn 3616.

As the composite nonwoven textile 120 advances in a machine direction, the impression roller 3610 applies pressure to discrete areas of the composite nonwoven textile 120 based on the impression pattern 3612. Stated differently, pressure is applied to the composite nonwoven textile 120 in areas corresponding to the projections that form the impression pattern 3612. In example aspects, the pressure applied to the composite nonwoven textile 120 may be between about 2 kg/cm$^2$ to about 4.6 kg/cm$^2$. The pressure causes the discrete areas of the composite nonwoven textile 120 to come firmly into contact with the ultrasonic horn 3616 which delivers ultrasonic vibrations to heat up the fibers forming the composite nonwoven textile 120 to a melted, partially melted, and/or softened state which forms a plurality of thermal bonding sites 3618 (described further below). Pressures below these values may cause insufficient contact with the ultrasonic horn 3616 and the resulting thermal bonds may be weakened. At the thermal bonding sites 3618, the fibers 210, 310 and 312, and, when used, the fibers 410 may be melted or softened together and have a film form at the thermal bonding sites 3618. Additionally, a portion of the elastomeric layer 116 may be melted or softened together with the fibers 210, the fibers 310 and 312, and the fibers 410 (when used) at the thermal bonding sites 3618. Because the fibers 210, 310 and 312, and the fibers 410 (when used) are melted or softened together at the thermal bonding sites 3618, there are reduced fiber ends available for pilling and, thus, pilling resistance of the composite nonwoven textile 120 is increased on both the first face 710 and the second face 810.

By configuring the impression pattern 3612 to include discrete shapes having particular sizes and spacing, a desired amount of surface area of the composite nonwoven textile 120 occupied by the resulting thermal bonding sites is achieved. In example aspects, the surface area of the composite nonwoven textile 120 occupied by the resulting thermal bonding sites is balanced by the desire to maintain the drape, and growth and recovery characteristics of the composite nonwoven textile 120. For example, if the surface area of the composite nonwoven textile 120 occupied by thermal bonding sites exceeds a threshold, then the drape and growth and recovery characteristics of the composite nonwoven textile 120 are reduced although resistance to pilling is increased. Conversely, if the surface area occupied by the thermal bonding sites is below the threshold, the pilling resistance of at least the first face 710 of the composite nonwoven textile 120 may be less than desired. In example aspects, the amount of surface area of the composite nonwoven textile 120 occupied by the thermal bonding sites may be between about 5% to about 50%, between about 5% to about 30%, or between about 6% to about 25% to achieve a pilling resistance of 2 or greater.

Figure 37:
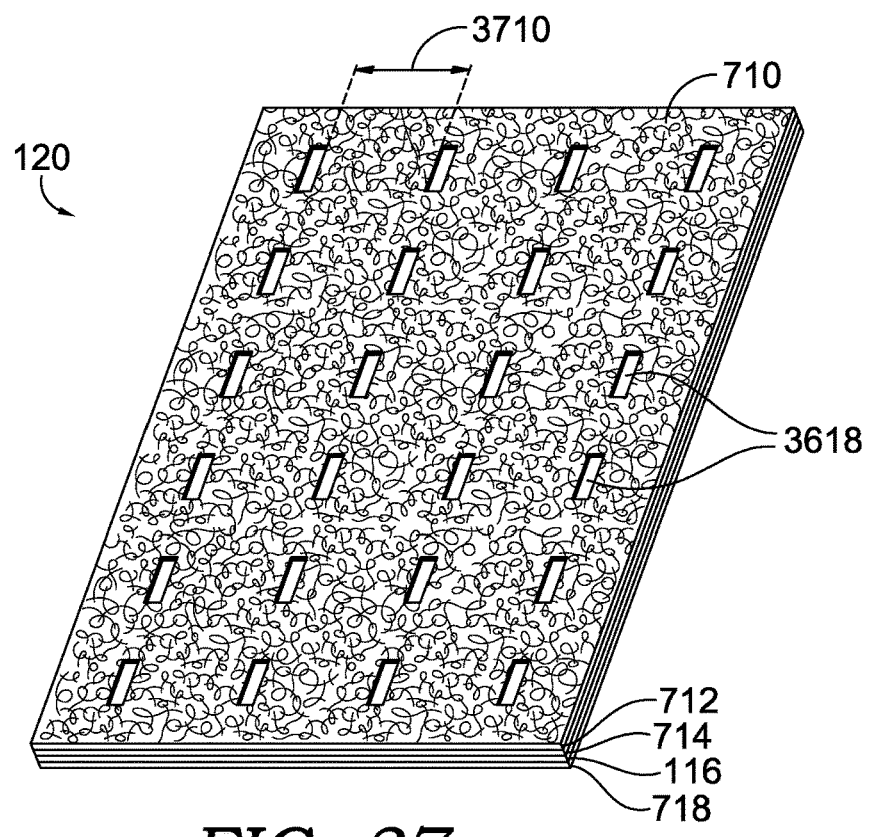
FIG. 37 illustrates a first face of the composite nonwoven textile after the thermal bonding sites have been created using the example ultrasonic bonding system of FIG. 36 in accordance with aspects herein.

FIG. 37 depicts an illustrative schematic of the first face 710 of the composite nonwoven textile 120 after finishing by the ultrasonic bonding system 3600. In this example, the first face 710 is positioned to be in contact with the impression roller 3610, and the second face 810 is positioned to be in contact with the ultrasonic horn 3616. The composite nonwoven textile 120 includes the plurality of thermal bonding sites 3618. Each thermal bonding site 3618 includes a thermal bond structure (described further below) that is offset relative to the first face 710 in a direction extending toward the second face 810. Stated differently, the thermal bond structure is located between the first face 710 and the second face 810. As such, the first face 710 retains a generally smooth, planar configuration which may be desirable from a comfort and aesthetic perspective. A distance 3710 between adjacent thermal bonding sites 3618 may, in example aspects, be less than or equal to an average fiber length of the fibers present on the first face 710 (e.g., the fibers 210, the fibers 310 and 312, and/or the fibers 410). For example, the spacing may be less than or equal to about 60 mm, less than about 55 mm, or less than about 51 mm. In example aspects, the size of the thermal bonding sites 3618 may be between about 0.75 mm to about 4 mm, between about 1 mm and about 3.5 mm, or between about 1 mm and about 3 mm. The distance 3710 between adjacent thermal bonding sites 3618 may be between about 3 mm to about 7 mm, or between about 4 mm and 6 mm.

Figure 38:
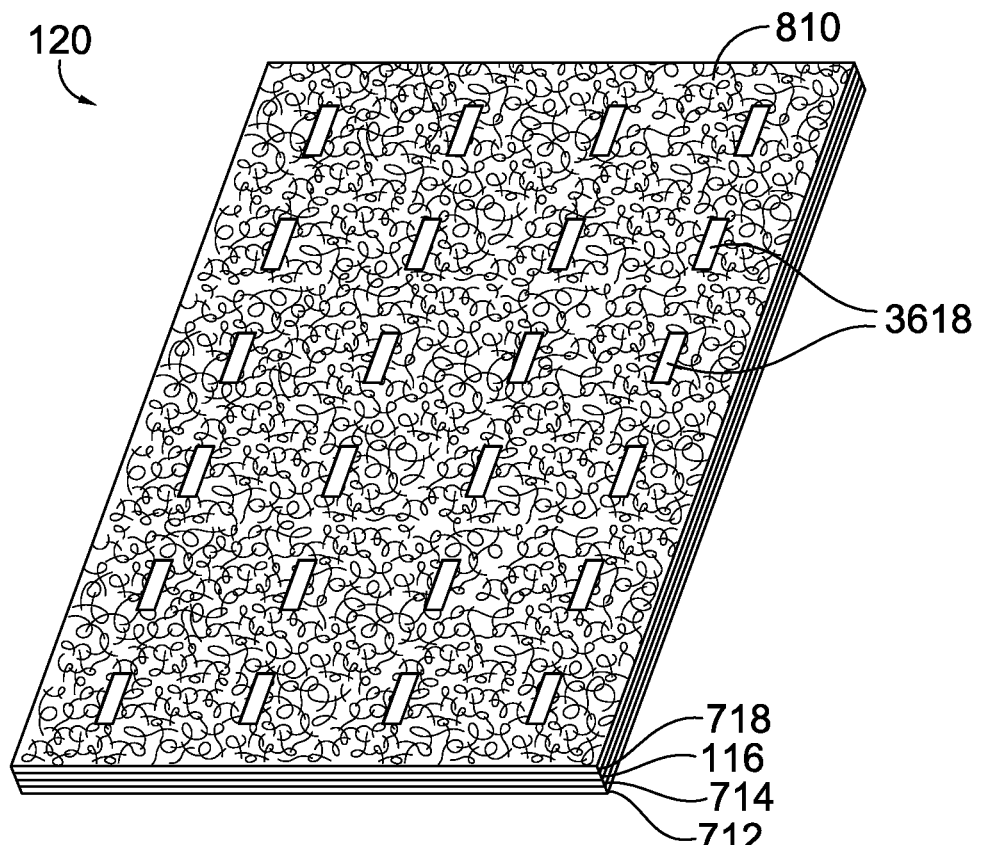
FIG. 38 illustrates an opposite second face of the composite nonwoven textile of FIG. 37 depicting the thermal bonding sites in accordance with aspects herein.

FIG. 38 depicts an illustrative schematic of the second face 810 of the composite nonwoven textile 120 after finishing by the ultrasonic bonding system 3600. The second face 810 further includes the plurality of thermal bonding sites 3618. The thermal bond structures associated with the thermal bonding sites 3618 are further offset relative to the second face 810 in a direction extending toward the first face 710. As such, the thermal bond structures are located between the first face 710 and the second face 810. Similar to the first face 710, the second face 810 retains a generally smooth, planar configuration which makes it desirable from at least a comfort perspective since the second face 810 forms the inner-facing surface of a resulting garment.

With respect to the thermal bonding pattern depicted in FIGS. 37 and 38, the primary direction of the thermal bonds is in the machine direction of the composite nonwoven textile 120. This is based on the impression pattern 3612 comprising shapes having a long axis and a short axis and aligning the long axis of the shapes in the machine direction of the composite nonwoven textile 120. In example aspects, aligning the primary direction of the thermal bonds in the machine direction helps to preserve the stretch and recovery properties of the composite nonwoven textile 120 in the cross machine direction. Stated differently, as described above, stretch and recovery of the composite nonwoven textile 120 in the machine direction may be less than the cross-machine direction due to the general orientation of the fibers of each layer and the strain or tension placed on the fibers of the composite nonwoven textile 120 during the needlepunching process. Thus, aligning the primary direction of the thermal bonds in the machine direction helps to limit the effect of the thermal bonds in the cross-machine direction of the composite nonwoven textile 120 and preserves the stretch and recovery of the textile 120 in the cross-machine direction.

Figure 39:
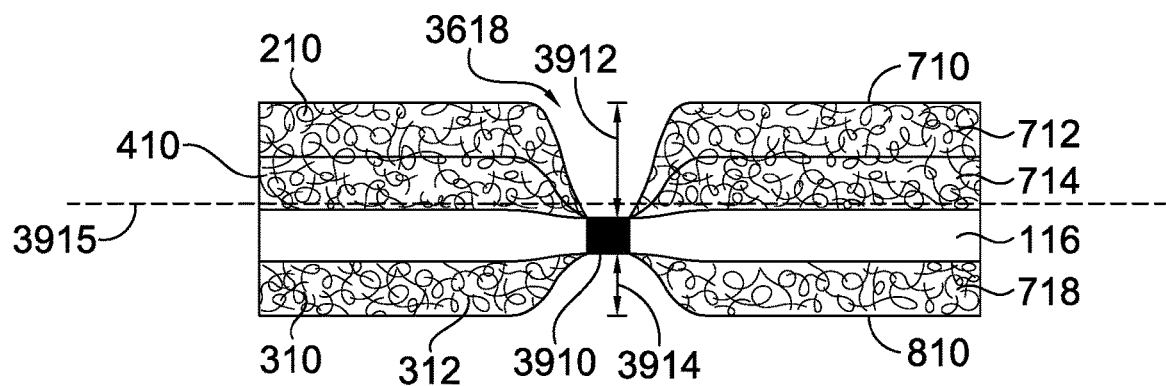
FIG. 39 illustrates a cross-section of the composite nonwoven textile of FIG. 37 in accordance with aspects herein.

FIG. 39 depicts a cross-section of the composite nonwoven textile 120 taken at a thermal bonding site 3618. The thermal bonding site 3618 includes a thermal bond structure 3910 that is offset relative to the first face 710 in a direction extending toward the second face 810 and is further offset relative to the second face 810 in a direction extending toward the first face 710. The bi-directional offset of the thermal bond structure 3910 may be due to a combination of the pressure and depth of the projections that form the impression pattern 3612 of the impression roller 3610 and the melting of all the layers of the composite nonwoven textile caused by the ultrasonic horn 3616 at the thermal bonding sites 3618. The thermal bond structure 3910 is a cohesive structure formed at least by the melted, partially melted, and/or softened and re-solidified fibers 210. The thermal bond structure 3910 may also include melted, partially melted, and/or softened and re-solidified fibers 310 and 312 and, when used, melted, partially melted, and/or softened and re-solidified fibers 410. Additionally, the thermal bond structure 3910 may include melted, partially melted, and/or softened and re-solidified materials, including fibers, from the elastomeric layer 116. Stated differently, the fibers 210, 310 and 312, the fibers 410 (when used), and/or the portion from the elastomeric layer 116 are in a film form at the thermal bond structure 3910. As depicted, in example aspects, fibers 210 from the first entangled web of fibers 712 extend from the thermal bond structure 3910. FIG. 39 further depicts fibers 310 and 312 from the second entangled web of fibers 718 extending from the thermal bond structure 3910. Additionally, fibers 410 from the third entangled web of fibers 714 (when used) extend from the thermal bond structure 3910. In some example aspects, the melting of the fibers 210, 310, 312, and 410 and the elastomeric layer 116 may be such that pores or pin holes are formed that form a fluid communication path that allows air and water vapor to flow from the second face 810 to the first face 710 of the composite nonwoven textile 120 while substantially preventing liquid (e.g., precipitation) from flowing from the first face 710 to the second face 810.

In some example aspects, the thermal bond structure 3910 is offset a first average depth 3912 relative to the first face 710 and is further offset a second average depth 3914 relative to the second face 810, where the first average depth 3912 may be greater than the second average depth 3914. Stated differently, the thermal bond structure 3910 is offset with respect to both the first face 710 and the second face 810 and with respect to a center plane 3915 of the composite nonwoven textile 120 where the center plane 3915 is positioned approximately halfway between the first face 710 and the second face 810. In the example aspect shown in FIGS. 37-39, the thermal bond structure 3910 is positioned between the center plane 3915 and the second face 810. Aspects herein also contemplate that the first average depth 3912 is less than the second average depth 3914. In this aspect, the thermal bond structure 3910 would be positioned between the center plane 3915 and the first face 710.

As depicted in FIG. 39, the composite nonwoven textile 120 is thinner at locations corresponding to the thermal bond structure 3910. A functional result of this is that permeability and/or breathability of the textile 120 may be increased at the thermal bonding sites 3618 compared to areas of the composite nonwoven textile 120 that do not include the thermal bonding sites 3618. The permeability and/or breathability of the textile 120 at the thermal bonding sites 3618 may be enhanced by the pores discussed above. The increase in the permeability and/or breathability at the proximity of the thermal bonding sites 3618 may be a desirable property of a resulting article of apparel allowing moisture or perspiration produced by a wearer and transformed into vapor to dissipate through the pores.

Figure 40:
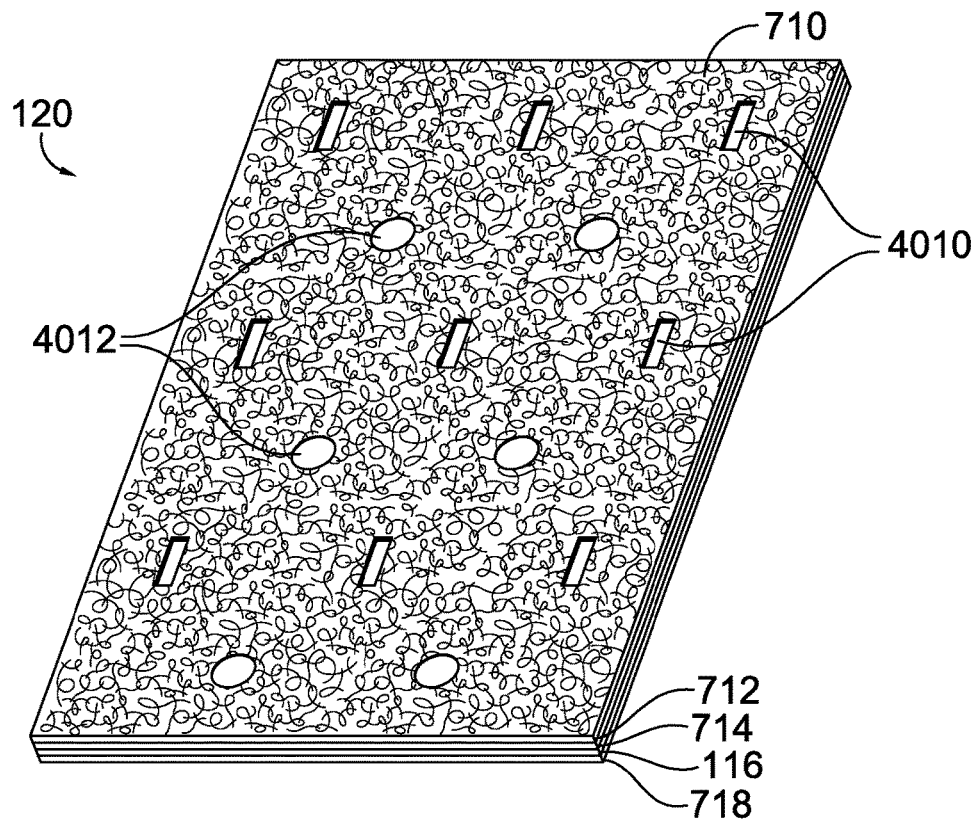
FIG. 40 illustrates a first face of an example composite nonwoven textile having two sets of thermal bonding sites created using the example ultrasonic bonding system of FIG. 36 in accordance with aspects herein.

FIG. 40 depicts an illustrative schematic of the first face 710 of the composite nonwoven textile 120 where the composite nonwoven textile 120 includes a first plurality of discrete thermal bonding sites 4010 and a second plurality of discrete thermal bonding sites 4012. In example aspects, the first plurality of thermal bonding sites 4010 may be formed using the ultrasonic bonding system 3600 where the first face 710 is positioned to be in contact with the impression roller 3610 and the second face 810 is positioned to be in contact with the ultrasonic horn 3616. The second plurality of thermal bonding sites 4012 may be formed using the ultrasonic bonding system 3600 where the second face 810 is positioned to be in contact with an impression roller having a different pattern than the impression roller 3610 and the first face 710 is positioned to be in contact with then ultrasonic horn 3616.

In example aspects, the first plurality of discrete thermal bonding sites 4010 are arranged in a first pattern, and the second plurality of discrete thermal bonding sites 4012 are arranged in a second pattern that is different from the first pattern. For instance, the first plurality of discrete thermal bonding sites 4010 may be distinct and separate from the second plurality of discrete thermal bonding sites 4012 such that the first plurality of discrete thermal bonding sites 4010 do not overlap or only partially overlap with the second plurality of discrete thermal bonding sites 4012. Further, as shown in FIG. 40, aspects herein contemplate that the shape of the first plurality of discrete thermal bonding sites 4010 may be different from the shape of the second plurality of discrete thermal bonding sites 4012 (rectangular versus circle), although aspects herein further contemplate that the shape of each of the first plurality of discrete thermal bonding sites 4010 and the second plurality of discrete thermal bonding sites 4012 is the same (e.g., both rectangles or both circles).

Figure 41:
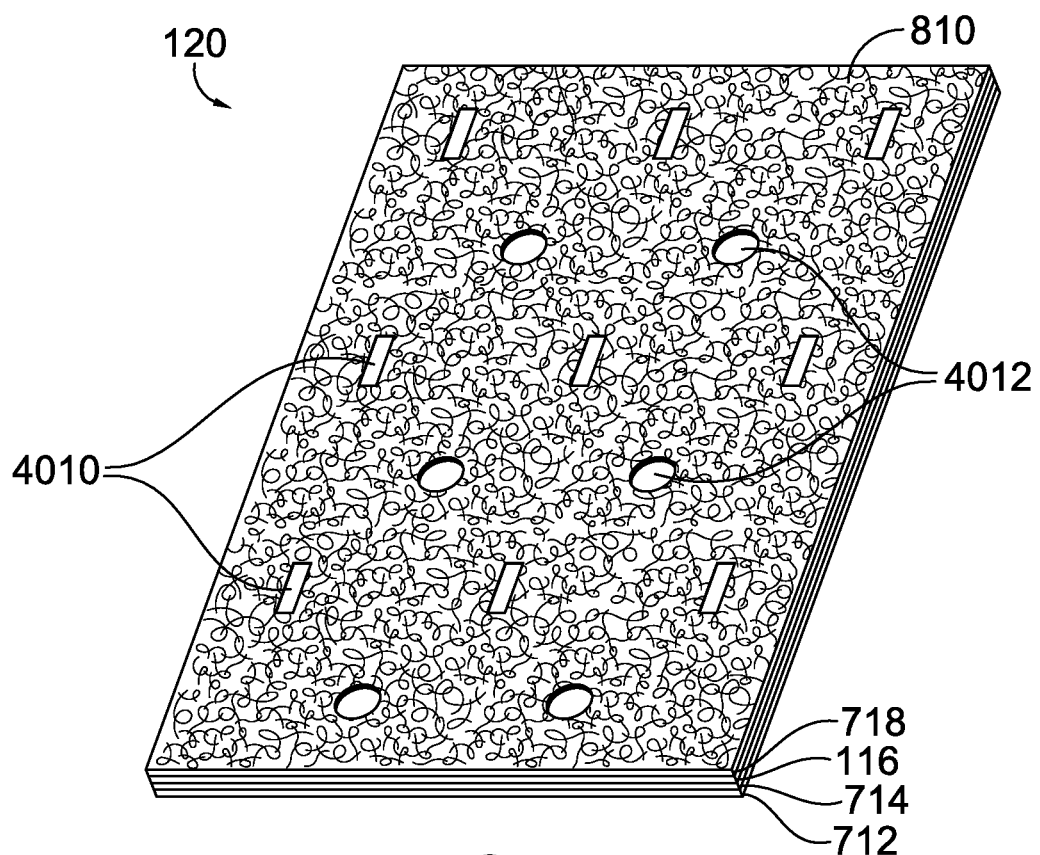
FIG. 41 illustrates an opposite second face of the composite nonwoven textile of FIG. 40 depicting the two set of thermal bonding sites in accordance with aspects herein.
Figure 42:
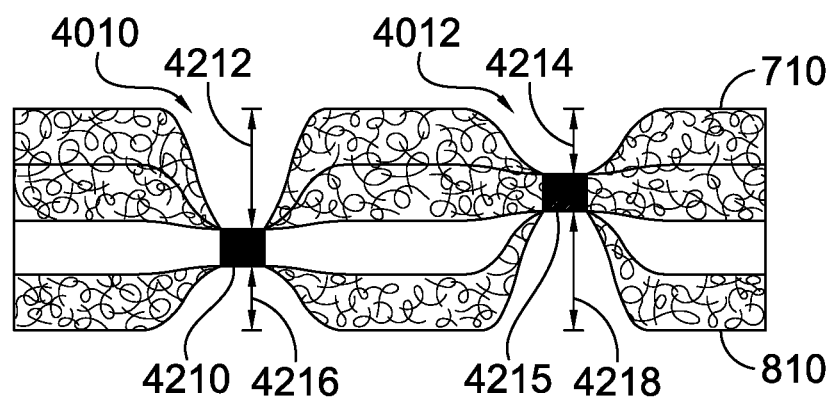
FIG. 42 illustrates a cross-section of the composite nonwoven textile of FIG. 40 in accordance with aspects herein.

FIG. 41 depicts an illustrative schematic of the second face 810 of the composite nonwoven textile 120 of FIG. 40. As depicted, the second face 810 further includes the first plurality of thermal bonding sites 4010 and the second plurality of thermal bonding sites 4012. FIG. 42 depicts a cross-section taken through a thermal bonding site 4010 and a thermal bonding site 4012. The thermal bonding site 4010 includes a first thermal bond structure 4210 that is offset a first depth 4212 relative to the first face 710 in a direction extending toward the second face 810. The thermal bonding site 4012 includes a second thermal bond structure 4215 that is offset a second depth 4214 relative to the first face 710 in a direction extending toward the second face 810. In example aspects, the first depth 4212 is greater than the second depth 4214.

From the perspective of the second face 810, the first thermal bond structure 4210 is offset a third depth 4216 relative to the second face 810 in a direction extending toward the first face 710. The second thermal bond structure 4215 is offset a fourth depth 4218 relative to the second face 810 in a direction extending toward the first face 710. In example aspects, the third depth 4216 is less than the first depth 4212 and the fourth depth 4218 is greater than the second depth 4214. In addition, the fourth depth 4218 is greater than the third depth 4216.

Applying thermal bonding sites to both faces of the composite nonwoven textile 120 may act to increase the resistance to pilling for both the first face 710 and the second face 810. For example, the thermal bonding sites 4010 created when the first face 710 is positioned against the impression roller 3610 may help to capture a greater percentage of the fibers from the first entangled web of fibers 712 in the first thermal bond structure 4210, and the thermal bonding sites 4012 created when the second face 810 is positioned against the impression roller may help to capture a greater percentage of the fibers from the second entangled web of fibers 718 in the second thermal bond structure 4215 with the result that a smaller percentage of the fibers from the first entangled web of fibers 712 are available for pilling and a smaller percentage of the fibers from the second entangled web of fibers 718 are available for pilling.

Figure 43:
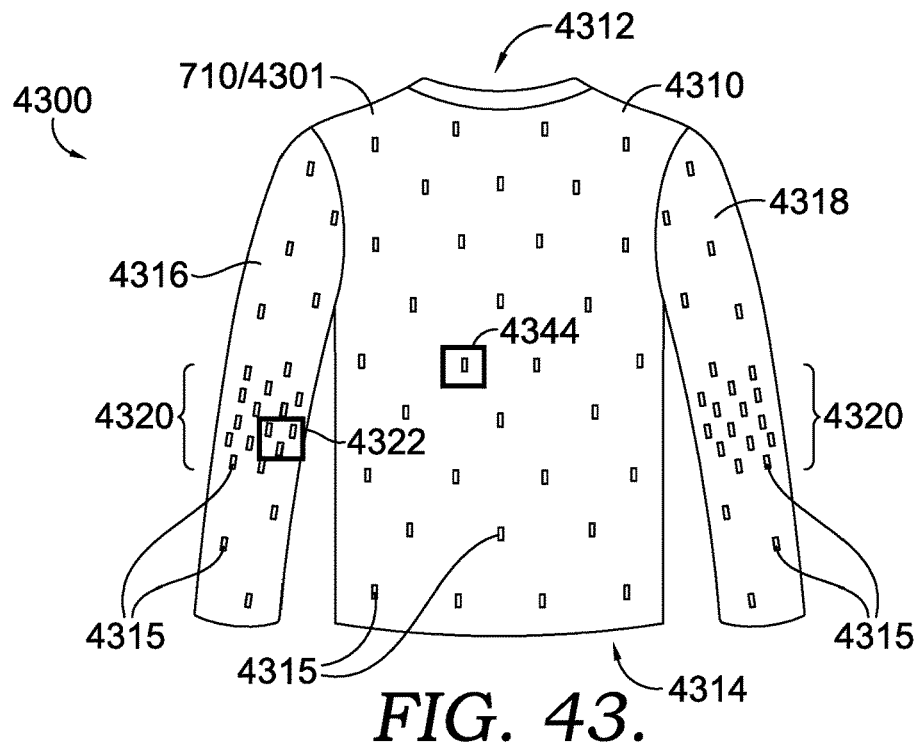
FIG. 43 illustrates a back view of an upper-body garment having a zonal application of thermal bonding sites in accordance with aspects herein.
Figure 44:
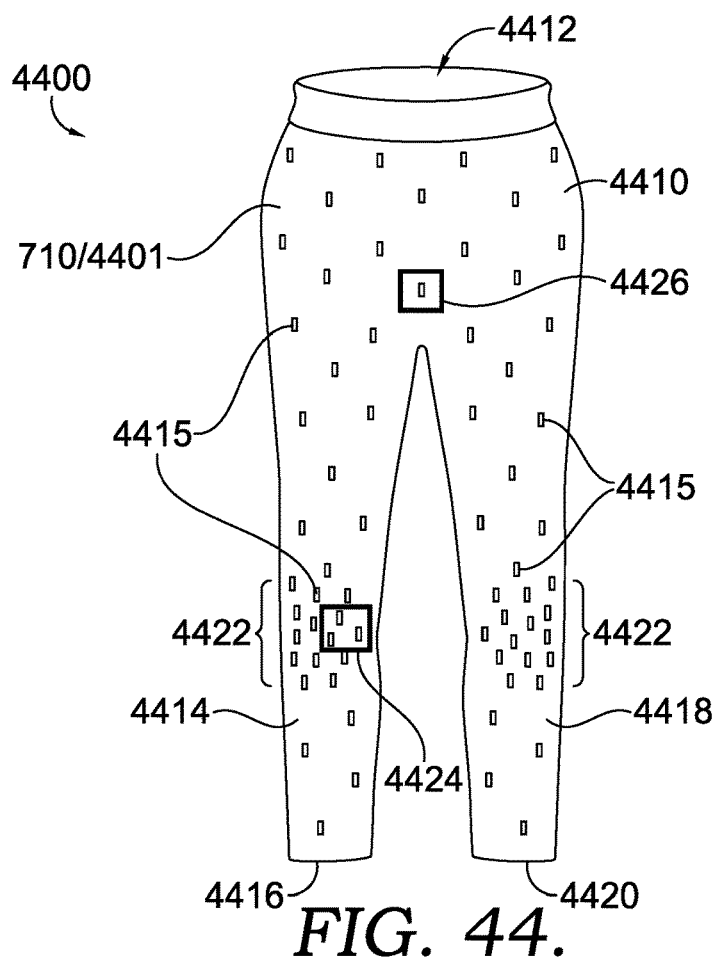
FIG. 44 illustrates a front view of a lower-body garment having a zonal application of thermal bonding sites in accordance with aspects herein.

FIGS. 43 and 44 illustrate a zonal application of thermal bonding sites. Zonal application of thermal bonding sites may be executed in a number of different ways. For example, an impression roller, such as the impression roller 3610 may be configured to have a greater density of projections at one portion of the impression roller and a smaller density of projections at another portion of the impression roller. Zonal application of thermal bonding sites may also occur through zonal application of ultrasonic waves, heat and/or pressure. Zonal application of thermal bonding sites may also be achieved using a cut-and-sew method where a first composite nonwoven textile may include a greater density of thermal bonding sites compared to a second composite nonwoven textile. Patterns may be cut from each of the first composite nonwoven textile and the second composite nonwoven textile, and a garment may be formed from the patterns. In this aspect, the pattern from the first composite nonwoven textile may be positioned on the garment at areas that experience relatively higher rates of abrasion. The zonal application may be based on, for example, maps of areas of garments prone to moderate to high amounts of abrasion.

FIG. 43 depicts a back view of an example upper-body garment 4300 having a back torso portion 4310, a front torso portion (not shown in FIG. 43) that together define a neck opening 4312 and a waist opening 4314. The upper-body garment 4300 further includes a first sleeve 4316 and an opposite second sleeve 4318. Although depicted as a long-sleeve upper-body garment, aspects herein contemplate that the upper-body garment 4300 may include other forms such as a pullover, a hoodie, a jacket/coat, a vest, a short sleeved upper-body garment, and the like. The upper-body garment 4300 may be formed from the composite nonwoven textile 120. The first face 710 of the composite nonwoven textile 120 forms an outer-facing surface 4301 of the upper-body garment 4300, and the second face 810 of the composite nonwoven textile 120 forms an inner-facing surface of the upper-body garment 4300.

The upper-body garment 4300 includes a plurality of thermal bonding sites 4315 located on at least the outer-facing surface 4301. The depiction of the thermal bonding sites is illustrative in nature and not necessarily drawn to scale. For example, the number of thermal bonding sites, the size of the thermal bonding sites, and the spacing between the thermal bonding sites is illustrative. In example aspects, a greater density of thermal bonding sites 4315 may be applied to areas of the upper-body garment 4300 that typically experience higher rates of abrasion. For example, with respect to the upper-body garment 4300, areas that may typically experience higher rates of abrasion include, for example, the elbow areas, collar area, waistband area, and cuff area. In some example aspects, the areas of application of a greater density of thermal bonding sites may be based on a particular sport for which the upper-body garment 4300 is designed. In one example where the sport is running, a greater density of thermal bonding sites may be applied along the sides of the torso portion and in the underarm portion as these areas may experience a relatively higher amount of abrasion due to a wearer's arm movements when running.

In the example shown in FIG. 43, elbow areas 4320 have a greater density of the thermal bonding sites 4315 as indicated by box 4322 compared to, for example, the back torso portion 4310, the front torso portion, and other portions of the first sleeve 4316 and the second sleeve 4318 as indicated by box 4344. The differences in density of the thermal bonding sites 4315 on the upper-body garment 4300 is illustrative, and it is contemplated herein that other portions of the upper-body garment 4300 may include a relatively greater density of the thermal bonding sites 4315 based on abrasion patterns as described above.

FIG. 44 depicts a front view of an example lower-body garment 4400 having a front torso portion 4410 and a back torso portion (not shown in FIG. 44) that together define a waist opening 4412. The lower-body garment 4400 further includes a first leg portion 4414 with a first leg opening 4416 and a second leg portion 4418 with a second leg opening 4420. Although depicted as a pant, aspects herein contemplate that the lower-body garment 4400 may include other forms such as a short, a tight, a three-quarter pant, and the like. The lower-body garment 4400 may be formed from the composite nonwoven textile 120. The first face 710 of the composite nonwoven textile 120 forms an outer-facing surface 4401 of the lower-body garment 4400, and the second face 810 of the composite nonwoven textile 120 forms an inner-facing surface of the lower-body garment 4400.

The lower-body garment 4400 includes a plurality of thermal bonding sites 4415 located on at least the outer-facing surface 4401. The depiction of the thermal bonding sites is illustrative in nature and not necessarily drawn to scale. For example, the number of thermal bonding sites, the size of the thermal bonding sites, and the spacing between the thermal bonding sites is illustrative. In example aspects, a greater density of the thermal bonding sites 4415 may be applied to areas of the lower-body garment 4400 that typically experience higher rates of abrasion. Some example locations include the knee areas, leg cuff areas, the waist opening area, and/or the buttocks portion. Similar to the upper-body garment 4300, the areas of application of a greater density of thermal bonding sites may be based on a particular sport for which the lower-body garment 4400 is designed. For example, where the sport is running or cycling, a greater density of thermal bonding sites may be applied along the inner thigh portions of the lower-body garment 4400 as these areas may experience a relatively higher amount of abrasion due to a wearer's leg movements when running and/or cycling.

In the example shown in FIG. 44, knee areas 4422 may have a greater density of the thermal bonding sites 4415 as indicated by box 4424 compared to, for example, the front torso portion 4410, the back torso portion, and other portions of the first leg portion 4414 and the second leg portion 4418 as indicated by box 4426. The difference in density of the thermal bonding sites 4415 on the lower-body garment 4400 is illustrative, and it is contemplated herein that other portions of the lower-body garment 4400 may include a relatively greater density of the thermal bonding sites 4415 based on abrasion patterns as described above.

In example aspects, the thermal bonding sites created through use of the ultrasonic bonding system 3600 may be combined with the chemical bonding sites created through, for example, the rotogravure system 2900 to further increase pilling resistance of the composite nonwoven textile 120. In this aspect, the composite nonwoven textile 120 may first be processed using the rotogravure system 2900 and then subsequently processed using the ultrasonic bonding system 3600. In this aspect, at least some of the thermal bonding sites created through use of the ultrasonic bonding system 3600 may be located in the same location, or close to the same location (e.g., may partially overlap) as the chemical bonding sites created through use of the rotogravure system 2900. In example aspects, the thermal bonds may help to heat set the chemical binder at the chemical bonding sites thus increasing the durability and longevity of the chemical bonding sites especially after repeated wash and wear. Conversely, the composite nonwoven textile 120 may first be processed using the ultrasonic bonding system 3600 and then subsequently processed using the rotogravure system 2900.

In example aspects, the engraved pattern 2914 of the gravure roller 2910 and the impression pattern 3612 of the impression roller 3610 may be configured such that the resulting chemical bonding sites and thermal bonding sites on the composite nonwoven textile 120 are distinct and separate from one another and do not overlap. This facilitates a desired amount of surface area of the composite nonwoven textile 120 to include chemical bonding sites and thermal bonding sites while minimizing usage of the chemical binder 2916 and reducing energy expenditure of both the rotogravure system 2900 and the ultrasonic bonding system 3600.

Figure 45:
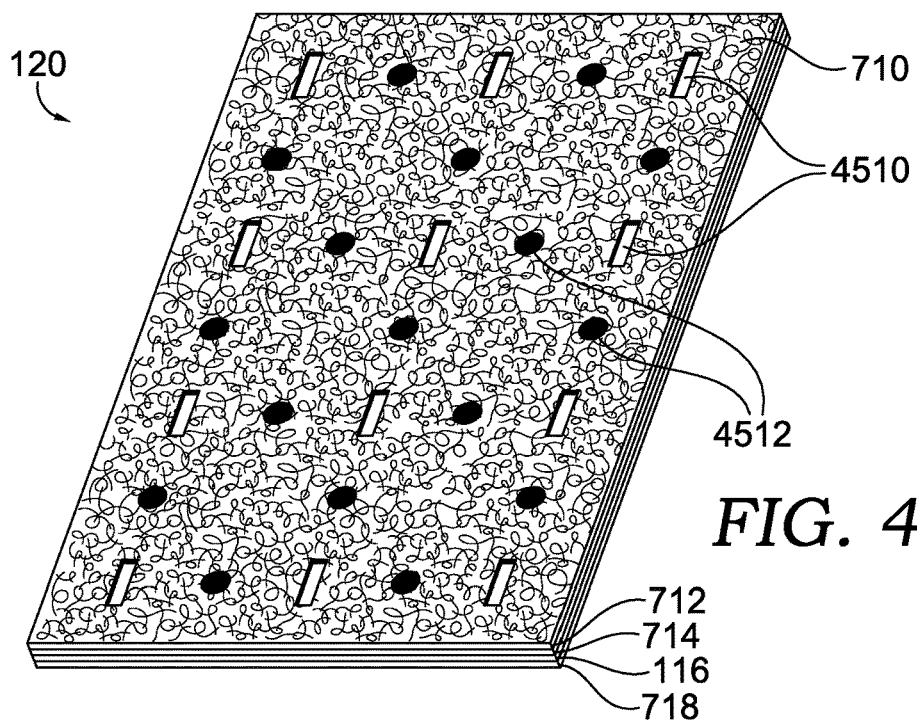
FIG. 45 illustrates a first face of an example composite nonwoven textile having thermal bonding sites and chemical bonding sites in accordance with aspects herein.

FIG. 45 depicts an illustrative schematic of the first face 710 of the composite nonwoven textile 120. A plurality of thermal bonding sites 4510 are present on the first face 710 at first locations, and a plurality of chemical bonding sites 4512 are present on the first face 710 at second locations. In example aspects, the second locations are different from the first locations. In further example aspects, the first locations do not overlap with the second locations as shown in FIG. 45. The thermal bonding sites 4510 may have features similar to the thermal bonding sites 3618, and the chemical bonding sites 4512 may have features similar to the chemical bonding sites 3110. The pattern depicted for the thermal bonding sites 4510 and the chemical bonding sites 4512 is illustrative, and it is contemplated herein that the thermal bonding sites 4510 and the chemical bonding sites 4512 may have different patterns.

Figure 46:
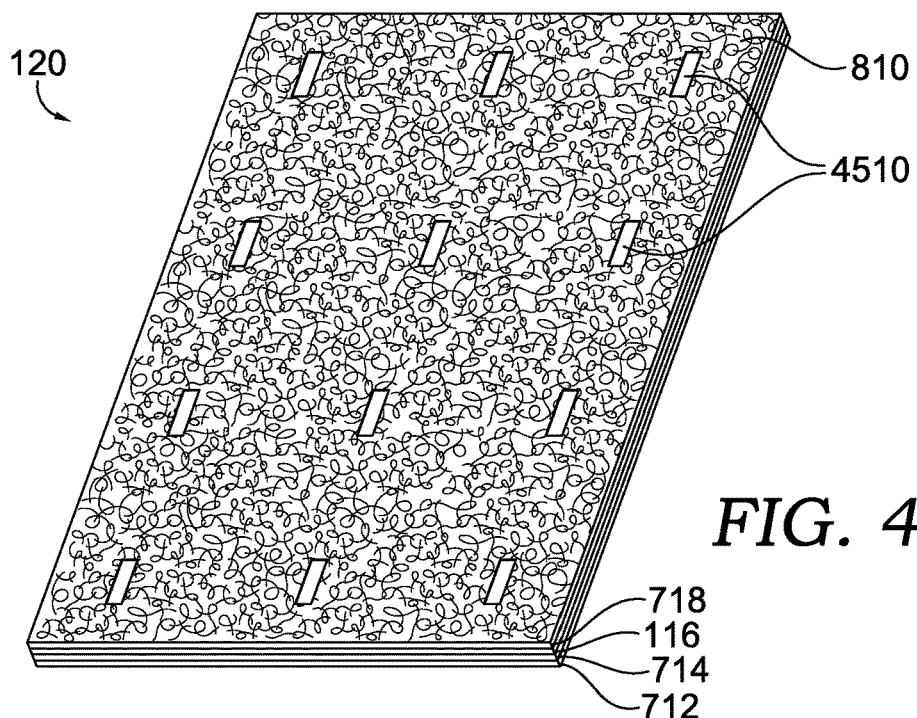
FIG. 46 illustrates an opposite second face of the composite nonwoven textile of FIG. 45 depicting the thermal bonding sites in accordance with aspects herein.
Figure 47:
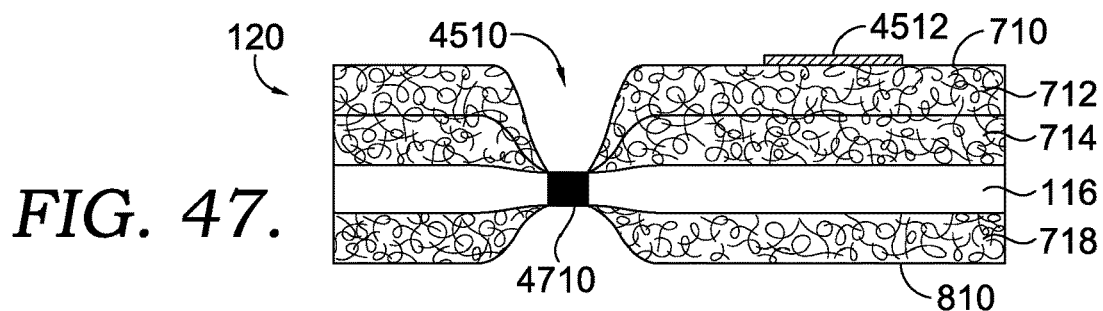
FIG. 47 illustrates a cross-section of the composite nonwoven textile of FIG. 45 in accordance with aspects herein.

FIG. 46 depicts an illustrative schematic of the second face 810 of the composite nonwoven textile 120 of FIG. 45. The second face 810 includes the thermal bonding sites 4510. In example aspects, the second face 810 may not include any chemical bonding sites such as the chemical bonding sites 4512. FIG. 47 depicts an example cross-section taken through a thermal bonding site 4510 and a chemical bonding site 4512. As shown, the thermal bonding site 4510 includes a thermal bond structure 4710 positioned between the first face 710 and the second face 810. The chemical bonding site 4512 is shown as being present on the first face 710 and is absent from the second face 810. As mentioned, use of both the thermal bonding sites 4510 and the chemical bonding sites 4512 increases resistance to pilling of at least the first face 710. Aspects herein further contemplate forming thermal bonding sites by positioning the second face 810 against the impression roller 3610 of the ultrasonic bonding system 3600, forming chemical bonding sites on the second face 810 of the composite nonwoven textile 120, and combinations thereof. This may be useful when increased pilling resistance of the second face 810 is desired.

Figure 48:
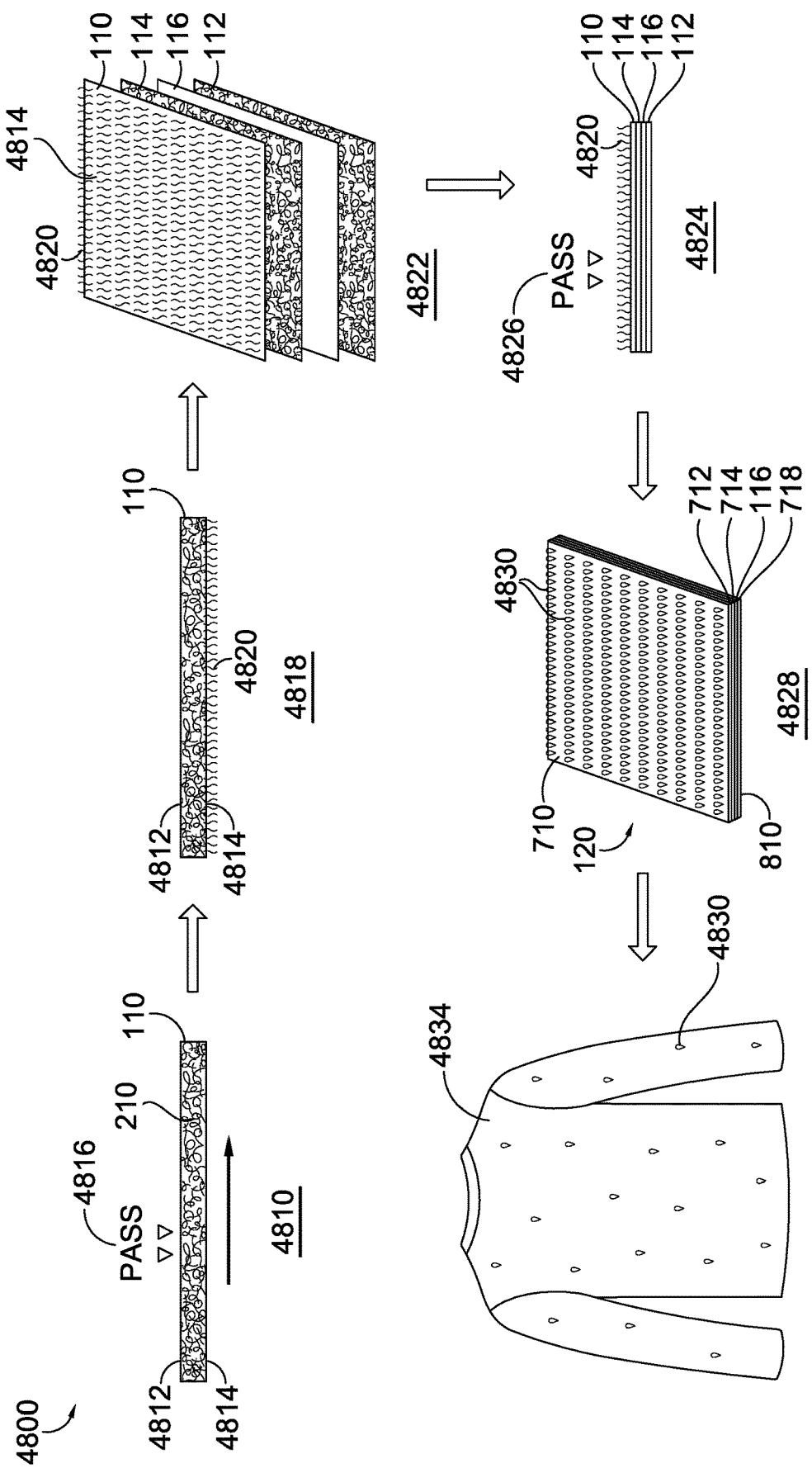
FIG. 48 illustrates a schematic of an example two-step mechanical entanglement process for reducing the formation of pills on a first face of an example composite nonwoven textile in accordance with aspects herein.

FIG. 48 depicts a schematic of an example process 4800 for further reducing pilling on at least the first face 710 of the composite nonwoven textile 120. The process 4800 may be used by itself or it may be combined with one or more of the chemical bonding processes discussed above and the thermal bonding processes discussed above. As stated above, the composite nonwoven textile 120 may include different webs of fibers, such as webs 110, 112, and 114, formed into a cohesive structure, where the different webs may have a different or similar composition of fibers and/or different properties. The term "web of fibers" refers to a layer prior to undergoing a mechanical entanglement process with one or more other webs of fibers. The webs include fibers that have undergone a carding and lapping process that generally aligns the fibers in one or more common directions that extend along an x, y plane and that achieves a desired basis weight. The webs may also undergo a light needling process or mechanical entanglement process that entangles the fibers of the web to a degree such that the web of fibers forms a cohesive structure that can be manipulated (e.g., rolled on to a roller, un-rolled from the roller, stacked, and the like). For instance, the webs 112 and 114 may each have a stitch density of about 50 n/cm². Aspects herein contemplate increasing the stitch density of at least the first web of fibers 110 to increase the resistance to pilling of at least the first face 710 of the composite nonwoven textile 120 as described below.

At a step 4810, the first web of fibers 110 undergoes a first mechanical entanglement pass 4816 that is executed unidirectionally in a direction from a first face 4812 to an opposite second face 4814 of the first web of fibers 110. The stitch density of the first mechanical entanglement pass 4816 may be greater than 50 n/cm², about 75 n/cm², about 100 n/cm², or about 200 n/cm². In one example, the stitch density of the first web of fibers 110 after the first mechanical entanglement pass 4816 may be at least twice as much as the stitch density of the second web of fibers 112, and, when used, the third web of fibers 114. In example aspects, the first web of fibers 110 does not undergo a mechanical entanglement pass that is executed in a direction from the second face 4814 toward the first face 4812.

Step 4818 depicts the first web of fibers 110 after undergoing the first mechanical entanglement pass 4816. Because the first mechanical entanglement pass 4816 occurs unidirectionally in the direction from the first face 4812 toward the second face 4814, the fibers 210 that form the first web of fibers 110 are pushed by the entanglement needles such that the fibers 210, including terminal ends 4820 of the fibers 210, extend outward from the second face 4814 of the first web of fibers 110. Stated differently, the fibers 201 extend in a direction away from the first face 4812 of the first web of fibers 110.

At a step 4822, the first web of fibers 110 is stacked with the second web of fibers 112, the optional third web of fibers 114, and the elastomeric layer 116. In this example, the first web of fibers 110 is stacked such that the second face 4814 faces outward and away from, for example, the elastomeric layer 116 and the third web of fibers 114 (when used). As such, the terminal ends 4820 of the fibers 210 extend in a direction away from the elastomeric layer 116 and the third web of fibers 114 (when used) in the stacked configuration.

At a step 4824, a second mechanical entanglement pass 4826 is executed on the stacked configuration of the first web of fibers 110, the second web of fibers 112, the third web of fibers 114 (when used), and the elastomeric layer 116. The second mechanical entanglement pass 4826 is executed in a direction from the first web of fibers 110 toward the second web of fibers 112, and the second mechanical entanglement pass 4826 is effective to push the terminal ends 4920 of the fibers 210 back into at least the first web of fibers 110 to form, for example, loop structures. The step 4824 may include additional entanglement passes such as those described with respect to FIG. 7 including mechanical entanglement passes that occur in a direction from the second web of fibers 112 toward the first web of fibers 110.

Step 4828 depicts the composite nonwoven textile 120 after undergoing the second mechanical entanglement pass 4826 where the composite nonwoven textile 120 includes the first entangled web of fibers 712, the second entangled web of fibers 718, the third entangled web of fibers 714 (when used), and the elastomeric layer 116. As shown, the second face 4814 of the first web of fibers 110 forms the first face 710 (otherwise known as the first facing surface) of the composite nonwoven textile 120 and includes a plurality of loops 4830 that represent the fibers 210 whose terminal ends 4820 were pushed back into the first web of fibers 110 subsequent to the second mechanical entanglement pass 4826. Because the fiber terminal ends 4820 are not extending outward from the first face 710 and thus are not available to interact with other fiber terminal ends to form pills, the pilling resistance of at least the first face 710 is increased to 2 or more.

Step 4832 depicts the composite nonwoven textile 120 formed into an upper-body garment 4834 where the plurality of loops 4830 extend from an outer-facing surface of the upper-body garment 4834. Aspects herein contemplate that the process 4800 may be configured to produce a zonal distribution of the plurality of loops 4830 where a greater density of loops 4830 are positioned at areas of a garment prone to increased abrasion similar to that described with respect to FIGS. 34-35 and FIGS. 43-44. For instance, the first mechanical entanglement pass 4816 and the second mechanical entanglement pass 4826 may be localized to discrete areas of the first web of fibers 110 and/or the stacked configuration shown at step 4824 to form the loops 4830 at the discrete areas.

Figure 49:
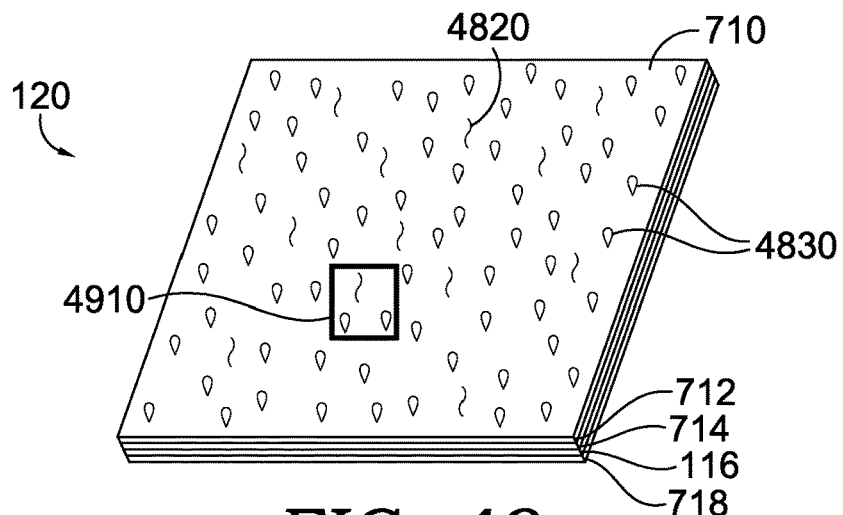
FIG. 49 illustrates the first face of the composite nonwoven textile after the two-step mechanical entanglement process of FIG. 48 in accordance with aspects herein.

FIG. 49 depicts an illustrative schematic of the first face 710 of the composite nonwoven textile 120 after undergoing the process 4800. The first face 710 includes the plurality of loops 4830 that represent the fibers 210 whose terminal ends 4820 were pushed back into the first web of fibers 110 subsequent to the second mechanical entanglement pass

4826. The first face 710 also includes fiber terminal ends such as fiber terminal ends 4820. The fiber terminal ends may include the terminal ends of the fibers 210 forming the first web of fibers 110 and may also include terminal ends of fibers from the other webs (e.g., the web 112 and the web 114) that are pushed through the first face 710 subsequent to the mechanical entanglement process.

Figure 50:
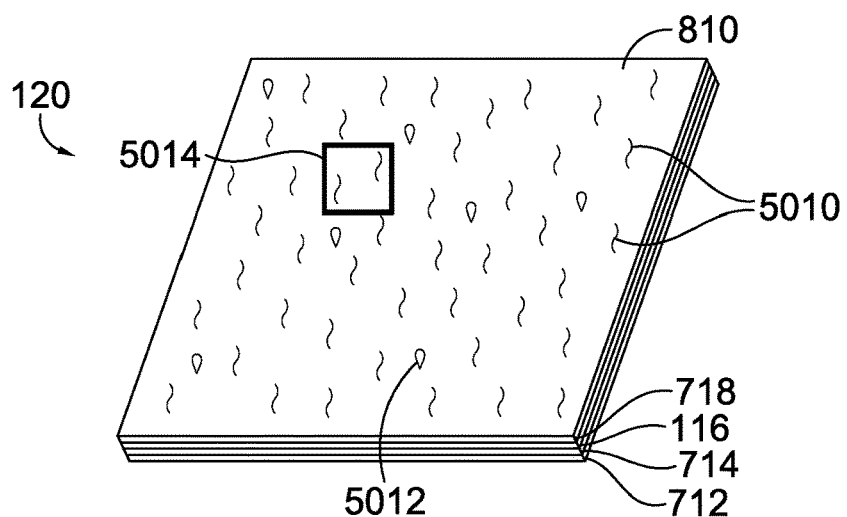
FIG. 50 illustrates an opposite second face of the composite nonwoven textile of FIG. 49 in accordance with aspects herein.

FIG. 50 depicts an illustrative schematic of the second face 810 of the composite nonwoven textile 120 after undergoing the process 4800. The second face 810 includes fiber terminal ends 5010 as well as some loops 5012. The fiber terminal ends 5010 and the loops 5012 may include the fibers 210, the fibers 310 and 312, and the fibers 410 (when used). In example aspects, the first face 710 may include a relatively greater density of loops (e.g., more loops per cm$^2$), such as loops 4830 as indicated by box 4910, and the second face 810 may include a relatively smaller density of loops, such as loops 5012. To describe this differently, the first face 710 may include a relatively smaller density of fiber terminal ends, such as the terminal ends 4820, and the second face 810 may include a relatively greater density of fiber terminal ends, such as terminal ends 5010.

Figure 51:
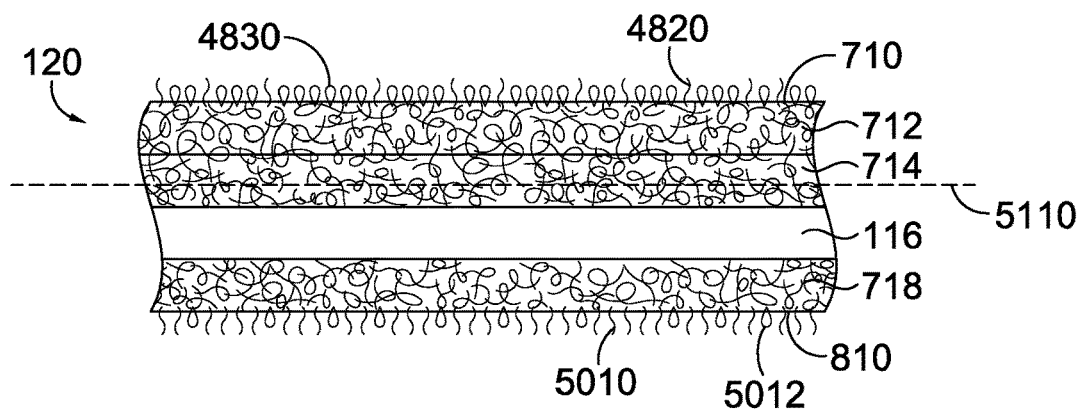
FIG. 51 illustrates a cross-section of the composite nonwoven textile of FIG. 49 in accordance with aspects herein.

FIG. 51 depicts a cross-section of the composite nonwoven textile 120 of FIG. 49. As shown, the loops 4830 and the terminal ends 4820 on the first face 710 extend away from the first face 710 in a direction away from a center plane 5110 of the composite nonwoven textile 120. Similarly, the terminal ends 5010 and the loops 5012 extend away from the second face 810 in a direction away from the center plane 5110 of the composite nonwoven textile 120. The first face 710 includes a relatively greater number of loops, such as loops 4830 compared to the second face 810 causing the first face 710 to have an increased resistance to pilling.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. An asymmetrical-faced composite nonwoven textile having a first face and an opposite second face, the asymmetrical-faced composite nonwoven textile comprising: a first entangled web of fibers having a first number of fibers per cm$^2$ with a first denier and a second number of fibers per cm$^2$ with a second denier, wherein a ratio of the first denier to the second denier is in a range of from about 1.5:1 to about 2:1, the first entangled web of fibers forming, at least in part, the first face; a second entangled web of fibers having a third number of fibers per cm$^2$ with a third denier and a fourth number of fibers per cm$^2$ with a fourth denier, wherein a ratio of the third denier to the fourth denier is in a range of from about 0.3:1 to about 0.7:1, the second entangled web of fibers forming, at least in part, the second face; and an elastomeric layer positioned between the first entangled web of fibers and the second entangled web of fibers, wherein at least some of the fibers of the first entangled web of fibers extend through the elastomeric layer and are entangled with fibers of the second entangled web of fibers.

Clause 2. The asymmetrical-faced composite nonwoven textile according to clause 1, wherein at least some of the fibers of the second entangled web of fibers extend through the elastomeric layer and are entangled with fibers of the first entangled web of fibers.

Clause 3. The asymmetrical-faced composite nonwoven textile according to any of clauses 1 through 2, further comprising a third entangled web of fibers positioned between the first entangled web of fibers and the second entangled web of fibers.

Clause 4. The asymmetrical-faced composite nonwoven textile according to clause 3, wherein the third entangled web of fibers comprises a fifth number of fibers per cm$^2$ with a fifth denier and a sixth number of fibers per cm$^2$ with a sixth denier, wherein a ratio of the fifth denier to the sixth denier is in a range of from about 1.5:1 to about 2:1.

Clause 5. The asymmetrical-faced composite nonwoven textile according to any of clauses 3 through 4, wherein the third entangled web of fibers is positioned between the first entangled web of fibers and the elastomeric layer.

Clause 6. The asymmetrical-faced composite nonwoven textile according to any of clauses 3 through 4, wherein the third entangled web of fibers is positioned between the second entangled web of fibers and the elastomeric layer.

Clause 7. The asymmetrical-faced composite nonwoven textile according to any of clauses 3 through 6, wherein at least some of the fibers of the third entangled web of fibers extend through the elastomeric layer.

Clause 8. The asymmetrical-faced composite nonwoven textile according to any of clauses 3 through 7, wherein at least some of the fibers of the third entangled web of fibers are entangled with fibers of the first entangled web of fibers and with fibers of the second entangled web of fibers.

Clause 9. An asymmetrical-faced composite nonwoven textile having a first face and an opposite second face, the asymmetrical-faced composite nonwoven textile comprising: a first entangled web of fibers having a first number of fibers per cm$^2$ with a denier of from about 1.2 D to about 3.5 D and a second number of fibers per cm$^2$ with a denier of from about 0.6 D to about 1 D, the first number of fibers greater than the second number of fibers, wherein the first entangled web of fibers forms, at least in part, the first face; a second entangled web of fibers having a third number of fibers per cm$^2$ with a denier of from about 0.6 D to about 1 D and a fourth number of fibers per cm$^2$ with a denier of from about 1.2 D to about 3.5 D, the third number of fibers greater than the fourth number of fibers, wherein the second entangled web of fibers forms, at least in part, the second face; and an elastomeric layer positioned between the first entangled web of fibers and the second entangled web of fibers, wherein at least some of the fibers of the first entangled web extend through the elastomeric layer and are entangled with the fibers of the second entangled web of fibers.

Clause 10. The asymmetrical-faced composite nonwoven textile according to clause 9, wherein at least some of the fibers of the second entangled web of fibers extend through the elastomeric layer and are entangled with fibers of the first entangled web of fibers.

Clause 11. The asymmetrical-faced composite nonwoven textile according to any of clauses 9 through 10, further comprising a third entangled web of fibers positioned between the first entangled web of fibers and the second entangled web of fibers.

Clause 12. The asymmetrical-faced composite nonwoven textile according to clause 11, wherein the third entangled web of fibers comprises a fifth number of fibers per cm$^2$ with a denier of from about 1.2 D to about 3.5 D and a sixth number of fibers per cm$^2$ with a denier of from about 0.6 D to about 1 D, the fifth number of fibers greater than the sixth number of fibers.

Clause 13. The asymmetrical-faced composite nonwoven textile according to any of clauses 11 through 12, wherein the third entangled web of fibers is positioned between the first entangled web of fibers and the elastomeric layer.

Clause 14. The asymmetrical-faced composite nonwoven textile according to any of clauses 11 through 12, wherein the third entangled web of fibers is positioned between the second entangled web of fibers and the elastomeric layer.

Clause 15. The asymmetrical-faced composite nonwoven textile according to any of clauses 11 through 14, wherein at least some of the fibers of the third entangled web of fibers extend through the elastomeric layer.

Clause 16. The asymmetrical-faced composite nonwoven textile according to any of clauses 11 through 15, wherein at least some of the fibers of the third entangled web of fibers are entangled with fibers of the first entangled web of fibers and with fibers of the second entangled web of fibers.

Clause 17. A method of manufacturing an asymmetrical-faced composite nonwoven textile comprising: positioning an elastomeric layer between a first web of fibers with a denier from about 1.2 D to about 3.5 D and a second web of fibers with a denier from about 0.6 D to about 1 D; and mechanically entangling a plurality of the fibers of the first web of fibers and a plurality of the fibers of the second web of fibers such that the first web of fibers becomes a first entangled web of fibers and the second web of fibers becomes a second entangled web of fibers, wherein subsequent to the mechanical entanglement step at least some of the fibers of the first entangled web of fibers and at least some of the fibers of the second entangled web of fibers extend through the elastomeric layer, and wherein the first entangled web of fibers forms, at least in part, a first face of the asymmetrical-faced composite nonwoven textile and the second entangled web of fibers forms, at least in part, an opposite second face of the asymmetrical-faced composite nonwoven textile.

Clause 18. The method of manufacturing the asymmetrical-faced composite nonwoven textile according to clause 17, further comprising: prior to mechanically entangling the plurality of the fibers of the first web of fibers and the plurality of the fibers of the second web of fibers, positioning a third web of fibers between the first web of fibers and the second web of fibers; and mechanically entangling a plurality of fibers of the third web of fibers with fibers of the first web of fibers and fibers of the second web of fibers such that the third web of fibers becomes a third entangled web of fibers.

Clause 19. The method of manufacturing the asymmetrical-faced composite nonwoven textile according to clause 18, wherein the third web of fibers comprises fibers with a denier of from about 1.2 D to about 3.5 D.

Clause 20. The method of manufacturing the asymmetrical-faced composite nonwoven textile according to any of clauses 18 through 19, wherein at least some of the fibers of the third entangled web of fibers extend through the elastomeric layer.

Clause 21. A composite nonwoven textile having a first face and an opposite second face, the composite nonwoven textile comprising: a first entangled web of fibers forming, at least in part, the first face; a second entangled web of fibers, wherein at least a portion of the fibers in the second entangled web of fibers include silicone-coated fibers, the second entangled web of fibers forming, at least in part, the second face; and an elastomeric layer positioned between the first entangled web of fibers and the second entangled web of fibers, wherein at least some of the fibers in the first entangled web of fibers extend through the elastomeric layer and are entangled with the fibers of the second entangled web of fibers.

Clause 22. The composite nonwoven textile according to clause 21, wherein at least some of the fibers in the second entangled web of fibers extend through the elastomeric layer and are entangled with fibers of the first entangled web of fibers.

Clause 23. The composite nonwoven textile according to any of clauses 21 through 22, wherein at least a portion of the fibers of the first entangled web of fibers include silicone-coated fibers.

Clause 24. The composite nonwoven textile according to clause 23, wherein a number of silicone-coated fibers per $cm^2$ of the second entangled web of fibers is greater than a number of silicone-coated fibers per $cm^2$ of the first entangled web of fibers.

Clause 25. The composite nonwoven textile according to any of clauses 21 through 24, further comprising a third entangled web of fibers positioned between the first entangled web of fibers and the second entangled web of fibers, wherein at least some of the fibers in the third entangled web of fibers extend through the elastomeric layer and are entangled with fibers of one or more of the first entangled web of fibers and the second entangled web of fibers.

Clause 26. The composite nonwoven textile according to clause 25, wherein at least a portion of the fibers of the third entangled web of fibers include silicone-coated fibers.

Clause 27. The composite nonwoven textile according to clause 26, wherein a number of silicone-coated fibers per $cm^2$ of the third entangled web of fibers is less than a number of silicone-coated fibers per $cm^2$ of the second entangled web of fibers.

Clause 28. A composite nonwoven textile comprising: two or more entangled webs of fibers; and an elastomeric layer, wherein at least some of the fibers of the two or more entangled webs of fibers extend through the elastomeric layer, and wherein from about 10% to about 25% by weight of the composite nonwoven textile comprises silicone-coated fibers.

Clause 29. The composite nonwoven textile according to clause 28, wherein the two or more entangled web of fibers include a first entangled web of fibers that forms, at least in part, a first face of the composite nonwoven textile and a second entangled web of fibers that forms, at least in part, an opposite second face of the composite nonwoven textile.

Clause 30. The composite nonwoven textile according to clause 29, wherein the elastomeric layer is positioned between the first entangled web of fibers and the second entangled web of fibers.

Clause 31. The composite nonwoven textile according to any of clauses 29 through 30, further comprising a third entangled web of fibers positioned between the first entangled web of fibers and the second entangled web of fibers.

Clause 32. The composite nonwoven textile according to clause 31, wherein the third entangled web of fibers is positioned between the first entangled web of fibers and the elastomeric layer.

Clause 33. A method of manufacturing a composite nonwoven textile comprising: positioning an elastomeric layer between a first web of fibers and a second web of fibers, wherein from about 10% to about 95% by weight of the second web of fibers comprise silicone-coated fibers; and mechanically entangling at least some of the fibers of the first web of fibers and at least some of the fibers of the second web of fibers such that the first web of fibers becomes a first entangled web and the second web of fibers becomes a second entangled web, wherein subsequent to the mechanical entanglement step at least some of the fibers of the first entangled web of fibers extend through the elastomeric layer, and wherein the first entangled web forms, at least in part, a first face of the composite nonwoven textile and the second entangled web forms, at least in part, an opposite second face of the composite nonwoven textile.

Clause 34. The method of manufacturing the composite nonwoven textile according to clause 33, wherein the first web of fibers does not include silicone-coated fibers.

Clause 35. The method of manufacturing the composite nonwoven textile according to any of clauses 33 through 34, wherein the silicone-coated fibers comprise polyethylene terephthalate (PET) silicone-coated fibers.

Clause 36. The method of manufacturing the composite nonwoven textile according to any of clauses 33 through 35, further comprising: prior to mechanically entangling the at least some of the fibers of the first web of fibers and the at least some of the fibers of the second web of fibers, positioning a third web of fibers between the first web of fibers and the second web of fibers; and mechanically entangling at least some of the fibers of the third web of fibers with fibers of the first web of fibers and with fibers of the second web of fibers such that the third web of fibers becomes a third entangled web of fibers.

Clause 37. The method of manufacturing the composite nonwoven textile according to clause 36, wherein the third web of fibers is positioned between the second web of fibers and the elastomeric layer.

Clause 38. The method of manufacturing the composite nonwoven textile according to any of clauses 36 through 37, wherein the third web of fibers does not include silicone-coated fibers.

Clause 39. The method of manufacturing the composite nonwoven textile according to any of clauses 36 through 38, wherein the third web of fibers comprise polyethylene-terephthalate (PET) fibers.

Clause 40. The method of manufacturing the composite nonwoven textile according to any of clauses 33 through 39, wherein the first web of fibers comprise polyethylene-terephthalate (PET) fibers.

Clause 41. An asymmetrical-faced composite nonwoven textile having a first face and an opposite second face, the asymmetrical-faced composite nonwoven textile comprising: a first entangled web of fibers forming, at least in part, the first face; a second entangled web of fibers forming, at least in part, the second face; and an elastomeric layer positioned between the first entangled web of fibers and the second entangled web of fibers, wherein at least some of the fibers of the first entangled web of fibers extend through the elastomeric layer and are entangled with the fibers of the second entangled web of fibers, and wherein the second face includes a plurality of loops formed from one or more of the fibers of the first entangled web of fibers and the fibers of the second entangled web of fibers, and wherein an apex of each loop of the plurality of loops extends a predetermined distance away from the second face.

Clause 42. The asymmetrical-faced composite nonwoven textile according to clause 41, wherein the plurality of loops extend in a direction away from the first face.

Clause 43. The asymmetrical-faced composite nonwoven textile according to any of clauses 41 through 42, wherein the predetermined distance is from about 1.5 mm to about 8.1 mm.

Clause 44. The asymmetrical-faced composite nonwoven textile according to any of clauses 41 through 43, wherein the predetermined distance is from about 4 mm to about 6 mm.

Clause 45. The asymmetrical-faced composite nonwoven textile according to any of clauses 41 through 44, wherein at least some of the fibers of the second entangled web of fibers extend through the elastomeric layer and are entangled with fibers of the first entangled web of fibers.

Clause 46. The asymmetrical-faced composite nonwoven textile according to any of clauses 41 through 45, wherein a denier of the fibers that form the plurality of loops is from about 0.6 D to about 3.5 D.

Clause 47. The asymmetrical-faced composite nonwoven textile according to any of clauses 41 through 46, wherein the elastomeric layer has a basis weight of from about 20 grams per square meter (gsm) to about 150 gsm.

Clause 48. The asymmetrical-faced composite nonwoven textile according to any of clauses 41 through 47, wherein the elastomeric layer comprises one of a thermoplastic polyurethane meltblown layer or a thermoplastic polyether ester elastomer spunbond layer.

Clause 49. An asymmetrical-faced composite nonwoven textile having a first face and an opposite second face, the asymmetrical-faced composite nonwoven textile comprising: a first entangled web of fibers forming, at least in part, the first face; a second entangled web of fibers forming, at least in part, the second face; and an elastomeric layer positioned between the first entangled web of fibers and the second entangled web of fibers, wherein at least some of the fibers of the first entangled web of fibers extend through the elastomeric layer and are entangled with the fibers of the second entangled web of fibers, and wherein at least a portion of the fibers of the second entangled web of fibers have a longitudinal length extending from the elastomeric layer to a distal end of the respective fibers, wherein the distal end of the respective fibers extends in a direction away from the second face.

Clause 50. The asymmetrical-faced composite nonwoven textile according to clause 49, wherein the distal end of the respective fibers comprises one of a terminal end or an apex of a loop.

Clause 51. The asymmetrical-faced composite nonwoven textile according to any of clauses 49 through 50, wherein the distal end of the respective fibers extend from about 1.5 mm to about 8.1 mm away from the second face.

Clause 52. The asymmetrical-faced composite nonwoven textile according to any of clauses 49 through 51, wherein the at least a portion of the fibers of the second entangled web of fibers that extend from the elastomeric layer to the distal end of the respective fibers have a denier from about 0.6 D to about 3.5 D.

Clause 53. The asymmetrical-faced composite nonwoven textile according to any of clauses 49 through 52, wherein the elastomeric layer has a basis weight of from about 20 grams per square meter (gsm) to about 150 gsm.

Clause 54. The asymmetrical-faced composite nonwoven textile according to any of clauses 49 through 53, wherein the elastomeric layer comprises one of a thermoplastic polyurethane meltblown layer or a thermoplastic polyether ester elastomer spunbond layer.

Clause 55. A method of manufacturing an asymmetrical-faced composite nonwoven textile comprising: positioning an elastomeric layer between a first web of fibers and a second web of fibers; mechanically entangling at least some of the fibers of the first web of fibers and at least some of the fibers of the second web of fibers such that the first web of fibers becomes a first entangled web and the second web of fibers becomes a second entangled web, wherein at least some of the fibers of the first web of fibers extend through the elastomeric layer; and orienting at least a portion of fibers of the second entangled web to have a longitudinal length extending from the elastomeric layer to a distal end of the respective fibers, wherein the distal end of the respective fibers extends in a direction away from a face of the second entangled web.

Clause 56. The method of manufacturing the asymmetrical-faced composite nonwoven textile according to clause 55, wherein the distal end of the respective fibers comprises one of a terminal end or an apex of a loop.

Clause 57. The method of manufacturing the asymmetrical-faced composite nonwoven textile according to any of clauses 55 through 56, wherein the distal end of the respective fibers extends from about 1.5 mm to about 8.1 mm away from the face of the second entangled web.

Clause 58. The method of manufacturing the asymmetrical-faced composite nonwoven textile according to any of clauses 55 through 57, wherein the at least a portion of the fibers of the second entangled web of fibers that extend from the elastomeric layer to the distal end of the respective fibers have a denier from about 0.6 D to about 3.5 D.

Clause 59. The method of manufacturing the asymmetrical-faced composite nonwoven textile according to any of clauses 55 through 58, wherein the elastomeric layer has a basis weight of from about 20 grams per square meter (gsm) to about 150 gsm.

Clause 60. The method of manufacturing the asymmetrical-faced composite nonwoven textile according to any of clauses 55 through 59, wherein the elastomeric layer comprises one of a thermoplastic polyurethane meltblown layer or a thermoplastic polyether ester elastomer spunbond layer.

Clause 61. A composite nonwoven textile comprising: at least one web of fibers and an elastomeric layer, the composite nonwoven textile having: a basis weight from about 40 grams per square meter (gsm) to about 250 gsm; a thermal resistance from about 55 RCT to about 90 RCT; a growth in a machine direction of less than or equal to about 10% of a resting length; a growth in a cross-machine direction of less than or equal to about 10% of a resting width; and a recovery in both the machine direction and the cross-machine direction of within about 10% of the resting length and the resting width.

Clause 62. The composite nonwoven textile according to clause 61, wherein the basis weight is from about 150 gsm to about 190 gsm.

Clause 63. The composite nonwoven textile according to any of clauses 61 through 62, wherein the at least one web of fibers includes at least a first entangled web of fibers, a second entangled web of fibers, wherein the elastomeric layer is positioned between the first entangled web of fibers and the second entangled web of fibers.

Clause 64. The composite nonwoven textile according to clause 63, wherein the at least one web of fibers further includes a third entangled web of fibers positioned between the second entangled web of fibers and the elastomeric layer.

Clause 65. The composite nonwoven textile according to any of clauses 63 through 64, wherein the first entangled web of fibers forms, at least in part, a first face of the composite nonwoven textile, and wherein the second entangled web of fibers forms, at least in part, an opposite second face of the composite nonwoven textile.

Clause 66. The composite nonwoven textile according to any of clauses 63 through 65, wherein at least some of the fibers of the first entangled web of fibers and at least some of the fibers of the second entangled web of fibers extend through the elastomeric layer.

Clause 67. The composite nonwoven textile according to any of clauses 61 through 66, further having a thickness from about 1.5 mm to about 3 mm.

Clause 68. The composite nonwoven textile according to any of clauses 61 through 67, further having a stiffness from about 0.1 Kgf to about 0.4 Kgf.

Clause 69. A composite nonwoven textile comprising: at least one web of fibers and an elastomeric layer, the composite nonwoven textile having: a thickness from about 1.5 mm to about 3 mm; a thermal resistance from about 55 RCT to about 90 RCT; a growth in a machine direction of less than or equal to about 10% of a resting length; a growth in a cross-machine direction of less than or equal to about 10% of a resting width; and a recovery in both the machine direction and the cross-machine direction of within about 10% of the resting length and the resting width.

Clause 70. The composite nonwoven textile according to clause 69, further having a basis weight between from about 40 grams per square meter (gsm) to about 250 gsm.

Clause 71. The composite nonwoven textile according to any of clauses 69 through 70, wherein the basis weight is from about 150 gsm to about 190 gsm.

Clause 72. The composite nonwoven textile according to any of clauses 69 through 71, further having a stiffness of from about 0.1 Kgf to about 0.4 Kgf.

Clause 73. The composite nonwoven textile according to any of clauses 69 through 72, wherein the at least one web of fibers includes at least a first entangled web of fibers, a second entangled web of fibers, and wherein the elastomeric layer is positioned between the first entangled web of fibers and the second entangled web of fibers.

Clause 74. The composite nonwoven textile according to clause 73, wherein the at least one web of fibers further includes a third entangled web of fibers positioned between the second entangled web of fibers and the elastomeric layer.

Clause 75. A method of manufacturing a composite nonwoven textile comprising: positioning an elastomeric layer between at least a first web of fibers and a second web of fibers; selecting entanglement parameters to produce a composite nonwoven textile having a basis weight between from about 40 grams per square meter (gsm) to about 250 gsm, and a thermal resistance from about 55 RCT to about 90 RCT; and mechanically entangling the fibers of the first web of fibers and the fibers of the second web of fibers based on the selected entanglement parameters.

Clause 76. The method of manufacturing the composite nonwoven textile according to clause 75 further comprising: positioning a third web of fibers between the at least the first web of fibers and the second web of fibers prior to the mechanical entanglement step; and mechanically entangling fibers from the third web of fibers with fibers from the first web of fibers and with fibers from the second web of fibers based on the selected entanglement parameters.

Clause 77. The method of manufacturing the composite nonwoven textile according to clause 76, wherein a basis weight of each of the elastomeric layer, the first web of fibers, the second web of fibers, and the third web of fibers is from about 20 grams per square meter (gsm) to about 150 gsm.

Clause 78. The method of manufacturing the composite nonwoven textile according to any of clauses 75 through 77, wherein the entanglement parameters are further selected to achieve a stiffness of from about 0.1 Kgf to about 0.4 Kgf.

Clause 79. The method of manufacturing the composite nonwoven textile according to any of clauses 75 through 78, wherein the entanglement parameters are further selected to achieve a thickness of from about 1.5 mm to about 3 mm.

Clause 80. The method of manufacturing the composite nonwoven textile according to any of clauses 75 through 79, wherein at least some of the fibers in the first web of fibers and at least some of the fibers in the second web of fibers extend through the elastomeric layer subsequent to the mechanical entanglement step.

Clause 81. An asymmetrical-faced composite nonwoven textile comprising: a first face formed, at least in part, from a first entangled web of fibers, the first face having a first color property and a second color property different from the first color property; an opposite second face formed, at least in part, from a second entangled web of fibers, the second face having the first color property and the second color property, wherein a greater number of fibers per unit area having the second color property are present on one of the first face or the second face compared to the opposite face; and an elastomeric layer positioned between the first entangled web of fibers and the second entangled web fibers, wherein at least some of the fibers of the first entangled web of fibers extend through the elastomeric layer and are entangled with the fibers of the second entangled web of fibers, and wherein at least some of the fibers of the second entangled web of fibers extend through the elastomeric layer and are entangled with the fibers of the first entangled web of fibers.

Clause 82. The asymmetrical-faced composite nonwoven textile according to clause 81, further comprising a third entangled web of fibers positioned between the first entangled web of fibers and the second entangled web of fibers.

Clause 83. The asymmetrical-faced composite nonwoven textile according to clause 82, wherein the third entangled web of fibers is positioned between the second entangled web of fibers and the elastomeric layer.

Clause 84. The asymmetrical-faced composite nonwoven textile according to any of clauses 82 through 83, wherein at least some of the fibers of the third entangled web of fibers extend through the elastomeric layer and are entangled with the fibers of the second entangled web of fibers.

Clause 85. The asymmetrical-faced composite nonwoven textile according to any of clauses 82 through 84, wherein at least some of the fibers of the third entangled web of fibers are entangled with the fibers of the first entangled web of fibers.

Clause 86. The asymmetrical-faced composite nonwoven textile according to any of clauses 81 through 85, wherein the elastomeric layer has the first color property.

Clause 87. An asymmetrical-faced composite nonwoven textile comprising: a first face formed, at least in part, from a first entangled web of fibers, the first face having a first color property and a second color property different from the first color property; an opposite second face formed, at least in part, from a second entangled web of fibers, the second face having the first color property and the second color property, wherein a greater number of fibers per unit area having the second color property are present on one of the first face or the second face compared to the opposite face; a third entangled web of fibers positioned between the first entangled web of fibers and the second entangled web of fibers; and an elastomeric layer positioned between the first entangled web of fibers and the second entangled web of fibers, wherein at least some of the fibers of the first entangled web of fibers, at least some of the fibers of the second entangled web of fibers, and at least some of the fibers of the third entangled web of fibers extend through the elastomeric layer and are entangled with the fibers of the respective other entangled webs.

Clause 88. The asymmetrical-faced composite nonwoven textile according to clause 87, wherein the third entangled web of fibers is positioned between the second entangled web of fibers and the elastomeric layer.

Clause 89. A method of manufacturing a composite nonwoven textile comprising: positioning a third web of fibers having a second color property between a first web of fibers having a first color property and a second web of fibers having the first color property; positioning an elastomeric layer having one of the first color property or the second color property between the first web of fibers and the second web of fibers; and mechanically entangling a first number of the fibers of the third web of fibers with at least some of the fibers of the first web of fibers and a second number of the fibers of the third web of fibers with at least some of the fibers of the second web of fibers.

Clause 90. The method of manufacturing the asymmetrical-faced composite nonwoven textile according to clause 89, wherein the third web of fibers is positioned between the second web of fibers and the elastomeric layer.

Clause 91. The method of manufacturing the asymmetrical-faced composite nonwoven textile according to any of clauses 89 through 91, wherein the fibers of the third web of fibers have a denier of from about 1.2 D to about 3.5 D.

Clause 92. The method of manufacturing the asymmetrical-faced composite nonwoven textile according to any of clauses 89 through 91, wherein the fibers of the first web of fibers have a denier of from about 1.2 D to about 3.5 D.

Clause 93. The method of manufacturing the asymmetrical-faced composite nonwoven textile according to any of clauses 89 through 93, wherein the fibers of the second web of fibers have a denier of from about 0.6 D to about 1 D.

Clause 94. The method of manufacturing the asymmetrical-faced composite nonwoven textile according to any of clauses 89 through 93, wherein the fibers of each of the first web of fibers, the second web of fibers, and the third web of fibers are dope dyed such that the fibers of the first web of fibers have the first color property, the fibers of the second web of fibers have the first color property, and the fibers of the third web of fibers have the second color property.

Clause 95. The method of manufacturing the asymmetrical-faced composite nonwoven textile according to any of clauses 89 through 94, wherein the fibers of each of the first web of fibers, the second web of fibers, and the third web of fibers are polyethylene terephthalate (PET) fibers.

Clause 96. The method of manufacturing the asymmetrical-faced composite nonwoven textile according to any of clauses 89 through 95, wherein the asymmetrical-faced composite nonwoven textile is not piece dyed.

Clause 97. The method of manufacturing the asymmetrical-faced composite nonwoven textile according to any of clauses 89 through 96, wherein the mechanical entanglement comprises needlepunching.

Clause 98. The method of manufacturing the asymmetrical-faced composite nonwoven textile according to clause 89, wherein the first entangled web of fibers forms, at least in part, a first face of the asymmetrical-faced composite nonwoven textile, and wherein the second entangled web of fibers forms, at least in part, a second face of the asymmetrical-faced composite nonwoven textile.

Clause 99. The method of manufacturing the asymmetrical-faced composite nonwoven textile according to clause 98, wherein subsequent to the mechanical entanglement step, the first face has the first color property and the second color property, and the second face has the first color property and the second color property, wherein a greater number of fibers per unit area having the second color property are present on one of the first face or the second face compared to the opposite face.

Clause 100. An asymmetrical-faced composite nonwoven textile having a first face and an opposite second face, the first face having a greater stitch density than the second face, the asymmetrical-faced composite nonwoven textile comprising: at a first point in time: the first face having a first number of pills per $cm^2$; the second face having a second number of pills per $cm^2$; at a second point in time later than the first point in time: the first face having a third number of pills per $cm^2$, the third number of pills per $cm^2$ greater than the first number of pills per $cm^2$; and the second face having a fourth number of pills per $cm^2$, the fourth number of pills per $cm^2$ greater than the second number of pills per $cm^2$, the fourth number of pills per $cm^2$ greater than the third number of pills per $cm^2$.

Clause 101. The asymmetrical-faced composite nonwoven textile according to clause 100, wherein the first face is formed, at least in part, from a first entangled web of fibers.

Clause 102. The asymmetrical-faced composite nonwoven textile according to any of clauses 100 through 101, wherein the second face is formed, at least in part, from a second entangled web of fibers.

Clause 103. The asymmetrical-faced composite nonwoven textile according to clause 102, wherein the asymmetrical-faced composite nonwoven textile includes an elastomeric layer positioned between the first entangled web of fibers and the second entangled web of fibers.

Clause 104. The asymmetrical-faced composite nonwoven textile according to any of clauses 100 through 103, wherein the second face includes silicone-coated fibers.

Clause 105. An apparel item comprising: a composite nonwoven textile that forms at least a portion of the apparel item, the composite nonwoven textile having an outer-facing surface and an inner-facing surface, the outer-facing surface having a greater stitch density than the inner-facing surface, wherein: at a first point in time: the outer-facing surface has a first number of pills per $cm^2$; the inner-facing surface has a second number of pills per $cm^2$; at a second point in time later than the first point in time: the outer-facing surface has a third number of pills per $cm^2$, the third number of pills per $cm^2$ greater than the first number of pills per $cm^2$; and the inner-facing surface has a fourth number of pills per $cm^2$, the fourth number of pills per $cm^2$ greater than the second number of pills per $cm^2$, the fourth number of pills per $cm^2$ greater than the third number of pills per $cm^2$.

Clause 106. The apparel item according to clause 105, wherein the outer-facing surface of the composite nonwoven textile is formed, at least in part, from a first entangled web of fibers.

Clause 107. The apparel item according to clause 106, wherein the first entangled web of fibers has a first stitch density.

Clause 108. The apparel item according to any of clauses 105 through 107, wherein the outer-facing surface of the composite nonwoven textile is an outermost-facing surface of the apparel item.

Clause 109. The apparel item according to any of clauses 105 through 108, wherein the inner-facing surface of the composite nonwoven textile is formed, at least in part, from a second entangled web of fibers.

Clause 110. The apparel item according to clause 107, wherein the second entangled web of fibers has a second stitch density less than the first stitch density.

Clause 111. The apparel item according to any of clauses 105 through 110, wherein the inner-facing surface of the composite nonwoven textile is an innermost-facing surface of the apparel item.

Clause 112. The apparel item according to any of clauses 106 through 111, wherein the composite nonwoven textile includes an elastomeric layer positioned between the first entangled web of fibers and the second entangled web of fibers.

Clause 113. The apparel item according to any of clauses 105 through 112, wherein the inner-facing surface of the composite nonwoven textile includes silicone-coated fibers.

Clause 114. An asymmetrical-faced composite nonwoven textile having a first face and an opposite second face, the asymmetrical-faced composite nonwoven textile comprising: a first entangled web of fibers forming, at least in part, the first face of the asymmetrical-faced composite nonwoven textile, the first entangled web of fibers having a first stitch density; and a second entangled web of fibers forming, at least in part, the second face of the asymmetrical-faced composite nonwoven textile; the second entangled web of fibers having a second stitch density less than the first stitch density, wherein the second entangled web of fibers include silicone-coated fibers.

Clause 115. The asymmetrical-faced composite nonwoven textile according to clause 114, further comprising an elastomeric layer positioned between the first entangled web of fibers and the second entangled web of fibers.

Clause 116. The asymmetrical-faced composite nonwoven textile according to clause 115, wherein at least some of the fibers of the first entangled web of fibers extend through the elastomeric layer and are entangled with fibers of the second entangled web of fibers.

Clause 117. The asymmetrical-faced composite nonwoven textile according to any of clauses 115 through 117, wherein at least some of the fibers of the second entangled fibers extend through the elastomeric layer and are entangled with fibers of the first entangled web of fibers.

Clause 118. The asymmetrical-faced composite nonwoven textile according to any of clauses 114 through 117, wherein: at a first point in time: the first face has a first number of pills per $cm^2$; the second face has a second number of pills per $cm^2$; at a second point in time later than the first point in time: the first face has a third number of pills per $cm^2$, the third number of pills per $cm^2$ greater than the first number of pills per $cm^2$; and the second face has a fourth number of pills per $cm^2$, the fourth number of pills per $cm^2$ greater than the second number of pills per $cm^2$, the fourth number of pills per $cm^2$ greater than the third number of pills per $cm^2$.

Clause 119. An asymmetrical-faced composite nonwoven article of apparel having an outer-facing surface and an opposite inner-facing surface, the asymmetrical-faced composite nonwoven article of apparel comprising: a first entangled web of fibers having a first average denier per $cm^2$, the first entangled web of fibers forming, at least in part, the outer-facing surface; a second entangled web of fibers having a second average denier per $cm^2$ that is less than the first average denier per $cm^2$, the second entangled web of fibers forming, at least in part, the inner-facing surface; and an elastomeric layer positioned between the first entangled web of fibers and the second entangled web of fibers, wherein at least some of the fibers of the first entangled web of fibers extend through the elastomeric layer and are entangled with at least some of the fibers of the second entangled web of fibers.

Clause 120. The asymmetrical-faced composite nonwoven article of apparel according to clause 119, wherein the first average denier per cm$^2$ is from about 1.1 D to about 1.4 D.

Clause 121. The asymmetrical-faced composite nonwoven article of apparel according to any of clauses 119 through 120, wherein the second average denier per cm$^2$ is from about 0.9 D to about 1 D.

Clause 122. The asymmetrical-faced composite nonwoven article of apparel according to any of clauses 119 through 121, wherein the first entangled web of fibers has a first number of fibers per cm$^2$ with a first denier and a second number of fibers per cm$^2$ with a second denier, wherein a ratio of the first denier to the second denier is from about 1.5:1 to about 2:1.

Clause 123. The asymmetrical-faced composite nonwoven article of apparel according to clause 122, wherein the first number of fibers per cm$^2$ is greater than the second number of fibers per cm$^2$.

Clause 124. The asymmetrical-faced composite nonwoven article of apparel according to any of clauses 122 through 123, wherein the first number of fibers per cm$^2$ have a denier from about 1.2 D to about 3.5 D, and wherein the second number of fibers per cm$^2$ have a denier from about 0.6 D to about 1 D.

Clause 125. The asymmetrical-faced composite nonwoven article of apparel according to any of clauses 122 through 124, wherein the second entangled web of fibers has a third number of fibers per cm$^2$ with a third denier and a fourth number of fibers per cm$^2$ with a fourth denier, wherein a ratio of the third denier to the fourth denier is in a range of from about 0.3:1 to about 0.7:1.

Clause 126. The asymmetrical-faced composite nonwoven article of apparel according to clause 125, wherein the third number of fibers per cm$^2$ is greater than the fourth number of fibers per cm$^2$.

Clause 127. The asymmetrical-faced composite nonwoven article of apparel according to any of clauses 125 through 126, wherein the third number of fibers per cm$^2$ have a denier from about 0.6 D to about 1 D, and wherein the fourth number of fibers per cm$^2$ have a denier from about 1.2 D to about 3.5 D.

Clause 128. An asymmetrical-faced composite nonwoven article of apparel having an outer-facing surface and an opposite inner-facing surface, the asymmetrical-faced composite nonwoven article of apparel comprising: a first entangled web of fibers having a first average denier per cm$^2$, the first entangled web of fibers forming, at least in part, the outer-facing surface; a second entangled web of fibers having a second average denier per cm$^2$ that is less than the first average denier, the second entangled web of fibers forming, at least in part, the inner-facing surface; a third entangled web of fibers positioned between the first entangled web of fibers and the second entangled web of fibers; and an elastomeric layer positioned between the first entangled web of fibers and the second entangled web of fibers, wherein at least some of the fibers of the first entangled web of fibers extend through the elastomeric layer and are entangled with at least some of the fibers of the second entangled web of fibers.

Clause 129. The asymmetrical-faced composite nonwoven article of apparel according to clause 128, wherein the first average denier per cm$^2$ is from about 1.1 D to about 1.4 D.

Clause 130. The asymmetrical-faced composite nonwoven article of apparel according to any of clauses 128 through 129, wherein the second average denier per cm$^2$ is from about 0.9 D to about 1 D.

Clause 131. The asymmetrical-faced composite nonwoven article of apparel according to any of clauses 128 through 130, wherein the third entangled web of fibers has a third average denier per cm$^2$ that is greater than the second average denier per cm$^2$.

Clause 132. The asymmetrical-faced composite nonwoven article of apparel according to any of clauses 128 through 131, wherein the third entangled web of fibers is positioned between the second entangled web of fibers and the elastomeric layer.

Clause 133. A method of manufacturing an article of apparel comprising: forming the article of apparel from an asymmetrical-faced composite nonwoven textile, the asymmetrical-faced composite nonwoven textile comprising a first entangled web of fibers that forms, at least in part, a first face, a second entangled web of fibers that forms, at least in part, an opposite second face, and an elastomeric layer positioned between the first face and the second face, wherein: the fibers that form the first entangled web of fibers have a first set of properties, the fibers that form the second entangled web of fibers have a second set of properties different from the first set of properties, the first face of the asymmetrical-faced composite nonwoven textile forms an outer-facing surface of the article of apparel, and the second face of the asymmetrical-faced composite nonwoven textile forms an inner-facing surface of the article of apparel.

Clause 134. The method of manufacturing the article of apparel according to clause 133, wherein the first set of properties and the second set of properties includes one or more of fiber denier, color, and coating.

Clause 135. The method of manufacturing the article of apparel according to clause 134, wherein the coating comprises a silicone coating.

Clause 136. The method of manufacturing the article of apparel according to any of clauses 133 through 135, wherein at least some of the fibers from the first entangled web of fibers extend through the elastomeric layer.

Clause 137. The method of manufacturing the article of apparel according to any of clauses 133 through 136, wherein at least some of the fibers from the second entangled web of fibers extend through the elastomeric layer.

Clause 138. The method of manufacturing the article of apparel according to any of clauses 133 through 137, wherein the asymmetrical-faced composite nonwoven textile comprises a third entangled web of fibers positioned between the first entangled web of fibers and the second entangled web of fibers.

Clause 139. The method of manufacturing the article of apparel according to clause 138, wherein the fibers that form the third entangled web of fibers have a third set of properties different from the first set of properties and the second set of properties.

Clause 140. A composite nonwoven textile having a first face and an opposite second face, the composite nonwoven textile comprising: a first entangled web of fibers that forms, at least in part, the first face, the first face comprising a plurality of discrete chemical bonding sites; a second entangled web of fibers that forms, at least in part, the second face; and an elastomeric layer positioned between the first entangled web of fibers and the second entangled web of fibers, wherein at least some of the fibers of the first entangled web of fibers extend through the elastomeric layer and are entangled with fibers of the second entangled web of fibers.

Clause 141. The composite nonwoven textile according to clause 140, wherein discrete chemical bonding sites are absent from the second face.

Clause 142. The composite nonwoven textile according to any of clauses 140 through 141, wherein the plurality of discrete chemical bonding sites compositionally comprises an oil-based dispersion of a polyurethane binder, a polyurethane binder in a dispersion that contains silica, and combinations thereof.

Clause 143. The composite nonwoven textile according to any of clauses 140 through 142, wherein fibers of at least the first entangled web of fibers are adhered together at the plurality of discrete chemical bonding sites.

Clause 144. The composite nonwoven textile according to any of clauses 140 through 143, wherein the first face includes a first color and the plurality of discrete chemical bonding sites include a second color different from the first color.

Clause 145. The composite nonwoven textile according to any of clauses 140 through 144, wherein a size of each of the plurality of discrete chemical bonding sites ranges from about 0.1 mm to about 1 mm.

Clause 146. The composite nonwoven textile according to any of clauses 140 through 145, wherein a distance between adjacent bonding sites of the plurality of discrete chemical bonding sites ranges from about 0.5 mm to about 6 mm.

Clause 147. The composite nonwoven textile according to any of clauses 140 through 146, wherein at least some of the fibers of the second entangled web of fibers extend through the elastomeric layer and are entangled with fibers of the first entangled web of fibers.

Clause 148. The composite nonwoven textile according to any of clauses 140 through 147, further comprising a third entangled web of fibers positioned between the first entangled web of fibers and the second entangled web of fibers.

Clause 149. The composite nonwoven textile according to clause 148, wherein at least some of the fibers of the third entangled web of fibers are entangled with fibers of the first entangled web of fibers and with fibers of the second entangled web of fibers.

Clause 150. The composite nonwoven textile according to any of clauses 140 through 149, wherein the elastomeric layer comprises one or more of a thermoplastic polyurethane meltblown layer or a thermoplastic polyether ester elastomer spunbond layer.

Clause 151. A nonwoven article of apparel having an outer-facing surface and an opposite inner-facing surface, the nonwoven article of apparel comprising: a first entangled web of fibers forming, at least in part, the outer-facing surface, the outer-facing surface comprising a first plurality of discrete chemical bonding sites positioned at first locations on the nonwoven article of apparel; a second entangled web of fibers that forms, at least in part, the inner-facing surface; and an elastomeric layer positioned between the first entangled web of fibers and the second entangled web of fibers, wherein at least some of the fibers of the first entangled web of fibers extend through the elastomeric layer and are entangled with at least some of the fibers of the second entangled web of fibers.

Clause 152. The nonwoven article of apparel according to clause 151, wherein discrete chemical bonding sites are absent from the inner-facing surface.

Clause 153. The nonwoven article of apparel according to any of clauses 151 through 152, wherein the outer-facing surface further comprises a second plurality of discrete chemical bonding sites positioned at second locations on the nonwoven article of apparel, the second locations different from the first locations.

Clause 154. The nonwoven article of apparel according to clause 153, wherein a density of the first plurality of discrete chemical bonding sites at the first location is different from a density of the second plurality of discrete bonding sites at the second location.

Clause 155. The nonwoven article of apparel according to any of clauses 151 through 154, wherein the first plurality of discrete chemical bonding sites compositionally comprises an oil-based dispersion of a polyurethane binder, a polyurethane binder in a dispersion that contains silica, and combinations thereof.

Clause 156. A method of finishing a composite nonwoven textile comprising a first entangled web of fibers that forms, at least in part, a first face of the composite nonwoven textile, a second entangled web of fibers that forms, at least in part, an opposite second face of the composite nonwoven textile, and an elastomeric layer positioned between the first entangled web of fibers and the second entangled web of fibers, wherein at least some of the fibers from the first entangled web of fibers extend through the elastomeric layer and are entangled with fibers of the second entangled web of fibers, the method comprising: applying a chemical binder in a predetermined pattern to the first face of the composite nonwoven textile to produce a plurality of discrete chemical bonding sites on the first face of the composite nonwoven textile.

Clause 157. The method of finishing the composite nonwoven textile according to clause 156, wherein the chemical binder is applied using a rotogravure process.

Clause 158. The method of finishing the composite nonwoven textile according to any of clauses 156 through 157, wherein the chemical binder is applied using a digital printing process.

Clause 159. The method of finishing the composite nonwoven textile according to any of clauses 156 through 158, wherein the chemical binder is not applied to the second face of the composite nonwoven textile.

Clause 160. The method of finishing the composite nonwoven textile according to any of clauses 156 through 159, wherein the chemical binder compositionally comprises an oil-based dispersion of a polyurethane binder, a polyurethane binder in a dispersion that contains silica, and combinations thereof.

Clause 161. The method of finishing the composite nonwoven textile according to any of clauses 156 through 160, wherein the chemical binder is applied in a thickness ranging from about 0.1 mm to about 0.2 mm.

Clause 162. A composite nonwoven textile having a first face and an opposite second face, the composite nonwoven textile comprising: a first entangled web of fibers that forms, at least in part, the first face; a second entangled web of fibers that forms, at least in part, the second face; an elastomeric layer positioned between the first entangled web of fibers and the second entangled web of fibers, wherein at least some of the fibers of the first entangled web of fibers extend through the elastomeric layer and are entangled with fibers of the second entangled web of fibers; and a plurality of discrete thermal bonding sites, each of the plurality of discrete thermal bonding sites including a thermal bond structure that is located between the first face and the second face, wherein fibers from the first entangled web of fibers extend from each of the thermal bond structures.

Clause 163. The composite nonwoven textile according to clause 162, wherein each of the thermal bond structures is offset relative to the first face in a direction extending toward the second face, and wherein each of the thermal bond structures is offset relative to the second face in a direction extending toward the first face.

Clause 164. The composite nonwoven textile according to clause 163, wherein a first average depth of the offset relative to the first face is different than a second average depth of the offset relative to the second face.

Clause 165. The composite nonwoven textile according to any of clauses 162 through 164 wherein each of the thermal bond structures includes fibers from at least the first entangled web of fibers in a film form.

Clause 166. The composite nonwoven textile according to any of clauses 162 through 165, wherein each of the thermal bond structures includes one or more of fibers from the second entangled web of fibers in a film form and a portion of the elastomeric layer in a film form.

Clause 167. The composite nonwoven textile according to any of clauses 162 through 166, wherein a distance between adjacent discrete thermal bonding sites is less than a length of a fiber in at least the first entangled web of fibers.

Clause 168. The composite nonwoven textile according to any of clauses 162 through 167, further comprising a plurality of discrete chemical bonding sites located on the first face of the composite nonwoven textile.

Clause 169. The composite nonwoven textile according to clause 168, wherein discrete chemical bonding sites are absent from the second face.

Clause 170. The composite nonwoven textile according to any of clauses 168 through 169 wherein fibers from at least the first entangled web of fibers are adhered together at the plurality of discrete chemical bonding sites.

Clause 171. The composite nonwoven textile according to any of clauses 168 through 170, wherein the plurality of discrete chemical bonding sites are positioned at first locations on the first face of the composite nonwoven textile, wherein the plurality of discrete thermal bonding sites are positioned at second locations on the composite nonwoven textile, the first locations different from the second locations.

Clause 172. The composite nonwoven textile according to clause 171, wherein the first locations are separate and distinct from the second locations.

Clause 173. A composite nonwoven textile having a first face and an opposite second face, the composite nonwoven textile comprising: a first entangled web of fibers that forms, at least in part, the first face; a second entangled web of fibers that forms, at least in part, the second face; an elastomeric layer positioned between the first entangled web of fibers and the second entangled web of fibers, wherein at least some of the fibers of the first entangled web of fibers extend through the elastomeric layer and are entangled with fibers of the second entangled web of fibers; a first plurality of discrete thermal bonding sites, each of the first plurality of discrete thermal bonding sites including a first thermal bond structure that is offset a first depth relative to the first face in a direction extending toward the second face, each of the first thermal bond structures including fibers from the first entangled web of fibers in a film form; and a second plurality of discrete thermal bonding sites, each of the second plurality of discrete thermal bonding sites including a second thermal bond structure that is offset a second depth relative to the first face in the direction extending toward the second face, the second depth different than the first depth, each of the second thermal bond structures including fibers from the second entangled web of fibers in a film form.

Clause 174. The composite nonwoven textile according to clause 173, wherein the first plurality of discrete thermal bonding sites are arranged at a plurality of first locations, and wherein the second plurality of discrete thermal bonding sites are arranged in a plurality of second locations that are different from the first locations.

Clause 175. The composite nonwoven textile according to any of clauses 173 through 174, wherein each of the first thermal bond structures is offset a third depth relative to the second face in a direction extending toward the first face, the third depth different than the first depth.

Clause 176. The composite nonwoven textile according to any of clauses 173 through 175, wherein each of the second thermal bond structures is offset a fourth depth relative to the second face in the direction extending the first face, the fourth depth different than the second depth.

Clause 177. The composite nonwoven textile according to any of clauses 175 through 176, wherein the third depth is different than the fourth depth.

Clause 178. The composite nonwoven textile according to any of clauses 173 through 177, wherein each of the first thermal bond structures further includes fibers from the second entangled web of fibers in film form.

Clause 179. The composite nonwoven textile according to any of clauses 173 through 178, wherein each of the second thermal bond structures further includes fibers from the first entangled web of fibers in film form.

Clause 180. The composite nonwoven textile according to any of clauses 173 through 179, wherein the elastomeric layer comprises one or more of a thermoplastic polyurethane meltblown layer or a thermoplastic polyether ester elastomer spunbond layer.

Clause 181. The composite nonwoven textile according to any of clauses 173 through 180, wherein each of the first thermal bond structures and each of the second thermal bond structures include a portion of the elastomeric layer in a film form.

Clause 182. A nonwoven article of apparel having an outer-facing surface and an opposite inner-facing surface, the nonwoven article of apparel comprising: a first entangled web of fibers forming, at least in part, the outer-facing surface; a second entangled web of fibers that forms, at least in part, the inner-facing surface; an elastomeric layer positioned between the first entangled web of fibers and the second entangled web of fibers, wherein at least some of the fibers of the first entangled web of fibers extend through the elastomeric layer and are entangled with at least some of the fibers of the second entangled web of fibers; and a first plurality of discrete thermal bonding sites positioned at first locations on the nonwoven article of apparel, each of the first plurality of discrete thermal bonding sites including a first thermal bond structure that is offset relative to the outer-facing surface in a direction extending toward the inner-facing surface, each of the first thermal bond structures including fibers from the first entangled web of fibers in a film form.

Clause 183. The nonwoven article of apparel according to clause 182, wherein the outer-facing surface further comprises a second plurality of discrete thermal bonding sites positioned at second locations on the nonwoven article of apparel, the second locations different from the first locations.

Clause 184. The nonwoven article of apparel according to clause 183, wherein a density of the first plurality of discrete thermal bonding sites is different from a density of the second plurality of discrete thermal bonding sites.

Clause 185. A method of finishing a composite nonwoven textile comprising a first entangled web of fibers that forms, at least in part, a first face of the composite nonwoven textile, a second entangled web of fibers that forms, at least in part, an opposite second face of the composite nonwoven textile, and an elastomeric layer positioned between the first entangled web of fibers and the second entangled web of fibers, wherein at least some of the fibers from the first entangled web of fibers extend through the elastomeric layer and are entangled with fibers of the second entangled web of fibers, the method comprising: forming a plurality of discrete thermal bonding sites in a first predetermined pattern, each of the plurality of discrete thermal bonding sites including a thermal bond structure that is offset relative to the first face in a direction extending toward the second face, each of the thermal bond structures including fibers from at least the first entangled web of fibers in a film form.

Clause 186. The method of finishing the composite nonwoven textile according to clause 185, wherein the plurality of discrete thermal bonding sites are formed using an ultrasonic bonding system comprising an impression roller and an ultrasonic horn.

Clause 187. The method of finishing the composite nonwoven textile according to clause 186, wherein the composite nonwoven textile is positioned in the ultrasonic bonding system such that the first face of the composite nonwoven textile is in contact with the impression roller and the second face of the composite nonwoven textile is in contact with the ultrasonic horn.

Clause 188. The method of finishing the composite nonwoven textile according to any of clause 186, wherein the composite nonwoven textile is positioned in the ultrasonic bonding system such that the second face of the composite nonwoven textile is in contact with the impression roller and the first face of the composite nonwoven textile is in contact with the ultrasonic horn.

Clause 189. The method of finishing the composite nonwoven textile according to any of clauses 185 through 188, further comprising applying a chemical binder in a second predetermined pattern to the first face of the composite nonwoven textile to produce a plurality of discrete chemical bonding sites on the first face of the composite nonwoven textile.

Clause 190. The method of finishing the composite nonwoven textile according to clause 189, wherein the second predetermined pattern is different from the first predetermined pattern.

Clause 191. The method of finishing the composite nonwoven textile according to any of clauses 189 through 190, wherein the chemical binder is not applied to the second face of the composite nonwoven textile.

Clause 192. The method of finishing the composite nonwoven textile according to any of clauses 189 through 191, wherein the chemical binder is applied before the plurality of discrete thermal bonding sites are formed.

Clause 193. The method of finishing the composite nonwoven textile according to any of clauses 189 through 191, wherein the chemical binder is applied after the plurality of discrete thermal bonding sites are formed.

Clause 194. A method of manufacturing a composite nonwoven textile comprising: at a first mechanical entanglement step, mechanically entangling a plurality of fibers of a first web of fibers in a direction extending from a first face of the first web of fibers toward an opposite second face of the first web of fibers; subsequent to the first mechanical entanglement step, positioning an elastomeric layer between the first web of fibers and a second web of fibers such that the elastomeric layer is positioned adjacent the first face of the first web of fibers; and at a second mechanical entanglement step, mechanically entangling a plurality of the fibers of the first web of fibers and a plurality of the fibers of the second web of fibers such that the first web of fibers becomes a first entangled web of fibers and the second web of fibers becomes a second entangled web of fibers, wherein subsequent to the second mechanical entanglement step at least some of the fibers of the first entangled web of fibers and at least some of the fibers of the second entangled web of fibers extend through the elastomeric layer.

Clause 195. The method of manufacturing the composite nonwoven textile according to clause 194, wherein subsequent to the second mechanical entanglement step, the second face of the first web of fibers forms, at least in part, a first face of the composite nonwoven textile.

Clause 196. The method of manufacturing the composite nonwoven textile according to clause 195, further comprising forming an article of apparel from the composite nonwoven textile, wherein the first face of the composite nonwoven textile forms an outer-facing surface of the article of apparel.

Clause 197. The method of manufacturing the composite nonwoven textile according to any of clauses 194 through 196, wherein a stitch density of the first web of fibers prior to the second mechanical entanglement step is greater than a stitch density of the second web of fibers prior to the second mechanical entanglement step.

Clause 198. The method of manufacturing the composite nonwoven textile according to any of clauses 194 through 197, wherein the stitch density of the first web of fibers prior to the second mechanical entanglement step is at least twice the stitch density of the second web of fibers prior to the second mechanical entanglement step.

Clause 199. A composite nonwoven textile having a first face and an opposite second face, the composite nonwoven textile comprising: a first entangled web of fibers that forms, at least in part, the first face, the first face having a first density of fiber terminal ends; a second entangled web of fibers that forms, at least in part, the second face, the second face having a second density of fiber terminal ends, the first density of fiber terminal ends less than the second density of fiber terminal ends; and an elastomeric layer positioned between the first entangled web of fibers and the second entangled web of fibers, wherein at least some of the fibers of the first entangled web of fibers extend through the elastomeric layer and are entangled with fibers of the second entangled web of fibers.

Clause 200. The composite nonwoven textile according to clause 199, wherein the fiber terminal ends of the first face extend in a direction away from the first face and in a direction away from a center plane of the composite nonwoven textile.

Clause 201. The composite nonwoven textile according to any of clauses 199 through 200, wherein the fiber terminal ends of the second face extend in a direction away from the second face and in a direction away from the center plane of the composite nonwoven textile.

Clause 202. The composite nonwoven textile according to any of clauses 199 through 201, wherein the first face has a first density of fiber loops and the second face has a second density of fiber loops, the first density of fiber loops greater than the second density of fiber loops.

Clause 203. The composite nonwoven textile according to any of clauses 199 through 202, wherein at least some of the fibers of the second entangled web of fibers extend through the elastomeric layer and are entangled with fibers of the first entangled web of fibers.

Clause 204. The composite nonwoven textile according to any of clauses 199 through 203, further comprising a third entangled web of fibers positioned between the first entangled web of fibers and the second entangled web of fibers.

Clause 205. The composite nonwoven textile according to clause 204, wherein at least some of the fibers of the third entangled web of fibers are entangled with fibers of the first entangled web of fibers and with fibers of the second entangled web of fibers.

Clause 206. The composite nonwoven textile according to any of clauses 199 through 205, wherein the elastomeric layer comprises one or more of a thermoplastic polyurethane meltblown layer or a thermoplastic polyether ester elastomer spunbond layer.

Clause 207. A composite nonwoven textile having a first face and an opposite second face, the composite nonwoven textile comprising: a first entangled web of fibers that forms, at least in part, the first face; a second entangled web of fibers that forms, at least in part, the second face, the first face having a lower density of fiber terminal ends relative to the second face; and an elastomeric layer positioned between the first entangled web of fibers and the second entangled web of fibers, wherein at least some of the fibers of the first entangled web of fibers extend through the elastomeric layer and are entangled with fibers of the second entangled web of fibers.

Clause 208. The composite nonwoven textile according to clause 207, wherein the fiber terminal ends of the first face extend in a direction away from the first face and in a direction away from a center plane of the composite nonwoven textile.

Clause 209. The composite nonwoven textile according to any of clauses 207 through 208, wherein the fiber terminal ends of the second face extend in a direction away from the second face and in a direction away from the center plane of the composite nonwoven textile.

Clause 210. The composite nonwoven textile according to any of clauses 207 through 209, wherein the first face includes a greater density of fiber loops relative to the second face.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. An asymmetrical-faced composite nonwoven textile having a first face and an opposite second face, the asymmetrical-faced composite nonwoven textile comprising:
a first entangled web of fibers having a first number of fibers per $cm^2$ with a first denier and a second number of fibers per $cm^2$ with a second denier, wherein a ratio of the first denier to the second denier is in a range of from about 1.5:1 to about 2:1, the first entangled web of fibers forming, at least in part, the first face;
a second entangled web of fibers having a third number of fibers per $cm^2$ with a third denier and a fourth number of fibers per $cm^2$ with a fourth denier, wherein a ratio of the third denier to the fourth denier is in a range of from about 0.3:1 to about 0.7:1, the second entangled web of fibers forming, at least in part, the second face; and
an elastomeric layer positioned between the first entangled web of fibers and the second entangled web of fibers, wherein at least some of the fibers of the first entangled web of fibers extend through the elastomeric layer and are entangled with fibers of the second entangled web of fibers.

2. The asymmetrical-faced composite nonwoven textile of claim 1, wherein at least some of the fibers of the second entangled web of fibers extend through the elastomeric layer and are entangled with fibers of the first entangled web of fibers.

3. The asymmetrical-faced composite nonwoven textile of claim 1, further comprising a third entangled web of fibers positioned between the first entangled web of fibers and the second entangled web of fibers.

4. The asymmetrical-faced composite nonwoven textile of claim 3, wherein the third entangled web of fibers comprises a fifth number of fibers per $cm^2$ with a fifth denier and a sixth number of fibers per $cm^2$ with a sixth denier, wherein a ratio of the fifth denier to the sixth denier is in a range of from about 1.5:1 to about 2:1.

5. The asymmetrical-faced composite nonwoven textile of claim 3, wherein the third entangled web of fibers is positioned between the first entangled web of fibers and the elastomeric layer.

6. The asymmetrical-faced composite nonwoven textile of claim 3, wherein the third entangled web of fibers is positioned between the second entangled web of fibers and the elastomeric layer.

7. The asymmetrical-faced composite nonwoven textile of claim 3, wherein at least some of the fibers of the third entangled web of fibers extend through the elastomeric layer.

8. The asymmetrical-faced composite nonwoven textile of claim 3, wherein at least some of the fibers of the third entangled web of fibers are entangled with fibers of the first entangled web of fibers and with fibers of the second entangled web of fibers.

9. An asymmetrical-faced composite nonwoven textile having a first face and an opposite second face, the asymmetrical-faced composite nonwoven textile comprising:
a first entangled web of fibers having a first number of fibers per $cm^2$ with a denier of from about 1.2 D to about 3.5 D and a second number of fibers per $cm^2$ with a denier of from about 0.6 D to about 1 D, the first number of fibers per $cm^2$ greater than the second number of fibers per $cm^2$, wherein the first entangled web of fibers forms, at least in part, the first face;
a second entangled web of fibers having a third number of fibers per $cm^2$ with a denier of from about 0.6 D to about 1 D and a fourth number of fibers per $cm^2$ with a denier of from about 1.2 D to about 3.5 D, the third number of fibers per $cm^2$ greater than the fourth number of fibers per $cm^2$, wherein the second entangled web of fibers forms, at least in part, the second face; and
an elastomeric layer positioned between the first entangled web of fibers and the second entangled web of fibers, wherein at least some of the fibers of the first entangled web of fibers extend through the elastomeric layer and are entangled with the fibers of the second entangled web of fibers.

10. The asymmetrical-faced composite nonwoven textile of claim 9, wherein at least some of the fibers of the second entangled web of fibers extend through the elastomeric layer and are entangled with fibers of the first entangled web of fibers.

11. The asymmetrical-faced composite nonwoven textile of claim 9, further comprising a third entangled web of fibers positioned between the first entangled web of fibers and the second entangled web of fibers.

12. The asymmetrical-faced composite nonwoven textile of claim 11, wherein the third entangled web of fibers comprises a fifth number of fibers per $cm^2$ with a denier of from about 1.2 D to about 3.5 D and a sixth number of fibers per $cm^2$ with a denier of from about 0.6 D to about 1 D, the fifth number of fibers per $cm^2$ greater than the sixth number of fibers per $cm^2$.

13. The asymmetrical-faced composite nonwoven textile of claim 11, wherein the third entangled web of fibers is positioned between the first entangled web of fibers and the elastomeric layer.

14. The asymmetrical-faced composite nonwoven textile of claim 11, wherein the third entangled web of fibers is positioned between the second entangled web of fibers and the elastomeric layer.

15. The asymmetrical-faced composite nonwoven textile of claim 11, wherein at least some of the fibers of the third entangled web of fibers extend through the elastomeric layer.

16. The asymmetrical-faced composite nonwoven textile of claim 11, wherein at least some of the fibers of the third entangled web of fibers are entangled with fibers of the first entangled web of fibers and with fibers of the second entangled web of fibers.

17. A method of manufacturing an asymmetrical-faced composite nonwoven textile comprising:
    positioning an elastomeric layer between a first web of fibers with a denier from about 1.2 D to about 3.5 D and a second web of fibers with a denier from about 0.6 D to about 1 D; and
    mechanically entangling a plurality of the fibers of the first web of fibers and a plurality of the fibers of the second web of fibers such that the first web of fibers becomes a first entangled web of fibers and the second web of fibers becomes a second entangled web of fibers, wherein subsequent to the mechanical entanglement step at least some of the fibers of the first entangled web of fibers and at least some of the fibers of the second entangled web of fibers extend through the elastomeric layer, and wherein the first entangled web of fibers forms, at least in part, a first face of the asymmetrical-faced composite nonwoven textile and the second entangled web of fibers forms, at least in part, an opposite second face of the asymmetrical-faced composite nonwoven textile.

18. The method of manufacturing the asymmetrical-faced composite nonwoven textile of claim 17, further comprising:
    prior to mechanically entangling the plurality of the fibers of the first web of fibers and the plurality of the fibers of the second web of fibers, positioning a third web of fibers between the first web of fibers and the second web of fibers; and
    mechanically entangling a plurality of fibers of the third web of fibers with fibers of the first web of fibers and fibers of the second web of fibers such that the third web of fibers becomes a third entangled web of fibers.

19. The method of manufacturing the asymmetrical-faced composite nonwoven textile of claim 18, wherein the third web of fibers comprises a denier of from about 1.2 D to about 3.5 D.

20. The method of manufacturing the asymmetrical-faced composite nonwoven textile of claim 18, wherein at least some of the fibers of the third entangled web of fibers extend through the elastomeric layer.

21. The asymmetrical-faced composite nonwoven textile of claim 1, wherein the first denier is greater than about 1.2 D and the second denier is less than about 1.0 D.

22. The asymmetrical-faced composite nonwoven textile of claim 21, wherein the third denier is greater than about 1.2 D and the fourth denier is less than about 1.0 D.

23. The method of claim 17, wherein mechanically entangling comprises needlepunching, such that at least some of the fibers of the first entangled web of fibers are moved via needles through the elastomeric layer and are entangled with fibers of the second entangled web of fibers.

24. The method of claim 23, wherein based on the needlepunching, at least some of the fibers of the second entangled web of fibers are moved via needles through the elastomeric layer and are entangled with fibers of the first entangled web of fibers.

* * * * *

UNITED STATES PATENT AND TRADEMARK OFFICE
CERTIFICATE OF CORRECTION

| | | |
|---|---|---|
| PATENT NO. | : 12,005,691 B2 | Page 1 of 1 |
| APPLICATION NO. | : 17/508315 | |
| DATED | : June 11, 2024 | |
| INVENTOR(S) | : Krista J. Connors, Dallas Lund and David Turner | |

It is certified that error appears in the above-identified patent and that said Letters Patent is hereby corrected as shown below:

On the Title Page

In Item (56) OTHER PUBLICATIONS

Under Column no. 2, Page 3, Line no. 1, "1 Non-Final", should read -- Non-Final --

Under Column no. 2, Page 3, Line no. 18, "No. 17/512,149 mailed", should read -- No. 17/512,149, mailed --

Signed and Sealed this
Twenty-second Day of October, 2024

*Katherine Kelly Vidal*

Katherine Kelly Vidal
*Director of the United States Patent and Trademark Office*